US011350193B2

(12) United States Patent
Krapp et al.

(10) Patent No.: US 11,350,193 B2
(45) Date of Patent: May 31, 2022

(54) METHODS AND SYSTEMS FOR REDUCING OUTAGE SCOPE IN CABLE NETWORKS WITH IDEAL TAPS

(71) Applicant: MaxLinear. Inc., Carlsbad, CA (US)

(72) Inventors: Steven J. Krapp, Naperville, IL (US); Leonard Dauphinee, Irvine, CA (US); Stefan Szasz, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 17/184,261

(22) Filed: Feb. 24, 2021

(65) Prior Publication Data

US 2021/0314684 A1 Oct. 7, 2021

Related U.S. Application Data

(60) Provisional application No. 62/980,523, filed on Feb. 24, 2020.

(51) Int. Cl.
*H04Q 11/00* (2006.01)
*H01R 9/05* (2006.01)

(52) U.S. Cl.
CPC ..... *H04Q 11/0071* (2013.01); *H04Q 11/0067* (2013.01); *H04Q 2011/0064* (2013.01); *H04Q 2011/0081* (2013.01); *H04Q 2011/0083* (2013.01)

(58) Field of Classification Search
CPC .................................................. H04Q 11/0071
See application file for complete search history.

(56) References Cited

U.S. PATENT DOCUMENTS

| | | | | |
|---|---|---|---|---|
| 2009/0265745 A1* | 10/2009 | Egan, Jr | ................. | H04N 7/173 725/106 |
| 2018/0351268 A1* | 12/2018 | Krapp | .................... | H04N 7/102 |

\* cited by examiner

*Primary Examiner* — Shi K Li
(74) *Attorney, Agent, or Firm* — McAndrews, Held & Malloy, Ltd.

(57) ABSTRACT

Systems and methods are provided for reducing outage scope in cable networks with ideal taps. An ideal tap may have a plurality of ports that include at least an input port configured for receiving downstream (DS) signals from and transmitting upstream (US) signals to upstream nodes, an output port configured for transmitting downstream (DS) signals to and receiving upstream (US) signals from downstream nodes, and one or more drop ports for receiving signal from and transmitting signals to customer premise equipment (CPE) in the coaxial network. The ideal tap may further include one or more mitigation components configured for reducing scope of outage in the ideal tap, with the one or more mitigation components configured to, when an outage occurs in the ideal tap, provide or maintain inter-port connectivity within the ideal tap, the inter-port connectivity including at least connectivity between the input port and the output port.

43 Claims, 39 Drawing Sheets

METHODS AND SYSTEMS FOR REDUCING OUTAGE SCOPE IN CABLE NETWORKS WITH IDEAL TAPS

CLAIM OF PRIORITY

This patent application makes reference to, and claims priority from U.S. Provisional Patent Application Ser. No. 62/980,523, filed Feb. 24, 2020. The above identified application is hereby incorporated herein by reference in its entirety.

This patent application is related to:
U.S. patent application Ser. No. 16/000,491, filed Jun. 5, 2018;
U.S. patent application Ser. No. 16/128,213, filed Sep. 11, 2018; and
U.S. patent application Ser. No. 16/659,170, filed Oct. 21, 2019.

Each of the above identified applications is hereby incorporated herein by reference in its entirety.

TECHNICAL FIELD

Aspects of the present disclosure relate to communication solutions. More specifically, certain implementations of the present disclosure relate to methods and systems for reducing outage scope in cable networks with ideal taps.

BACKGROUND

Various issues may exist with conventional approaches for designing and implementing cable networks, particularly coaxial cable based networks. In this regard, conventional systems and methods, if any existed, for designing and implementing coaxial cable plants can be costly, inefficient, and/or ineffective.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for reducing outage scope in cable networks with ideal taps, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Figure 1:
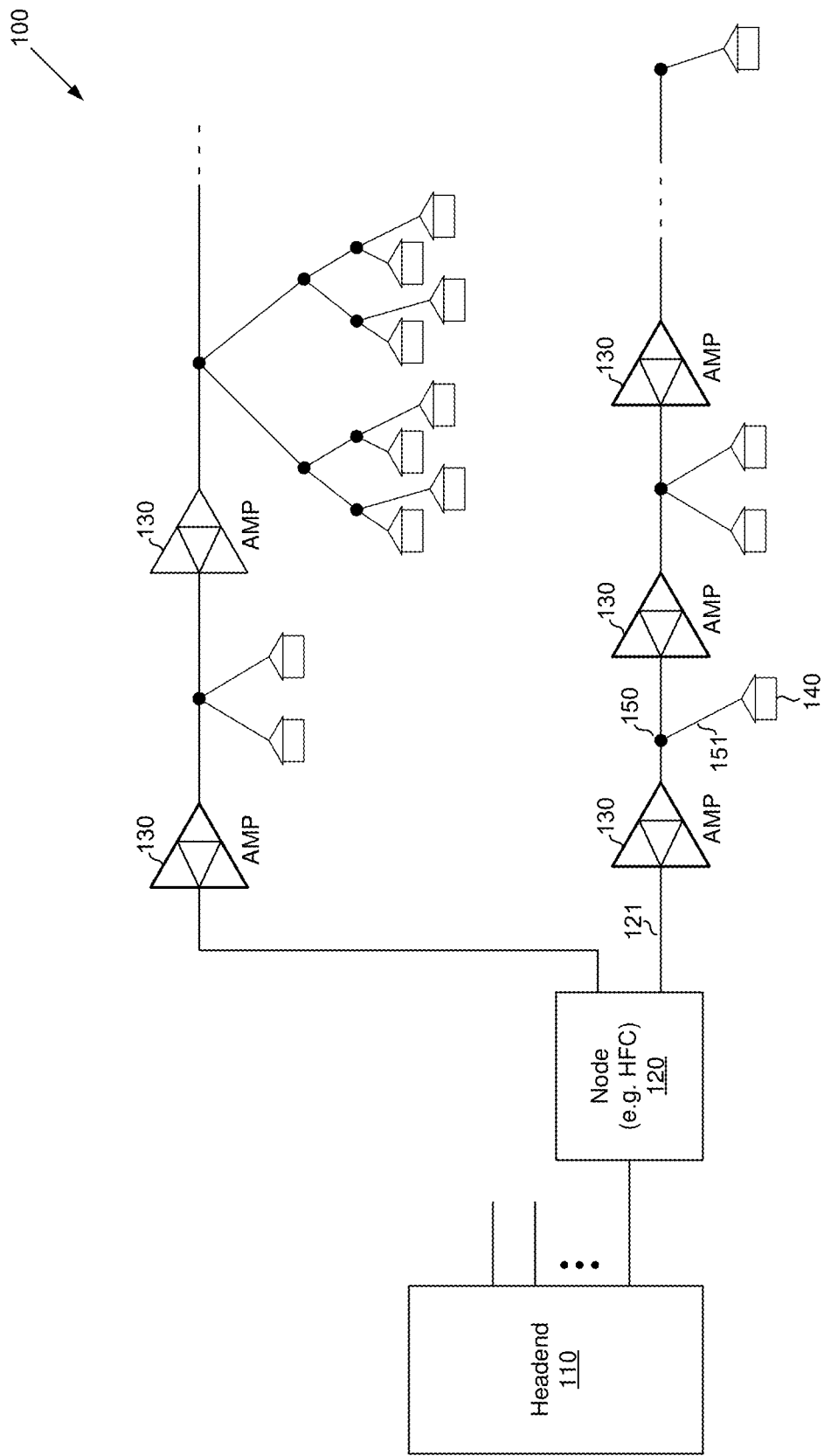
FIG. 1 illustrates an example cable network.

FIG. 1 illustrates an example cable network. Referring to FIG. 1, there is shown a plant 100, which may correspond to an example cable network distribution plant. The plant 100 may be a hybrid fiber-coaxial (HFC) based plant.

The plant 100 may comprise a headend 110, connected to one or more distribution (e.g., HFC) nodes 120, with each node 120 connecting to plurality of user equipment (e.g., customer-premises equipment (CPE), such as data over cable service interface specification (DOCSIS) modems (or cable modems (CMs)), television set-top boxes, etc.) 140 residing in customers' (subscribers') premises.

The headend 110 may comprise suitable circuitry for supporting headend operations and/or functions. For example, the headend 110 may support several heterogeneous services (e.g., DOCSIS, video on demand (VOD), switched digital video (SDV), out-of-band control signals (OOB), broadcast analog and/or digital television based services, etc.) and may be operable to generate downstream signals combining content (e.g., video or other data) from the different supported services, for communication over HFC based distribution network to end-user equipment (e.g., CPEs 140).

The node 120 may comprise suitable circuitry for converting signals between the headend 110 and the CPEs 140. In this regard, node(s) 120 may facilitate communication of downstream (DS) signals to the users and communication of upstream (US) signals from the end users to the headends. Accordingly, within the cable plant, each node 120 is a source of downstream (DS) signals and a sink of upstream (US) signals, whereas each CPE 140 is a source of upstream (US) signals and a sink of downstream (DS) signals. The node 120 may convert, for example, optical signals to electrical signals in the downstream (from the headend 110), and may convert electrical signals to optical signals in the upstream (to the headend 110).

The node(s) 120 may communicate with the CPEs 140 over coaxial cables, which may comprise "trunk coax" connections 121 that the user equipment may be connected to via "drop coax" connections 123. In this regard, bidirectional line amplifiers 130 may be utilized, being placed in the coaxial connections between each node 120 and the CPEs 140 coupled thereto. The placement of the amplifiers 130 may be determined in adaptive manner (e.g., based on a determination of where application of amplification may be needed, such as based on distance and/or number of CPE(s) in each amplification stage). Each of the amplifiers 130 may comprise circuitry for providing amplification bidirectionally (i.e., in both directions—that is, upstream and downstream). For example, each amplifier 130 may apply amplification gain to upstream and downstream signals between the node 120 and the CPEs 140 coupled to it. In this regard, each of the amplifiers 130 may be configured to apply different amplification gain in the upstream and downstream direction.

Further, taps 150 may be used for coupling the user equipment to the trunk coax connections 121. In this regard, taps are implemented in existing networks as passive devices that are used to split DS signals and combine US signals, to connect a plurality of homes to the coax network, and to propagate signals to/from the next tap.

In an example implementation, the plant 100 may be configured such that devices and/or systems downstream from the headends (e.g., the node 120, one or more of the amplifiers 130, and/or one or more of the CPEs 140 may be implemented as 'intelligent' platforms, such as to enable monitoring and reporting (e.g., of control information) to the headends—e.g., monitoring upstream and/or downstream activities, reporting signal characteristics, etc. For example, the node 120, one or more of the amplifiers 130, and/or one or more of the user equipment in customer premises 140 may incorporate cable modem (or a reduced complexity/ functionality cable modem) functions, with each cable modem function comprising a full-spectrum capture, for capturing and reporting frequency-domain snapshots of the HFC plant.

Certain issues and/or limitations may be present in existing cable networks. For example, existing coaxial networks may utilize high gain amplification of signals in order to overcome the inherent losses of the network. In this regard, amplifiers (e.g., amplifiers 130 in plant 100) may be added after a number of taps to boost and re-equalize signals after the signal level becomes too low. Despite its success and widespread use, however, use of high gain amplification has its limitations. For example, amplifiers add noise. Further, because amplifiers are active components, they require power. Existing amplifiers have typically not been monitorable. In addition, to accommodate use in the bidirectional environment of the cable networks, amplifiers require diplexers to segregate the US signals from the DS signals. In this regard, diplexers are fixed elements that must be replaced in order to change the ratio of US and DS spectrum. Further, amplifiers are fixed in the spectrum that they can address.

Thus, various implementations in accordance with the present disclosure may enhance performance and optimize use of cable networks. For example, ideal taps may be used to optimize use of coaxial connections, particularly with respect to the amplification and related adjustments typically required to facilitate communication of signals over such coaxial connections. Further, new coaxial designs and network plans that incorporate use of such ideal taps, as low gain low noise amplifiers for example, to enhance performance. This is a net result of deploying the taps in distributed fashion as each tap is required to provide only enough gain to overcome a single segment of coaxial cable of modest length.

The low gain allows for greater linearity in the amplification of the signal, which provides improved efficiency. The ideal tap also provides high isolation and return loss. In addition to improving coaxial network planning and design, use of such ideal taps may reduce operational burden and allow for improved troubleshooting during use of the cable networks.

Figure 2:
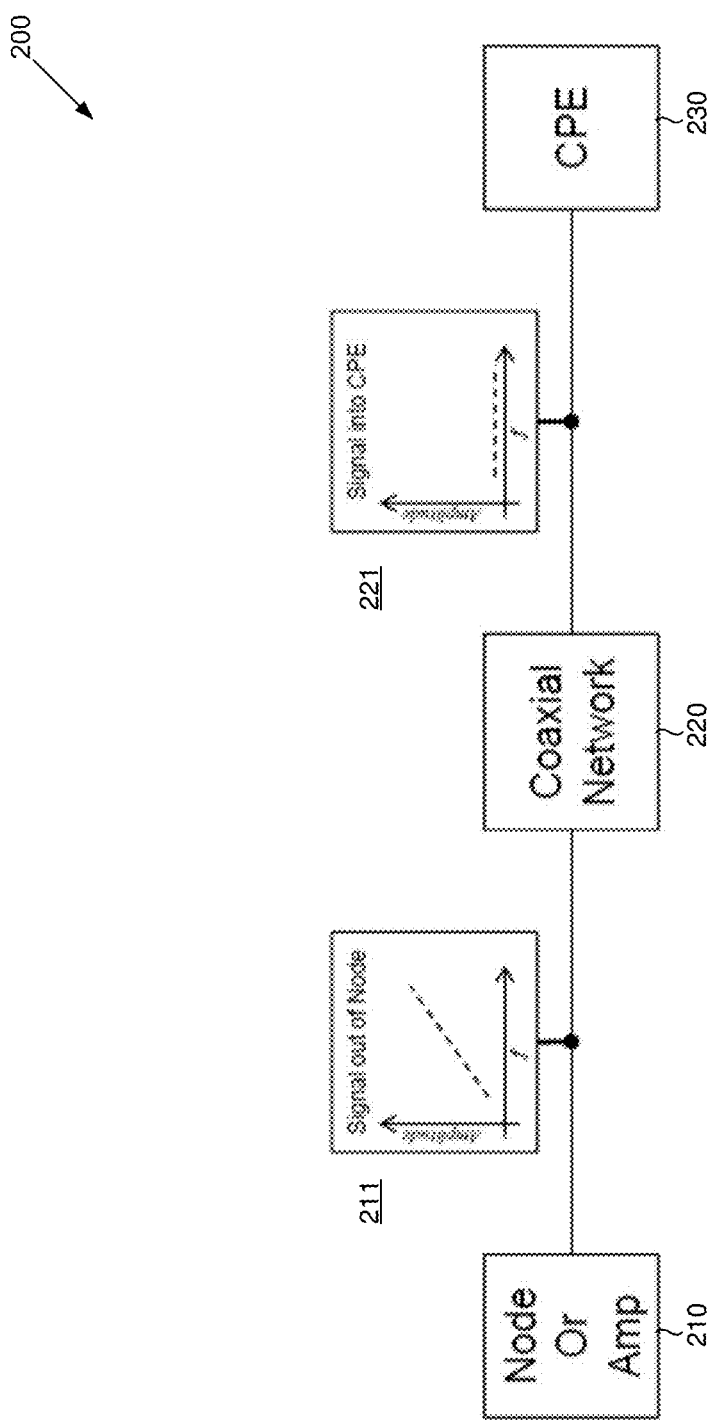
FIG. 2 illustrates an example coax design in existing networks.

FIG. 2 illustrates an example coax design for use in existing networks. Shown in FIG. 2 is a (portion of) cable plant 200 implemented in accordance with traditional coax design.

The cable plant 200 comprises a node (or amplifier) 210 communicating signals to a customer-premises equipment (CPE) 230 via coaxial network (cabling) 220. Coaxial cables naturally exhibit a "coaxial loss" (to the signals communicated via the coaxial cables), which is typically a function of frequency and length. For example, coaxial loss may be expressed as:

$$\text{coaxial loss} \sim = \text{sqrt}(f) * \text{length} + K$$

where f is frequency of the signal traversing the cabling, "length" is the length of coaxial cable, and K is a constant give for a specific cable construction.

This "coaxial loss" may cause issues, particularly for certain conditions. For example, in long setups (e.g., with large "length"), such uneven loss may create large variations between signals having low frequencies and those having high frequencies. In accordance with traditional coax design based approaches, such losses are accounted for, such as by compensating through equalization at signal launch. For example, the output of the node or the CPE may be pre-emphasized with more power at higher frequencies. This is referred to as an "up-tilt" or just "tilt."

With reference to the particular implementation shown in FIG. 2, the output of the node (or amplifier) 210 is configured to incorporate a tilt into its output signal (as shown in signal chart 211). In this regard, the amount of "tilt" is dependent upon various factors, such as the length of cable (to the target CPE), the end-of-line desired signal level, and the frequency width of the signals used for communication. The tilt is designed such that the signal is relatively flat (e.g., as shown in signal chart 221) when received at the CPE.

Because individual CPEs are connected to the coaxial network at different locations, each CPE may have a unique transfer function from the nearest node (or amplifier). In traditional coax designs, to compensate for this uniqueness in transfer function, CPEs may be grouped onto taps which serve multiple CPEs; with each tap having a particular corresponding tap value that adds loss to minimize the difference seen by an individual CPE; and each tap may also have a slot in which additional equalization can be added. In a well-designed system the transfer function from the node to each of the CPE is nearly identical. This is illustrated in FIG. 3.

Figure 3:
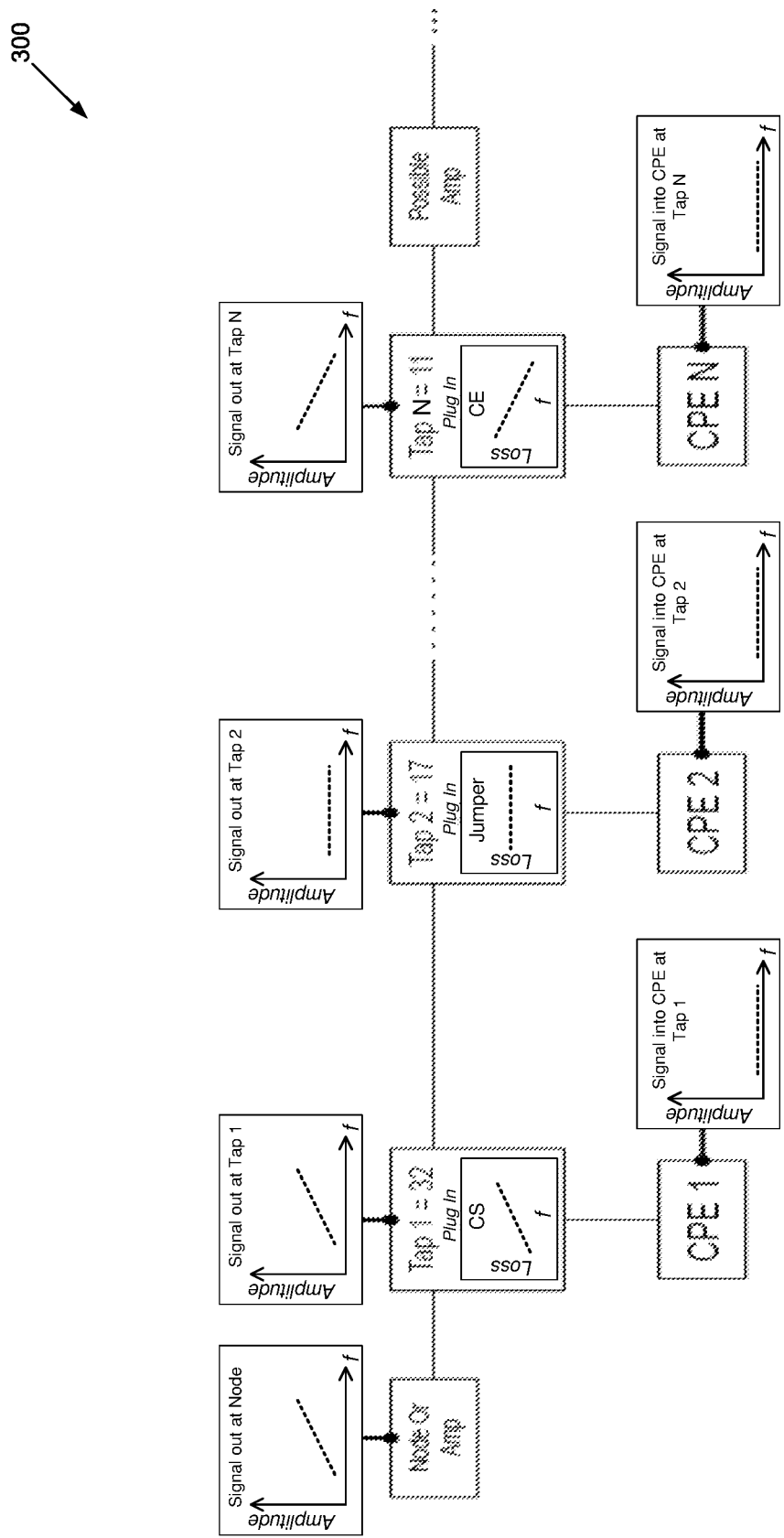
FIG. 3 illustrates signal profiles at different points in a coax segment of an example cable network implemented in accordance with traditional coax design.

FIG. 3 illustrates signal profiles at different points in a coax segment of an example cable network implemented in accordance with traditional coax design. Shown in FIG. 3 is a (portion of) cable plant 300 implemented in accordance with a traditional coax design.

In this regard, the cable plant 300 comprises a plurality of taps, each used for coupling one or more CPEs to the coaxial cable network. As noted above, with traditional coax design, each tap may be assigned a unique tap value. In this regard, the "tap value" may be the amount of passive loss a tap imparts across—that is, from the tap input port (tap-in) to the tap drop ports. Taps come with different values. In this regard, the further a tap is in the system the lower the tap value specified in the design is. Taps may also be configured to provide (e.g., via plug-in modules) frequency dependent equalization via passive components. As with the tap values, with traditional cable design, taps may have different equalization characteristics. For example, some taps may incorporate a Cable Equalizer (CE), configured for more loss at low frequencies (e.g., to counteract the effect of the coaxial cable); a Cable Simulator (CS), configured for more loss at high frequencies (e.g., to simulate a longer length of coaxial cable); or a "Jumper," configured for flat response with little to no loss (e.g., for use when no conditioning is needed). Thus, in the example cable plant 300 shown in FIG. 3, Tap 1 (near the node or amplifier) has a CS plug-in; Tap 2 has a Jumper plug-in; and Tap N (near the end of the cable, before the next amplifier) has a CE plug-in, to ensure that the CPE(s) connected to each of these taps receive substantially similar flat signals.

Various issues and limitations exist with traditional coax design. In particular, a lot of expertise and knowledge is required to design a proper system, specifically when determining coaxial losses and required adjustments at different points in the network to counteract the effects of these losses. Also, there are a finite set of tap, CE, and CS values. As a consequence, not all CPEs receive flat signals, particularly in situations where there are multiple CPEs connected to the same tap (e.g., not all premises attached to the same tap have the same length of cable); rather, some CPEs may receive signals with some tilt (e.g., 3 to 6 dBs). Even with infinite choice for tap, CE, and CS values, the length of cable between the tap and the home will vary the system transfer function.

In addition, taps have low isolation. In this regard, neighboring CPE may "hear" each other. This low isolation causes various problems—e.g., makes full-duplex (FDX) systems near impossible at the CPE, and makes time-division duplexing (TDD) systems (e.g., such as MoCA based systems) difficult to deploy and use, and/or necessitate use of particular solutions to counteracts such issues (e.g., filters are added to a CPE to prevent its MoCA transmissions from being heard by its neighbors). Further, taps have low return loss. In this regard, as a consequence of such low return loss complicated Micro-reflections are ever present creating inter-symbol interference (ISI), and FDX becomes difficult as multiple echoes from multiple taps need to be tracked and canceled.

In addition, because taps are also passive components, various use limitations may exist. For example, taps cannot be monitored remotely, cannot change configuration remotely (e.g., ports enable/disable), cannot block ingress noise, and cannot notch out undesired spectrum. Power consumption may also be high in traditional coax designs. In this regard, high output power is required at the node and CPE to overcome large plant losses (e.g., 74 dBmV total composite power (TCP) at the node and 65 dBmV TCP at the CPE). CPEs (or particular components therein, such as amplifiers) may consume 5 W, and possibly twice as much as this when FDX becomes available. All CPEs must transmit at high power (including those close to the nodes or amplifiers). Nodes (or particular components therein, such as amplifiers) may consume 18 W or more per 32 households passed (HHP).

In addition, modulation error ratio (MER) performance may be low (e.g., node fidelity is limited to about 41 dB with current technology to achieve the needed output power), HHP per segment may be low (e.g., typically 30 to 50 HHP), frequency allocation for US and DS directions may be fixed by physical diplexers, and allocation is the same for all CPE in the system (e.g., CPE which use different splits suffer degraded performance.

Many of these issues (and more) may be overcome by use of "ideal" taps, as described below. In this regard, such ideal taps may have characteristics that address some of the issues associated with traditional coax designs and/or obviate the need for some of the added measures (e.g., tilt and related adjustments) or components (e.g., plug-in modules) required in these designs, as explained in more detail below.

Figure 4:
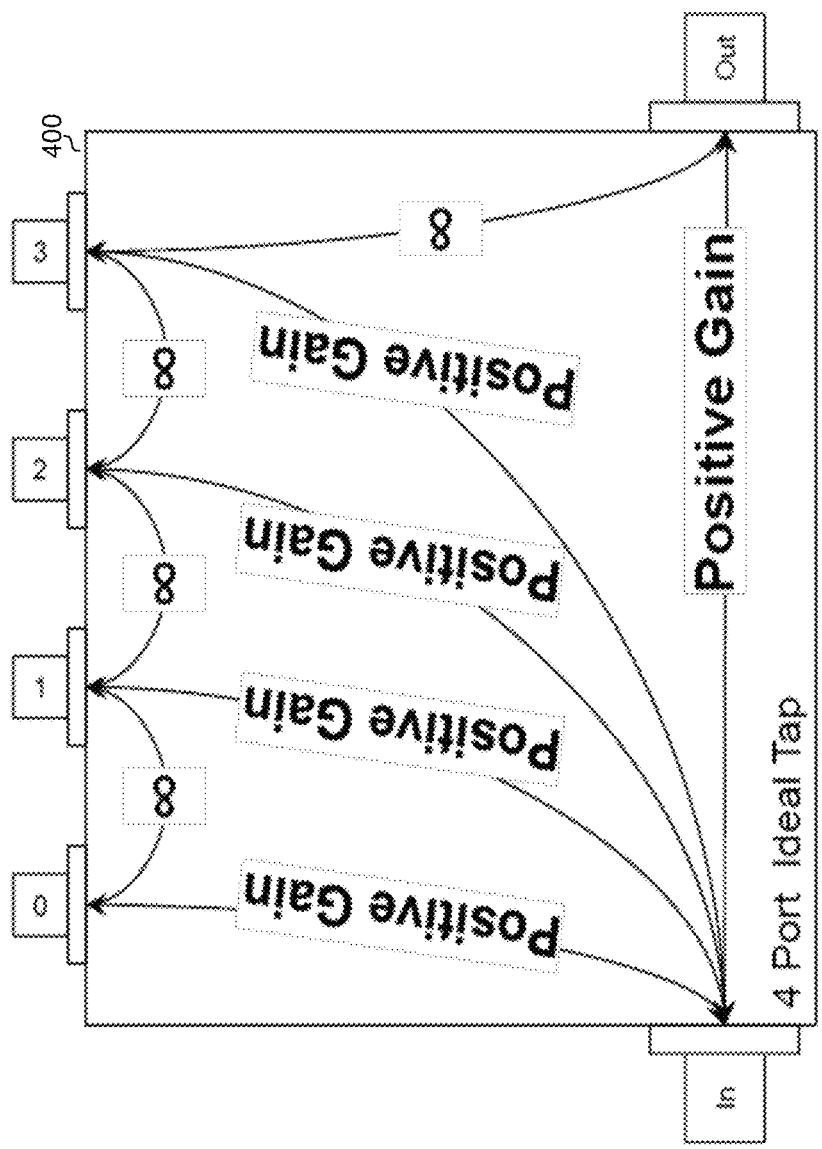
FIG. 4 illustrates performance profile of an example N-port ideal tap.

FIG. 4 illustrates performance profile of an example N-port ideal tap. Shown in FIG. 4 is an N-port (e.g., 4 ports, as shown in FIG. 4) ideal tap 400.

The ideal tap 400 may comprise suitable circuitry for providing tap-related functions in cable networks—e.g., allowing coupling of CPEs to coax cable networks (particularly to the trunk coax portions). As shown in FIG. 4, the ideal tap 400 is a 4-port tap—that is, with 6 ports: an "in" port (or "in-port"), an "out" port (or "out-port"), and 4 "drop" ports (or "drop-ports"). In this regard, the drop-ports are used for coupling CPEs into the coax network. Nonetheless, it should be understood that the disclosure is not limited to the use of 4 drop-ports, and that a different number of drop-ports can be used in different implementations. Similarly, an ideal tap may have more than one in-port and/or more than one out-port.

In particular, the ideal tap 400 may be designed and configured as an "ideal" tap—that is, having characteristics that provide ideal performance, thus overcoming at least some of the limitations and/or issues noted above with respect to traditional coax design.

In this regard, an ideal tap may have, for example, infinite band pass, infinite isolation, infinite return loss, an in-any (e.g., from the in-port to any of the 4 drop-ports or to the out-port) gain that is enough to overcome loss in the coaxial drop cable from the CPE to the tap (e.g., up to ~200 feet), an out-in (e.g., from the out-port to the in-port) gain that is enough to overcome loss in trunk cable attached between taps (e.g., up to ~200 feet), can remove undesired signals, can disable/enable ports remotely, can communicate information related to itself (e.g., status, metrics, etc.), consumes no (or minimal) power, does not add noise, and can remove noise. Example implementations of such ideal taps are described with respect to FIGS. 5 and 6.

Figure 5:
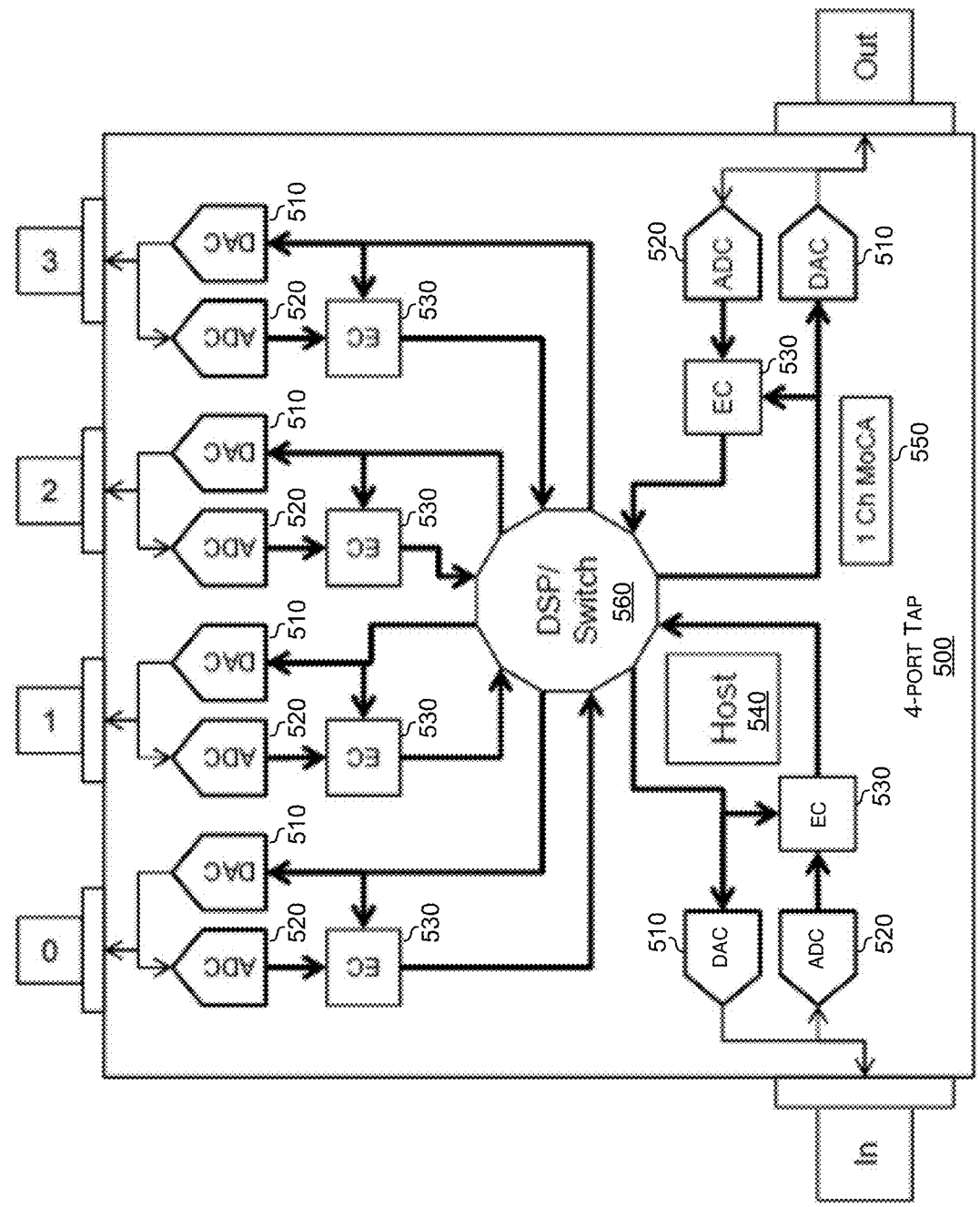
FIG. 5 illustrates an implementation on an example N-port ideal tap.

FIG. 5 illustrates an implementation on an example N-port ideal tap. Shown in FIG. 5 is an N-port (e.g., 4-port as shown in FIG. 5) ideal tap 500.

The ideal tap 500 may comprise suitable circuitry for providing tap-related functions in cable networks, and to particularly do so as an "ideal" tap as described above with respect to FIG. 4 for example. As with the ideal tap 400, the ideal tap 500 is also shown as a 4-port tap—that is, with an in-port, an out-port, and 4 drop-ports.

The ideal tap 500 may comprise circuits for processing signals received and transmitted via each of the ports, such as digital-to-analog converter (DAC) circuits 510, analog-to-digital converter (ADC) circuits 520, and echo cancellation (EC) circuits 530, which may be arranged in the manner shown in FIG. 5. In this regard, the EC circuits 530 are used for cancelling echo on each port as echoes do not propagate as such so echo cancellation only needs to accommodate—e.g., for at most 1000' of cable.

The ideal tap 500 may further comprise a host processor 540, a Multimedia over Coax Alliance (MoCA) controller 550, and a digital signal processor (DSP)/switch 560. The host processor 540 may comprise suitable circuitry for managing and controlling the tap 500 and operations thereof. The MoCA controller 550 may comprise suitable circuitry for facilitating MoCA based communication (e.g., using 1 channel). The disclosure is not limited to MoCA communication and MoCA is only shown as an example communications channel, however, and as such, the controller 550 could also be a DOCSIS cable modem or any other modem that communicates via RF over coaxial cable, etc. The DSP/switch 560, which may comprise suitable circuitry for performing digital signal processing functions, as well as handling switching within the ideal tap 500. In this regard, switching within the tap comprises providing signal paths and/or routing signals within the ideal tap 500 between the different ports.

The ideal tap 500 may be configured to enable and support bandwidth of 1.2 Gbps minimum, and a goal bandwidth of 3 to 6 Gbps. Further, with 10 bps/Hz a bandwidth of 30 to 60 Gbps may be achieved. The ideal tap 500 may also be configurable to have a high return loss (e.g., 30 to 50 dB) and high port-to-port isolation (e.g., 50 to 70 dB), low power consumption (e.g., less than 5 W). The ideal tap 500 may be configured to utilize IEEE 1588. Further, along with the performance improvements, the ideal tap 500 may also have economic advantages.

Figure 6:
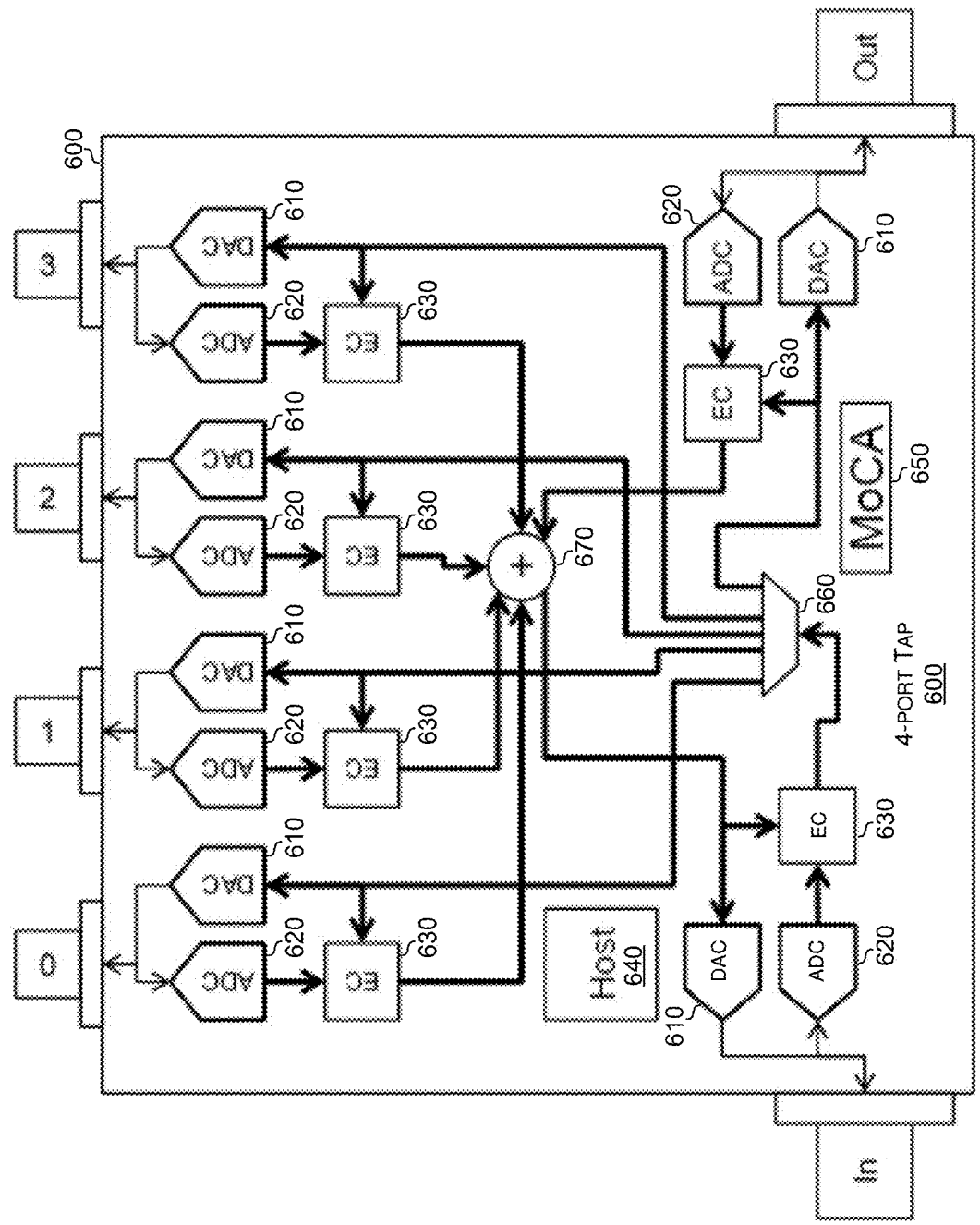
FIG. 6 illustrates an implementation on another example N-port ideal tap.

FIG. 6 illustrates an implementation on another example N-port ideal tap. Shown in FIG. 6 is an N-port (e.g., 4-port as shown in FIG. 6) ideal tap 600.

The ideal tap 600 may comprise suitable circuitry for providing tap-related functions in cable networks, and to particularly do so as an "ideal" tap as described above with respect to FIGS. 4 and 5 for example. As with the ideal tap 500, the ideal tap 600 is also shown as a 4-port tap—that is, with an in-port, an out-port, and 4 drop-ports.

The ideal tap 600 may be substantially similar to the ideal tap 500 described above, for example. Thus, the ideal tap 600 may similarly comprise digital-to-analog converter (DAC) circuits 610, analog-to-digital converter (ADC) circuits 620, and echo cancellation (EC) circuits 630, which may be utilized for processing signals received and transmitted via each of the ports, with these circuits being arranged in substantially the same manner, as shown in FIG. 6, and which may be arranged in the manner shown in FIG. 6.

Further, the ideal tap 600 may similarly comprise a host processor 640 and a Multimedia over Coax Alliance (MoCA) controller 650, which may be substantially similar to (and function similarly as) the host processor 540 and the MoCA controller 550 of the ideal tap 500 described with respect to FIG. 5. However, the ideal tap 600 may utilize a different design for handling switching within the tap. In this regard, the ideal tap 600 may utilize a multiplexer 660 and a combiner 670, for handling switching functions within the ideal tap 600 (e.g., providing signal paths and/or routing signals within the ideal tap 600 between the different ports). Nonetheless, the ideal tap 600 may be configured similar to the ideal tap 500, and may have substantially similar characteristics (e.g., bandwidth, cost, power consumption, etc.) as described above.

Figure 7A:
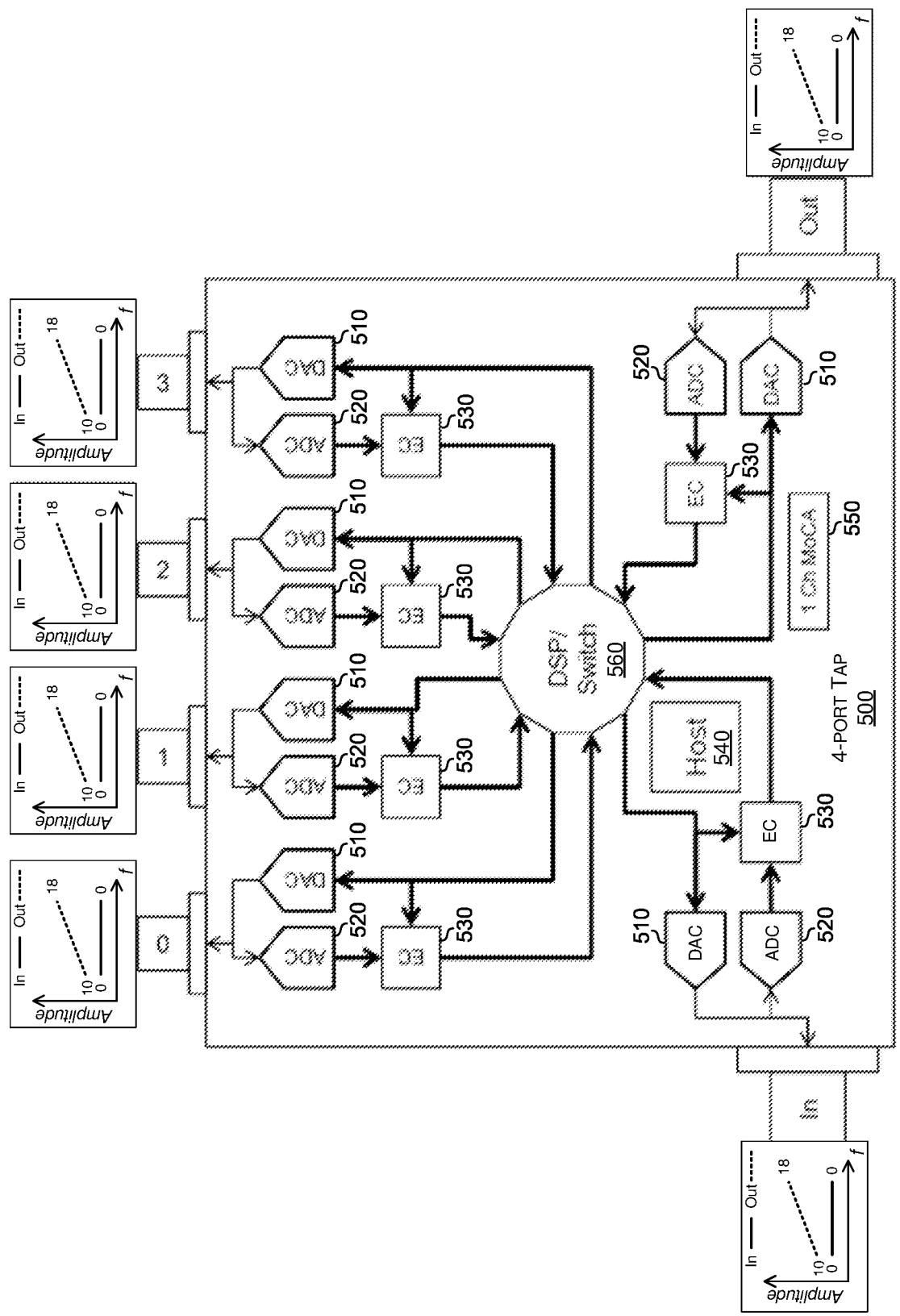
FIG. 7A illustrates use of an example N-port ideal tap.

FIG. 7A illustrates use of an example N-port ideal tap. Shown in FIG. 7A is an ideal tap in accordance with the present disclosure (specifically, an instance of the ideal tap 500 described with respect to FIG. 5, for example).

Illustrated in FIG. 7A are characteristics of input and output signals of ideal taps during use (e.g., in cable networks). In this regard, target input power spectral density (PSD) to all ports in the ideal tap is around 0 dBmV flat (but this may vary based on cable length), and in response to such target inputs, output PSD on all ports may be 10 dBmV to 18 dBmV (however, this may be scaled based on cable length and total frequency span of the system). The output on each port may be directly driven from a DAC with the need for little to no additional amplification or an isolation amp may be used that has little or unity gain.

Figure 7B:
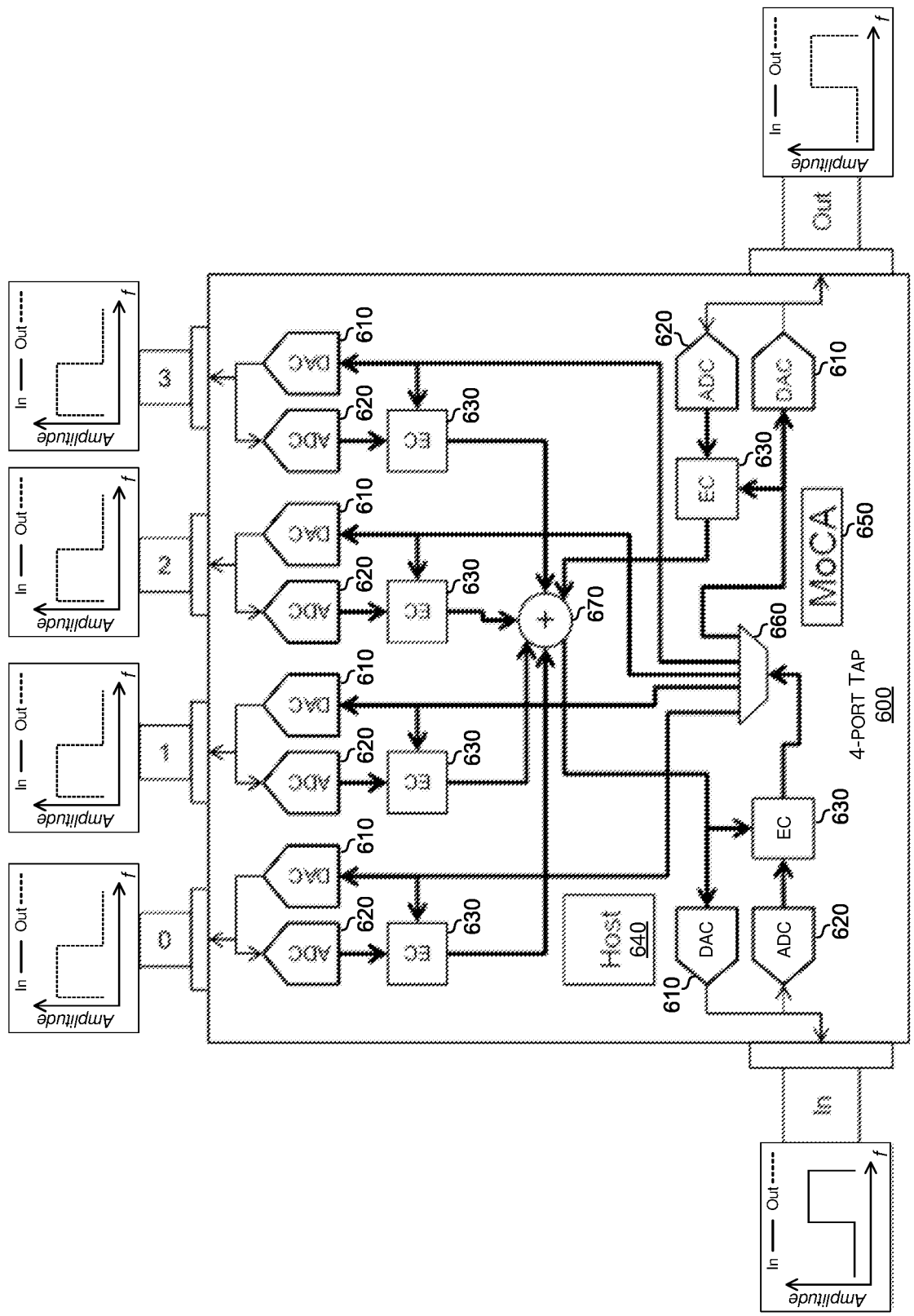
FIG. 7B illustrates use of an example N-port ideal tap to provide frequency shift spectrum.

FIG. 7B illustrates use of an example N-port ideal tap to provide frequency spectrum shift. Shown in FIG. 7B is an ideal tap in accordance with the present disclosure (specifically, an instance of the ideal tap 600 described with respect to FIG. 6).

Illustrated in FIG. 7B is use of ideal taps (e.g., in cable networks) to provide frequency spectrum shift. In this regard, a portion of the frequency spectrum may be down-converted or up-converted. For example, in the particular use scenario shown in FIG. 7B, the input signal into the in-port (i.e., signal coming into the tap) may be a high frequency signal.

The ideal tap may be configured (e.g., by adjusting functionality or control parameters applicable in each of the switching paths) such that this input signal may be down-converted to low frequency signals for one or more of the tap drop-ports (e.g., tap drop-ports 0-3 in the particular implementation shown in FIG. 7B), whereas the signal propagated from the out-port may remain similar to the input signal.

The capability to provide frequency spectrum shift may be utilized, for example, for a frequency stacking system. In this regard, use of frequency spectrum shift may allow ensuring that full band leaves the node, with a different portion of the band being consumed by each of the different taps. Thus, multiple 5-1218 MHz HFC systems for example, may ride on the same trunk cable. In this regard, each of these HFC systems may be up-shifted at the node and downshifted at participating ports. Further, HFC service groups (SGs) may be decoupled from nodes and the physical layout of the coaxial portion of the HFC system.

Figure 8A:
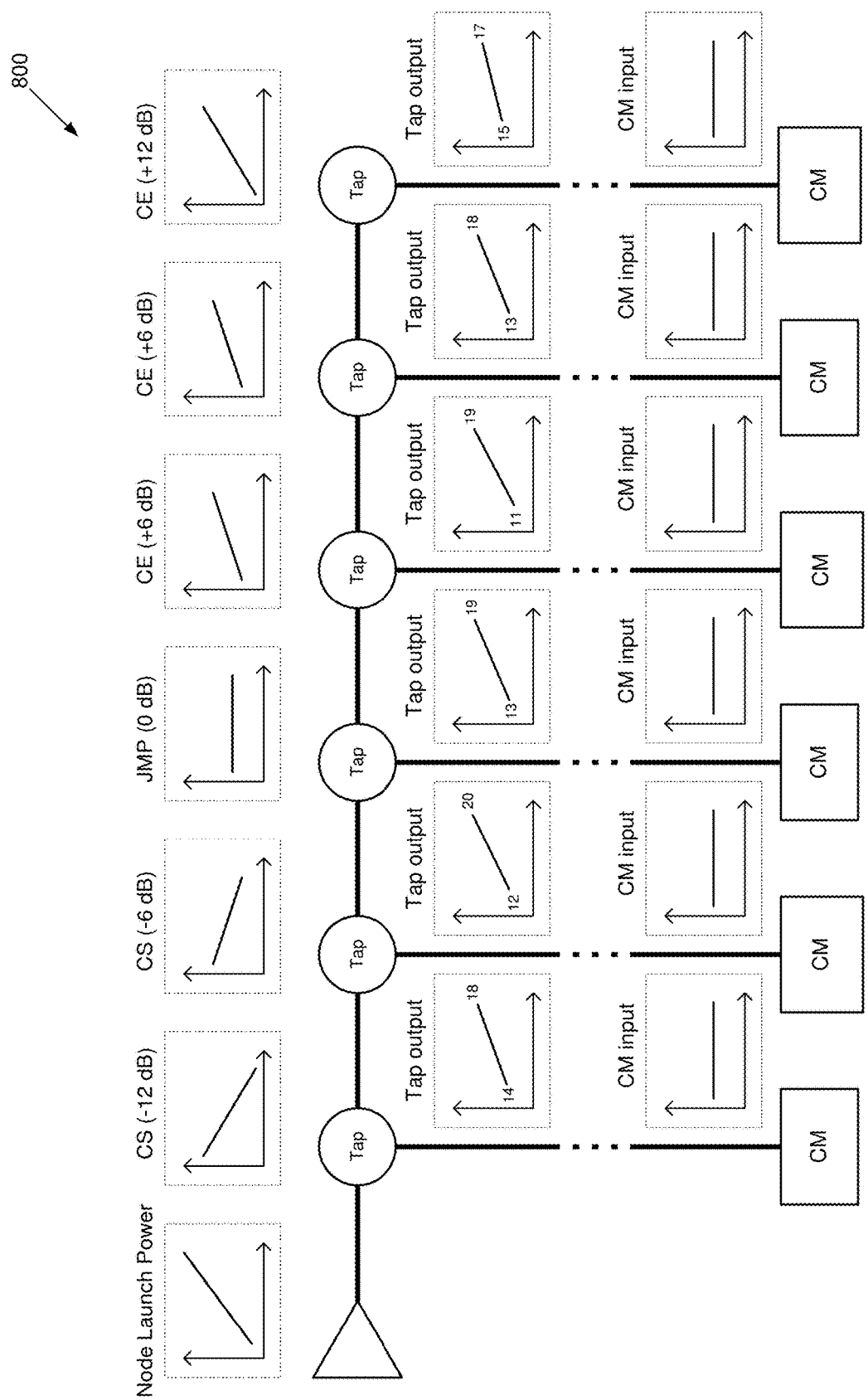
FIGS. 8A and 8B illustrate example modifications in coax design when utilizing ideal taps instead of existing taps.
Figure 8B:
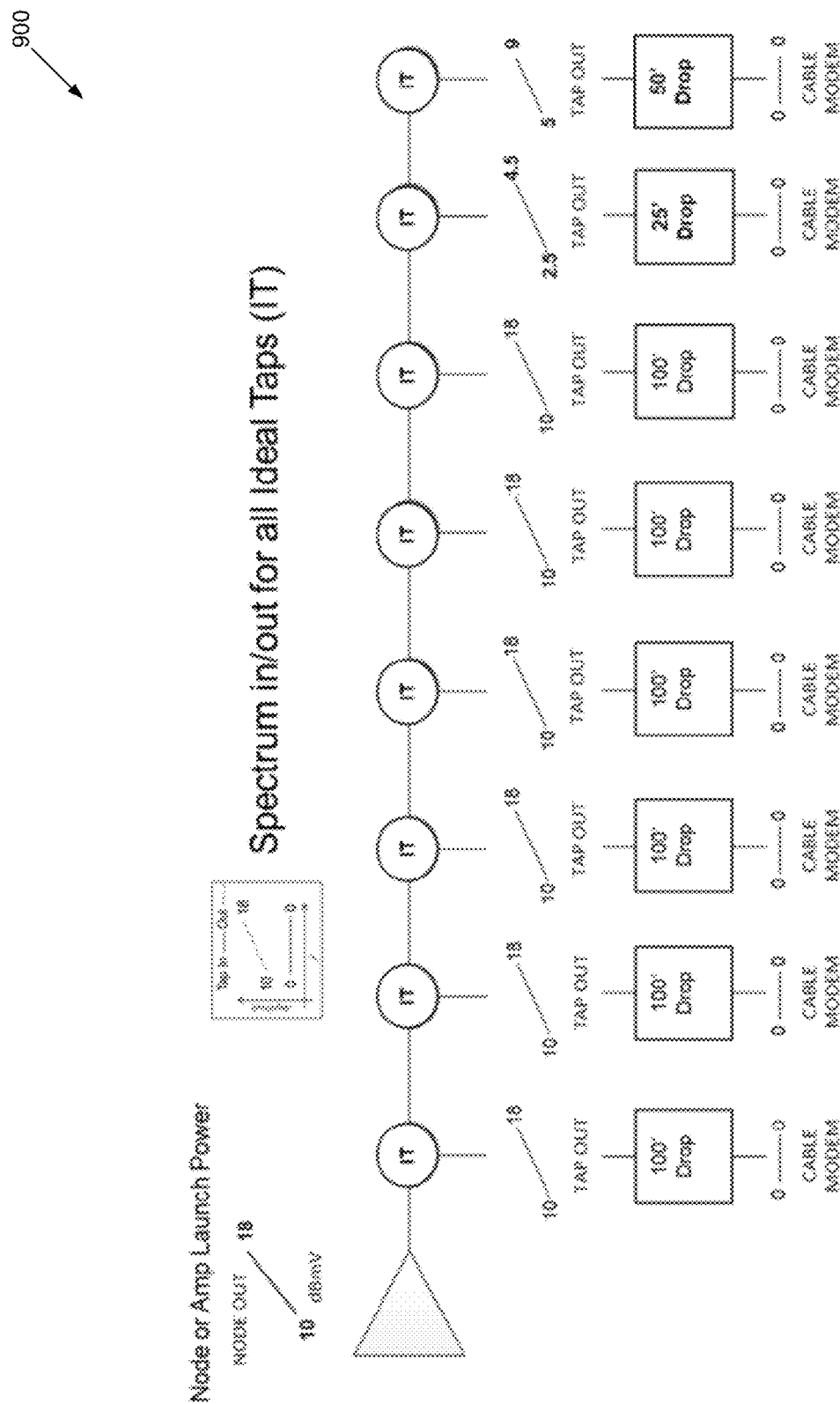

FIGS. 8A and 8B illustrate example modifications in coax design when utilizing ideal taps instead of existing taps. Shown in FIGS. 8A and 8B are example cable setups 800 and 850, respectively. In this regard, cable setup 800 represents an example setup when traditional cable designs are utilized whereas cable setup 850 represents re-implementation of the same setup (e.g., providing similar performance as far as the cable modems (CMs) of the network are concerned) when using an ideal taps based design.

As illustrated in FIG. 8A, in cable setup 800, because the taps used therein are not ideal taps, the setup design must account for coaxial losses, such as by compensating through equalization at the nodes (or amplifiers). Further, some of the taps would have to incorporate different equalization modules or plug-ins—e.g., cable simulators (CS) plug-ins in taps where negative equalization is needed; cable equalizers (CE) plug-ins in taps where positive equalization is needed; and jumpers (JMP) plug-ins in taps requiring flat response (thus no adjustment).

As illustrated in FIG. 8B, due to the use of an ideal taps based design, the need for compensating at the nodes (or amplifiers), and for the need to use various equalization modules or plug-ins in the cable setup 850 is eliminated. Instead, because the characteristics of the ideal taps used in cable setup 850, each tap can be identical regardless of its position in the cable network, and yet the outputs across the whole setup are uniform resulting in the same inputs to the CMs from each tap.

Figure 9:
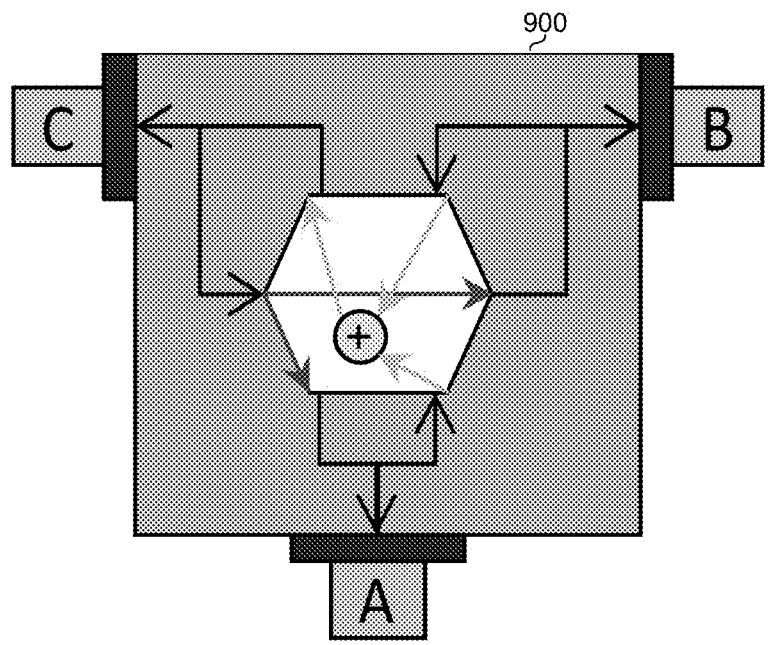
FIG. 9 illustrates example signal forwarding configurations in 3-port and 4-port ideal taps.
Figure 9:
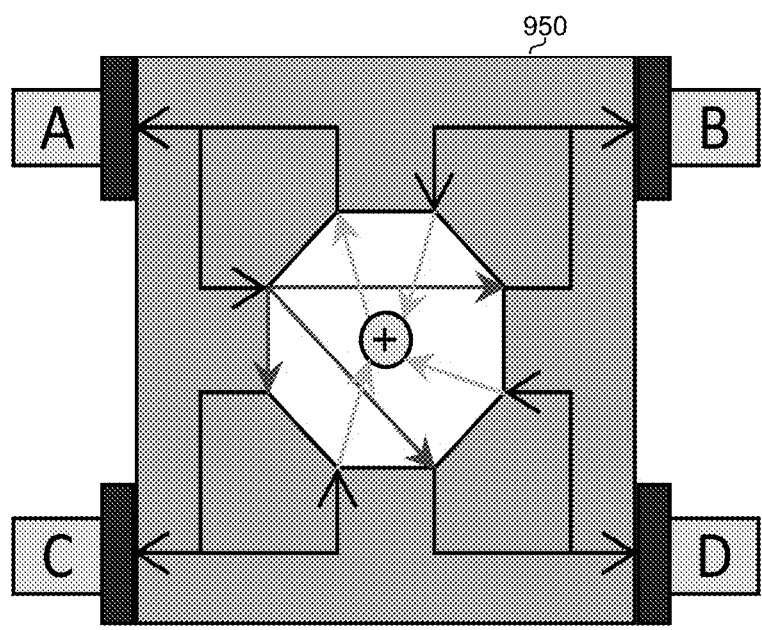

FIG. 9 illustrates example signal forwarding configurations in 3-port and 4-port ideal taps. Shown in FIG. 9 are 3-port ideal tap 900 and 4-port ideal tap 950.

In this regard, each of the ideal tap 900 and 4-port ideal tap 950 may be substantially similar to the ideal tap 500 described with respect to FIG. 5 for example. Each port of the ideal tap 900 and 4-port ideal tap 950 may be configured to operate in particular manner (e.g., input port, output port, or drop port) within a cable plant. For example, as shown in FIG. 9, in the 3-port ideal port 900, port C is configured as an input port and ports A and B configured as output ports. Port A may also be a drop port. In example operation, signals from port C may be replicated to ports A and B, and signals from ports A and B are summed and the sum is sent out into/through port C. As shown in FIG. 9, in the 4-port ideal port 950, port A configured as a input port and ports B, C, and D are configured as output ports. In example operation, signals from port A may be replicated to ports B, C and D, and signals from ports B, C and D are summed and the sum is sent out port A.

Figure 10A:
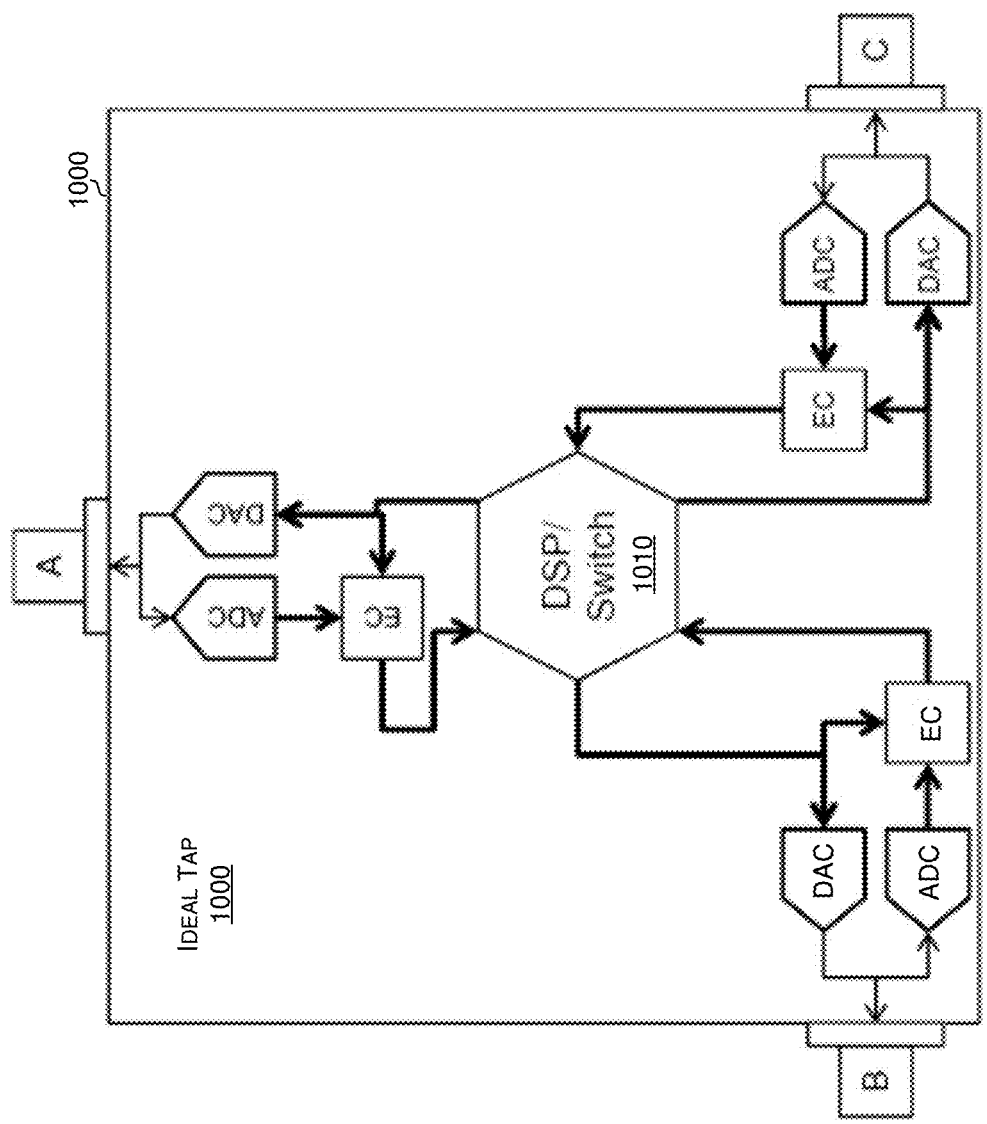
FIGS. 10A and 10B illustrate various example use scenarios of ideal taps when configured for operation as 3-port digital repeaters.
Figure 10B:
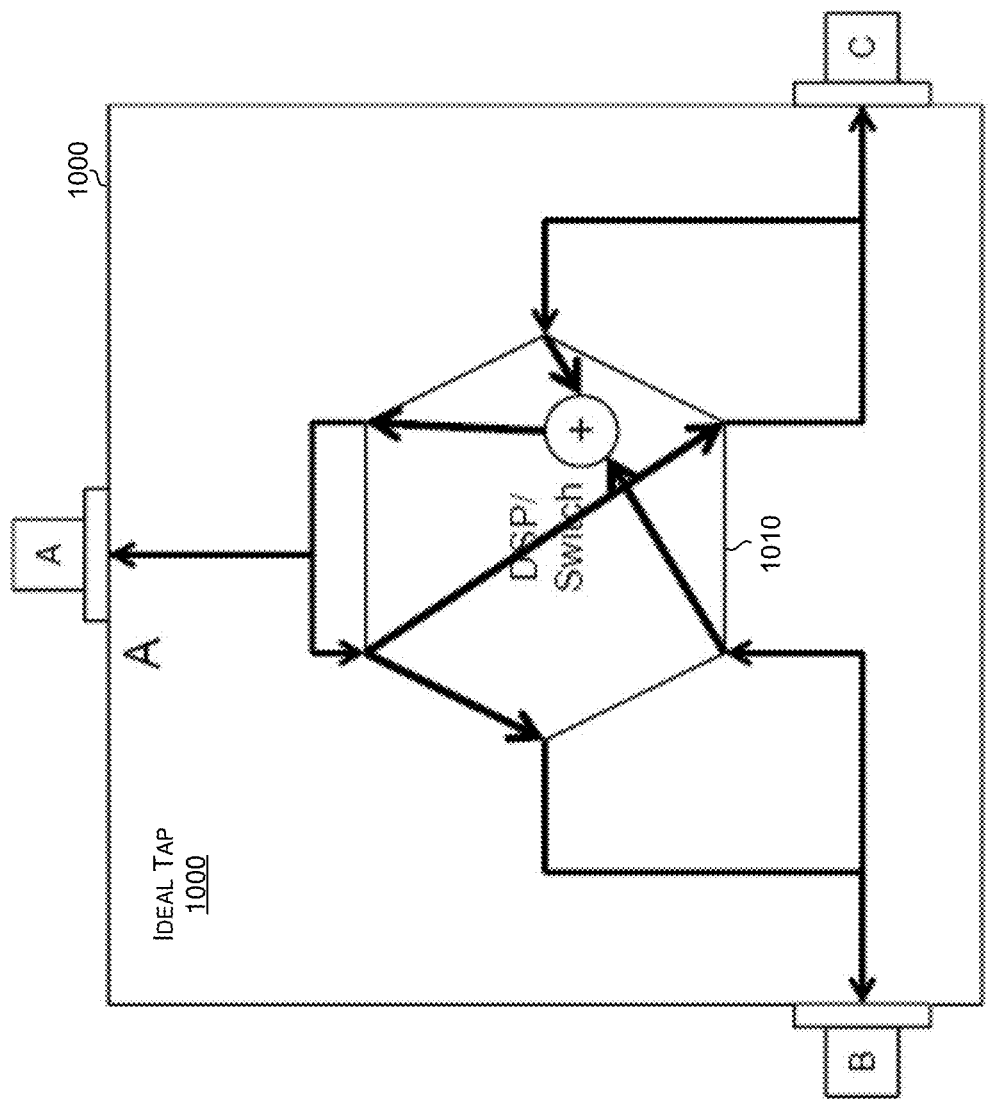

FIGS. 10A and 10B illustrate various example use scenarios of ideal taps when configured for operation as 3-port digital repeaters. Shown in FIG. 10A is an ideal tap 1000, in accordance with the present disclose.

In this regard, the ideal tap 1000 may be substantially similar to the ideal tap 500 described with respect to FIG. 5 for example. As illustrated in FIG. 10A, the ideal tap 1000 may be configured for operation as 3-port digital repeater. In this regard, three ports, A, B, and C may be assigned for use in the functions associated with use of the ideal tap 1000 as 3-port repeater. In this regard, input to each of the three ports may be digitized (e.g., via the corresponding ADC circuit), output of each of the three ports may be synthesized, and each port may be configured to cancel its own echo—e.g., using the corresponding EC circuit associated therewith. Further, the ideal tap 1000 may be operable to process signals handled when the ideal tap 1000 is operating as 3-port repeater. In this regard, the ideal tap 1000 may comprise a digital signal processor (DSP) 1010, which may be substantially similar to DSP/switch 560 described with respect to FIG. 5, which may be used in processing signals handled in the ideal tap 1000 during operations as 3-port repeater.

In operation, the ideal tap 1000 when configured as a 3-port repeater may be operable to perform all the functions associated with 2-port repeater configuration, as described in, for example, U.S. patent application Ser. No. 16/000,491, filed Jun. 5, 2018, U.S. patent application Ser. No. 16/128, 213, filed Sep. 11, 2018, and U.S. patent application Ser. No. 16/659,170, filed Oct. 21, 2019. However, the 3-port repeater configuration may allow for additional functions. For example, the 3-port repeater configuration may allow for replication with 0 loss or gain—that is, the ability to send signals from the input of one port to both of the other ports at the same level or greater than the level at which the signals were received. Further, the 3-port repeater configuration may allow for summing of the inputs from multiple ports and outputting of that sum to one or more ports. These added features, and others, are described in more detail below.

FIG. 10B illustrates an example use scenario of the ideal tap 1000 when configured as 3-port repeater. In this regard, as noted above, the 3-port repeater configuration may allow for sending signals from the input of one port (referred to as "common port") to both of the other ports, and/or for outputting the sum of inputs from multiple ports from such common port. In the example use shown in FIG. 10B, port A may be assigned as common ports. Thus, input of (signals received at) port A are sent to both of port B and port C for outputting therefrom. On the other hand, inputs of both of port B and port C are summed and sent to port A for outputting therefrom.

Thus, during operation, high isolation is provided between port B and port C—e.g., input at port C not sent to port B and input at port B not sent to port C. Such arrangement may result in various improvements. For example, no 3 dB splitting or combining loss may occur. Further, gain may be applied, adaptively in various paths—e.g., port A→port B, port A→port C, and port B+port C→port A. While port A is the common port in the example use scenario shown in FIG. 10B, this is not always required. Thus, any one of the three ports (port A, port B, and port C) may be assigned as the common port, and this assignment need not be fixed (e.g., the common port can be different in time), and the common port may be different in frequency, Further, there may be isolation between the non-common ports can vary vs. frequency and time.

In some instances, particular transmission and/or reception criteria may be assigned to one or more of the ports—e.g., MoCA signals may be passed between port B and port C, but are not sent to port A.

Figure 11:
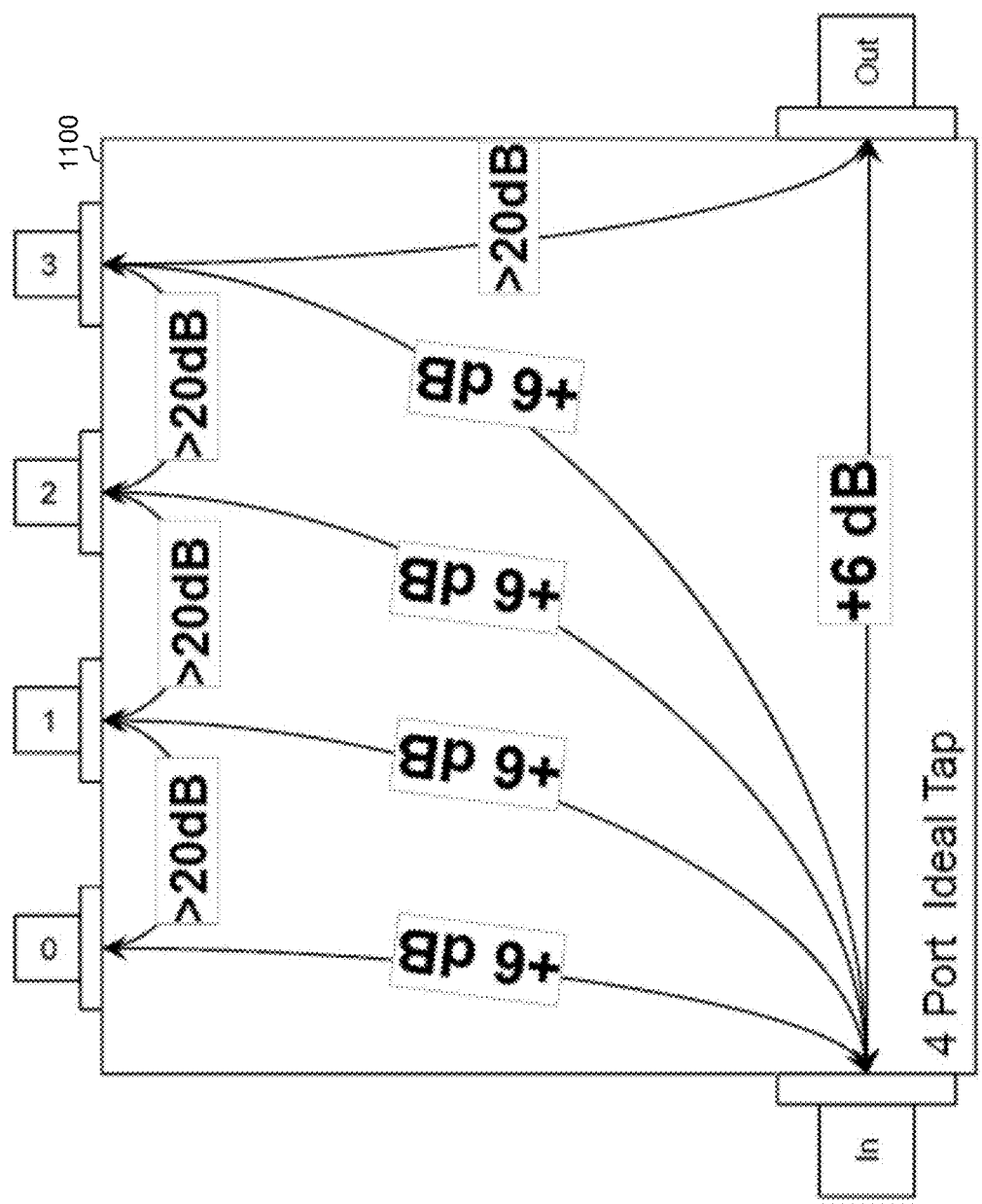
FIG. 11 illustrates a performance profile of an example N-port ideal tap in accordance with an example embodiment of the present disclosure.

FIG. 11 illustrates a performance profile of an example N-port ideal tap in accordance with an example embodiment of the present disclosure. Shown in FIG. 11 is an N-port (e.g., 4 ports, as shown in FIG. 11) ideal tap 1100.

The ideal tap 1100 may comprise suitable circuitry for providing tap-related functions in cable networks, such as, for example, allowing coupling of CPEs to coax cable networks (particularly to the trunk coax portions). As shown in FIG. 11, the ideal tap 1100 is a 4-port tap—that is, one with 6 ports: an "in" port (or "in-port"), an "out" port (or "out-port"), and 4 "drop" ports (or "drop-ports"). In this regard, the drop-ports are used for coupling CPEs into the coax network. Nonetheless, it should be understood that the disclosure is not limited to the use of 4 drop-ports, and that different number of drop-ports can be used in different implementations. Similarly, it should be understood that the disclosure is not limited to a single in-port and/or single out-port based implementations, and as such some implementations may incorporate use of multiple in-ports and/or multiple out-ports, which may enable connecting different legs of the coaxial plant.

In particular, the ideal tap 1100 may be designed and configured as an "ideal" tap—that is, one having characteristics that provide ideal performance, and thus overcoming at least some of the limitations and/or issues noted above with respect to traditional coax design. Thus, the ideal tap 1100 may be substantially similar to the ideal tap 400 of FIG. 4, and as such may operate in a substantially similar manner. The ideal tap 1100 may be implemented in accordance with a design that is based on characteristics that allow overcoming inherent losses in a cable network, without requiring use of amplifiers and/or diplexers in the networks, as is done in legacy solutions.

For example, in accordance with this example embodiment, the ideal tap may be configured such that it has flat band pass up to 1.2 GHz, at ~55 dB MER (resulting, e.g., in total composite power of ~+50 dBmV), with isolation of >20 dB between drop-ports and/or between the drop tap and the out-port, and with return loss of >20 dB for the in-port, out-port, and drop-ports. In addition, the ideal tap in accordance with this example embodiment may have an in-to-drop (e.g., from the in-port to any of the 4 drop-ports, and vice versa) 6 dB gain and 4 dB up-tilt (e.g., 100 MHz-1 GHz), which may allow overcoming loss in an upstream trunk cable (e.g., 100 to 200 feet), but not drop cable (e.g., 50 to 150). The ideal tap in accordance with the alternate design may also have an out-to-in (e.g., from the out-port to the in-port, and vice versa) with a similar profile—that is, with 6 dB gain and 4 dB up-tilt (e.g., 100 MHz-1 GHz), which may allow overcoming loss in an upstream trunk cable (e.g., 100 to 200 feet). Further, the ideal tap in accordance with this example embodiment supports disabling/enabling ports remotely, and may be able to communicate information related to itself (e.g., status, metrics, etc.). An example implementation of an ideal tap based on this example embodiment is described with respect to FIG. 12.

Figure 12:
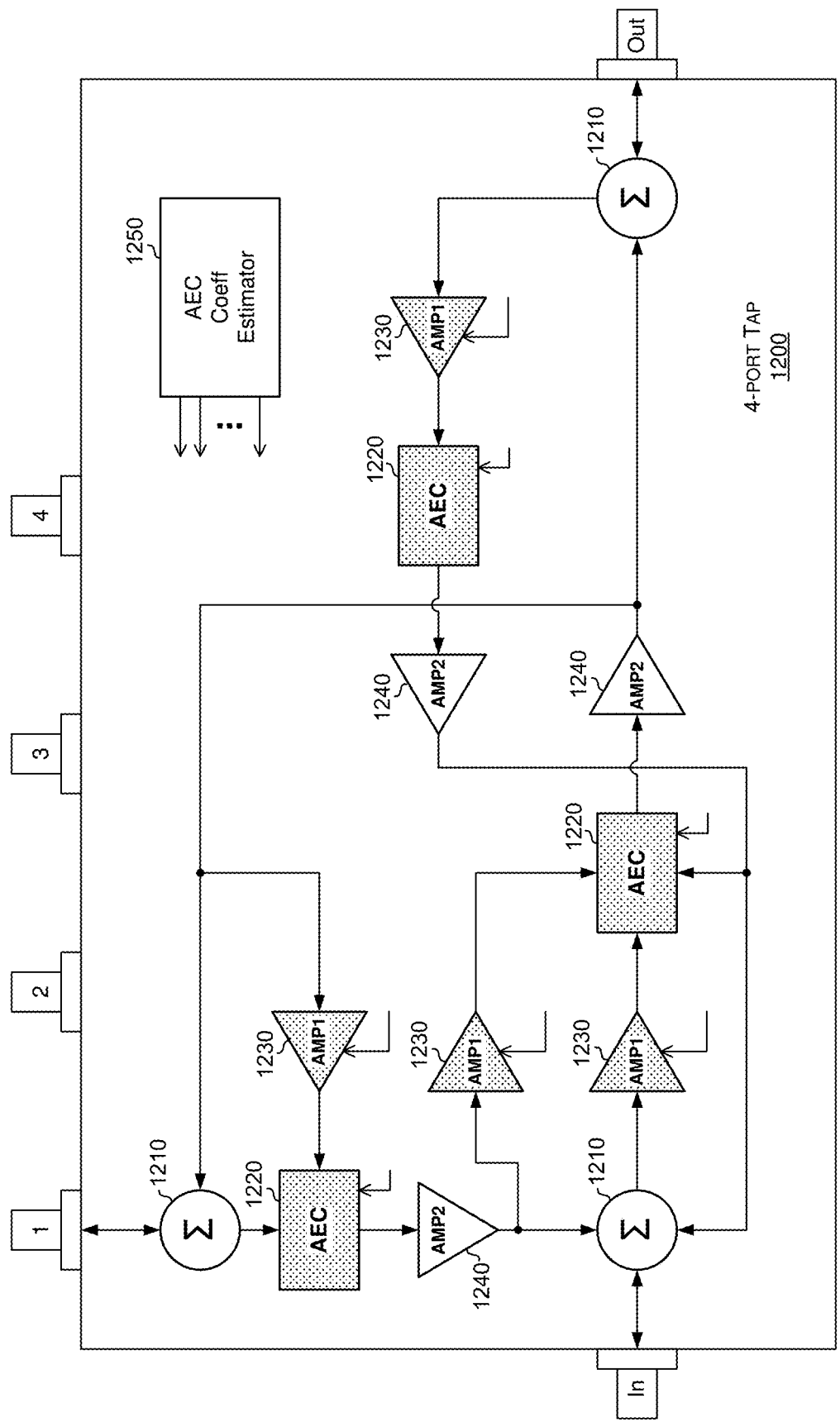
FIG. 12 illustrates an example implementation of an N-port ideal tap in accordance with the example embodiment shown in FIG. 11.

FIG. 12 illustrates an example implementation on an N-port ideal tap in accordance with the alternate design described in FIG. 11. Shown in FIG. 12 is an N-port (e.g., 4-port as shown in FIG. 12) ideal tap 1200.

The ideal tap 1200 may comprise suitable circuitry for providing tap-related functions in cable networks, and to particularly do so as an "ideal" tap in accordance with the example embodiment described above with respect to FIG. 11, for example. As with the ideal tap 1100, the ideal tap 1200 is also shown as a 4-port tap—that is, with an in-port, an out-port, and 4 drop-ports (numbered as port 1 through port 4).

The ideal tap 1200 may comprise various circuits for use in conjunction with reception and transmission of signals each of the ports, such as summation circuits 1210, analog echo cancelation (AEC) circuits 1220, amplifier/first type (AMP1) circuits 1230, and amplifier/second type (AMP2) circuits 1240, which may be arranged in the manner shown in FIG. 12. In this regard, shown in FIG. 12 are only (some of the) circuits used between the in-port, output-port, and the first drop-port (port-1) within the ideal tap 1200. Nonetheless, it should be understood that similar circuit layout(s) may be used for the remaining drop-ports). Further, the ideal tap 1200 comprises an AEC coefficient estimator 1250.

The AEC circuits 1220 are operable to cancel echo. In this regard, the AEC circuits 1220 may be arranged within the ideal tap 1200 to ensure cancelling echoes for each for the ports, as echoes do not propagate and thus echo only needs to be accommodated—e.g., for at most 250' of cable. Each of the AMP1 circuits 1230 and the AMP2 circuits 1240 may be operable to amplify signals. However, these amplifier circuits may have different amplification profiles. For example, each AMP1 circuit 1230 may be configured to provide 0 dB gain and ~50 dB reverse isolation, whereas each AMP2 circuit 1240 may be configured to provide ~6 dB gain, 4 dB tilt, and ~50 dB reverse isolation. Accordingly, as shown in FIG. 12, the ideal tap 1200 may exhibit the characteristics described above.

While not shown in FIG. 12, the ideal tap 1200 may comprise additional circuits, such as host/main processor(s), signal processing circuit(s), communication (e.g., Multimedia over Coax Alliance (MoCA)) controller(s), Cable Modem, etc. For example, the host/main processor(s) may comprise suitable circuitry for managing and controlling the tap 1200 and operations thereof; the signal processing circuit(s) may comprise suitable circuitry for performing signal processing functions (if needed) in the ideal tap 1200; and the communication controller(s) may comprise suitable circuitry for handling communication (e.g., in accordance with MoCA standards, such as using 1 channel, or in accordance with the DOCSIS standard) other than the US and DS cable signals being handled via the ideal tap 1200.

The AEC circuits 1220 and the AMP1 circuits 1230 may be controllable—e.g., having one or more operational parameters that are configurable and/or adjustable. In this regard, the AEC circuits 1220 and the AMP1 circuits 1230 may be controlled via the AEC coefficient estimator 1250, which may generate control signals that allow adjusting the AEC circuits 1220 and the AMP1 circuits 1230 (e.g., adjusting the coefficients used in echo cancellations, and/or the gain, etc., characteristics of the AMP1 circuits 1230).

In this regard, the AEC coefficient estimator may be used to enable echo cancellation training, which may be required as the tap does not generate US or DS signals, and thus may need to determine clean copies. For example, for the downstream (DS) echo cancellation coefficient estimation, US silent periods may be utilized when DS echo cancellation is trained (e.g., utilizing signaling of quiet period from CCAP (Converged Cable Access Platform) Core to the tap using out-of-band/narrowband (OOB/NB) channel(s)). Alternatively, DS pilot signals may be utilized, such as for continuous tracking of DS echo cancellation. The upstream echo (US) canceller coefficient estimation may be done after DS echo cancellation is fully trained, as this may ensure that DS signals are fully cancelled, thus ensuring that the residual signal(s) may be upstream only. In some instances, there may be coefficient convergence and stability criteria related considerations. In this regard, amplification in both US/DS directions may have potential for closed loop instability.

Figure 13:
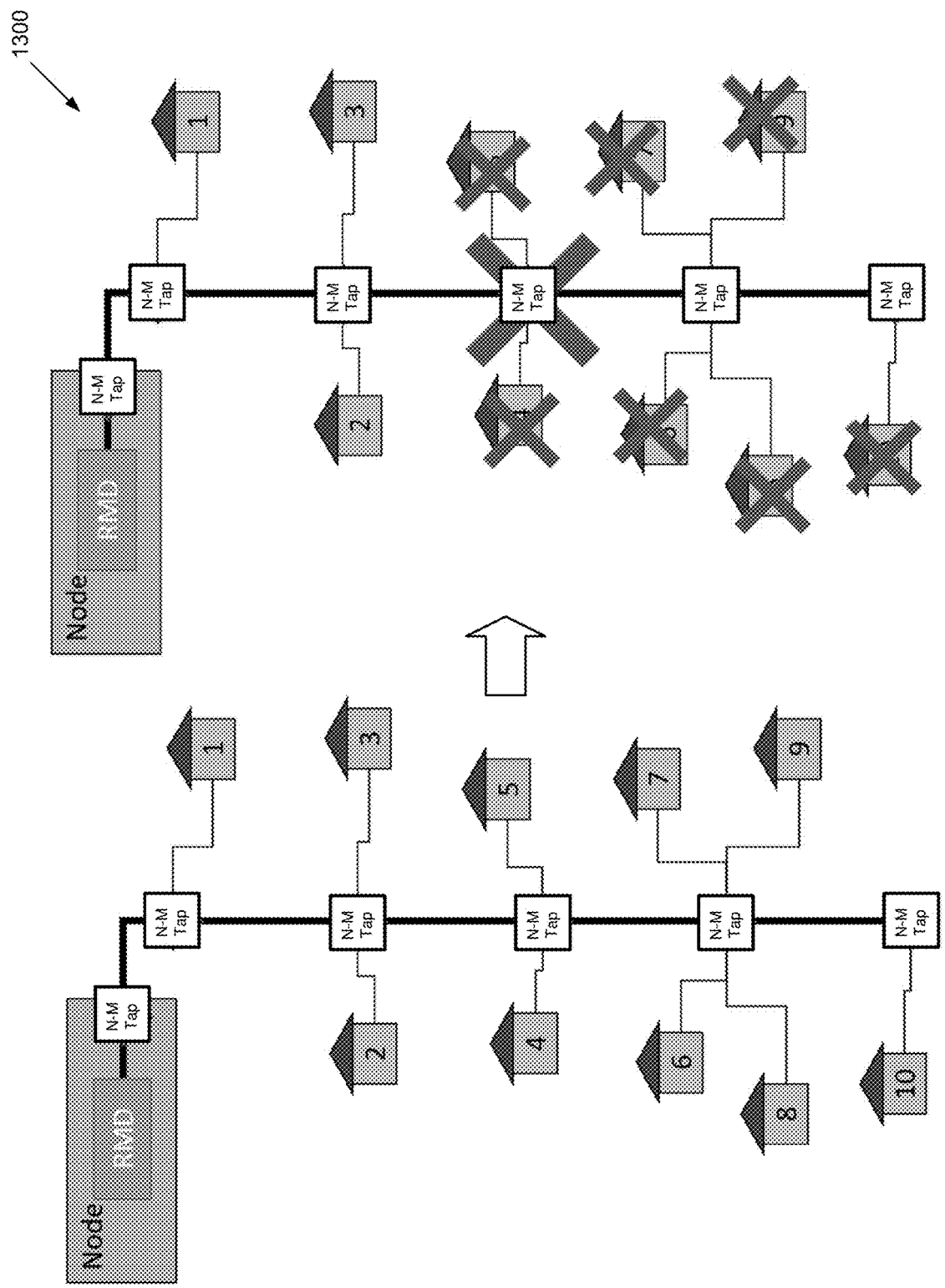
FIG. 13 illustrates an example cable network incorporating ideal taps, and an example outage scenario therein.

FIG. 13 illustrates an example cable network incorporating ideal taps, and an example outage scenario therein. Shown in FIG. 13 is a portion of a cable network 1300 incorporating taps. In particular, the portion shown in FIG. 13 comprises a cable distribution node (e.g., hybrid fiber-coaxial (HFC) based node) providing and/or supporting cable communications with a plurality of locations (e.g., residences) via cable plant that incorporate a number of N-M taps—that is, taps with 'N' drop ports, 'M' trunk ports. In this regard, the node may comprise a Remote MAC-PHY Device (RMD) module for supporting and/or facilitating the upstream/downstream cable communications. Each of the locations may incorporate one or more user equipment (e.g., customer-premises equipment (CPE)). The N-M taps may be ideal taps, substantially similar to any of the ideal taps described above.

The topology of the cable networks may make them susceptible to issues occurring or affecting particular elements therein that may also affect other parts of the networks that may otherwise operate normally. For example, as illustrated in FIG. 13, removal or failure of a particular tap may have significant effects on the network 1300 as a whole as it may impact subscribers served directly by the affected tap (e.g., at locations (e.g., homes) connected directly to the tap), as well as all subscribers located sequentially after the removed tap. For example, in the (portion of) network 1300 shown in FIG. 13, removal or failure of the marked tap would impact (e.g., discontinue cable communications) with subscribers served directly by that tap (e.g., in locations/ homes 4 and 5) as well as all the subscribers located sequentially after that tap (e.g., in locations/homes 6-10), even though the taps to which these locations are connected are not removed and/or may remain fully operational.

Accordingly, in implementations in accordance with the present disclosure, various measures and/or techniques may be used to mitigate and/or overcome issues arising from outages and/or removal of taps within the cable system, particularly in a manner that may ensure continued service to (e.g., communications with) subscribers located sequentially after taps that are removed or suffer failure(s) affecting their operations.

In various example implementations, ideal taps in accordance with the present disclosure may incorporate components for providing connections between ports connecting sections of the network upstream (before) and downstream (after) the tap when the tap (or section thereof containing tap-related circuitry) is removed. Thus, such components may bridge connections within the tap's body between the ports connecting sections of the network 1300 upstream (before) and downstream (after) the tap in removal scenarios.

For example, the housing of ideal tap implemented in accordance with the present disclosure may incorporate a make-before-break circuit that allows for RF signals (and, optionally, AC or DC power) to pass to/from the input coaxial cable and the output coaxial. This may minimize or even eliminate downtime for taps and active devices such as RF amplifiers that are located after the tap in question. In some instances, ideal taps with a multi-port make-or-break circuit may be used. Further, in some instances, additional functions may be included or supported, beyond mere inclusion of a bridging (e.g., make-before-break) circuit. For example, in some implementations, an ideal tap with a make-or-break circuit may be further configured to provide signal boosting when ideal tap circuitry is removed.

Similarly, in various example implementations, ideal taps in accordance with the present disclosure may incorporate components for remedying and/or mitigating failures in the taps. In this regard, taps may fail such that signals and/or power is not passed from/to the input port and/or to/from the output port or ports. This may produce an outage at the homes located at the failed tap and homes located after the failed tap substantially in similar manner as when the tap is removed. For example, ideal taps in accordance with the present disclosure may incorporate components for providing connections between ports connecting sections of the network 1300 upstream (before) and downstream (after) the tap when the tap suffers failure that affects its operation. These components may be similar, and may operate in a similar manner as the make-before-break circuits described above.

Such components are referred to hereinafter as watchdog circuits. In this regard, a watchdog circuit may function substantially similar to the make-before-break circuit but would be different in that instead of being triggered by tap insertion or removal, it instead is triggered by tap operation. For example, when an ideal tap is functioning properly the watchdog circuit remains open, but when there is a failure or malfunction in the operation of the ideal tap, the watchdog circuit will close, providing bridging between the input port and output port(s). In some instances, ideal taps with multi-port watchdog cut-through may be used. Further, in some instances, additional functions may be included or supported, beyond mere bridging when failures occur. For example, an ideal tap with a watchdog circuit may be further configured to provide signal boosting when an ideal tap's watchdog circuit is triggered.

These features and example implementations related thereto are described in more detail below.

Figure 14A:
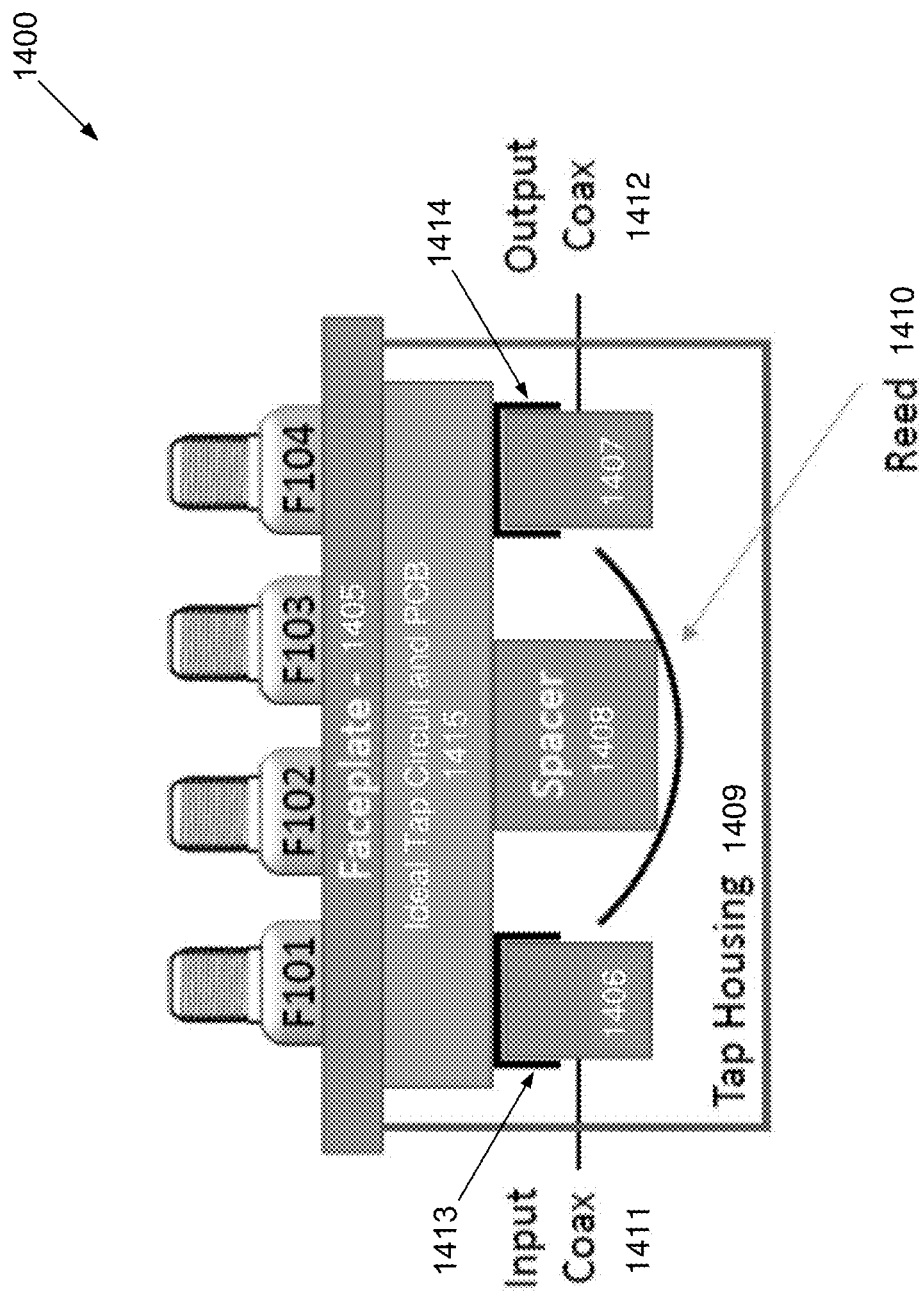
FIGS. 14A-14C illustrate an example N-M ideal tap incorporating make-before-break bridging component, and an example use scenario thereof.
Figure 14B:
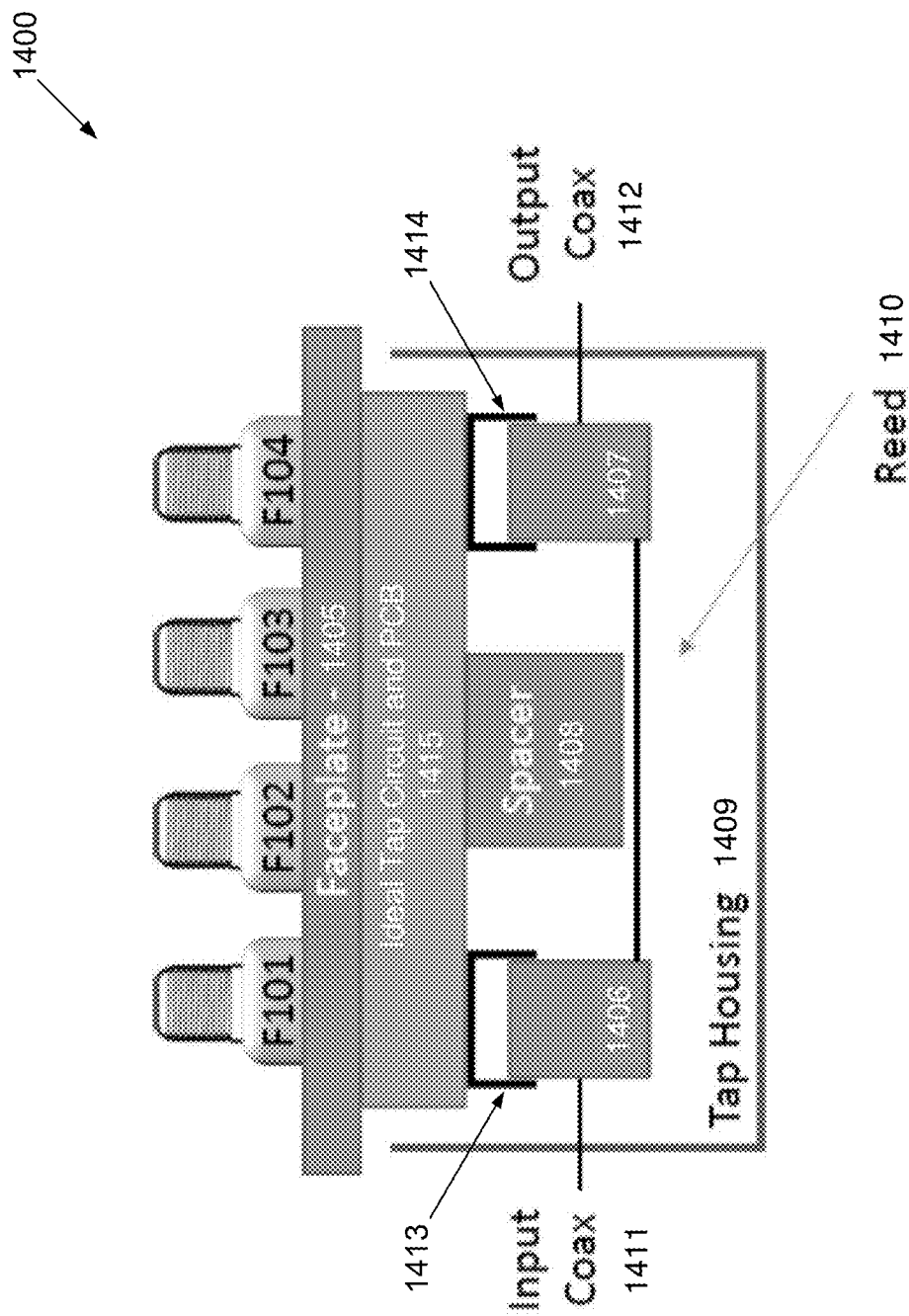
Figure 14C:
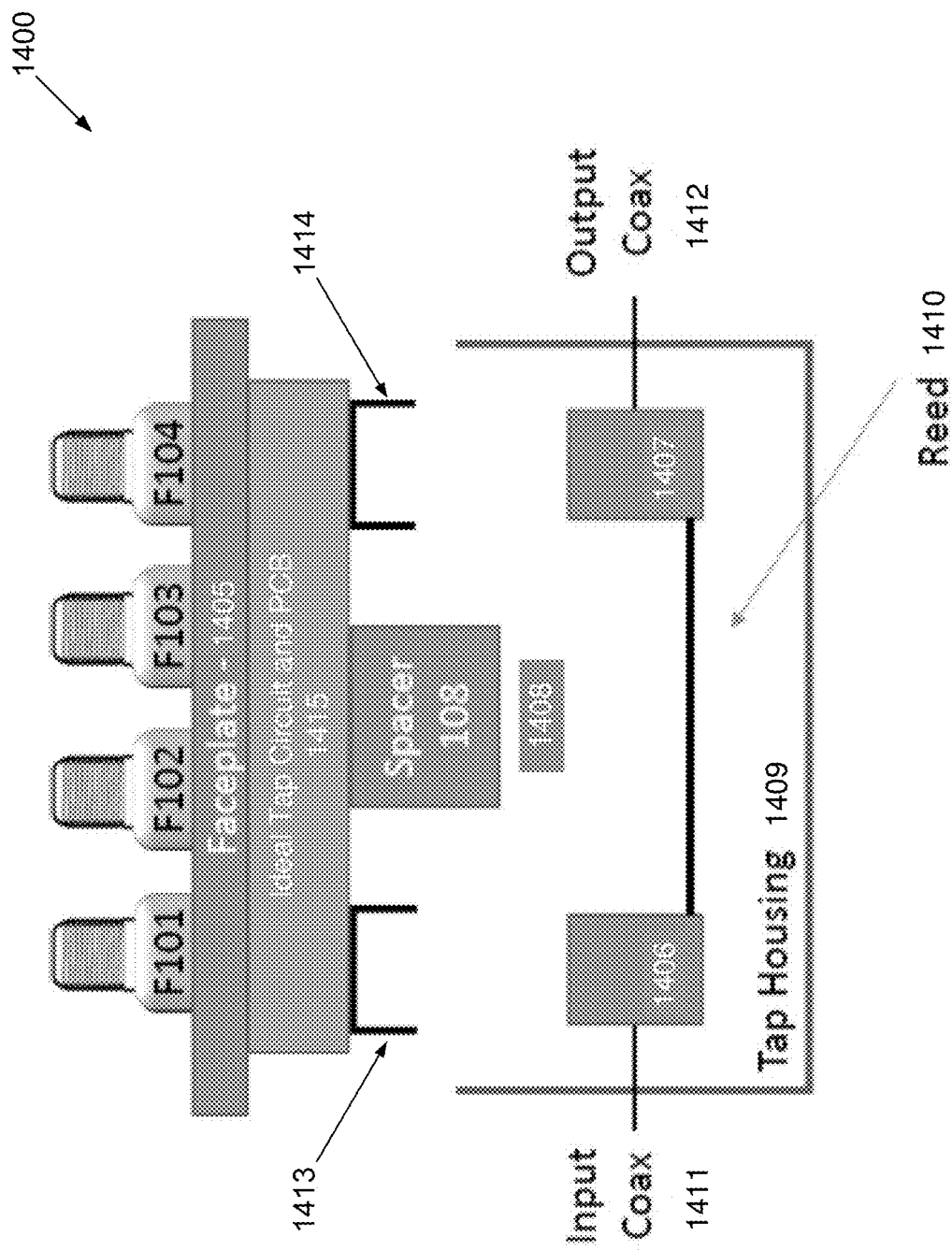

FIGS. 14A-14C illustrate an example N-M ideal tap incorporating a make-before-break bridging component, and an example use scenario thereof. Shown in FIGS. 14A-14C is an N-M (e.g., with 2 trunk ports and 4 drop ports in the particular example implementation shown therein) ideal tap 1400.

The ideal tap 1400 may be substantially similar to any of the ideal taps described above, but may additionally incorporate a make-before-break bridging component for connecting the input and output ports in removal situations, to ensure continued communication of cable signals via the tap (or, more specifically, via the tap's housing).

As shown in FIGS. 14A-14C, the tap 1400 comprises a tap housing 1409 and a corresponding faceplate 1405. The tap 1400 further comprises a stud 1406 that is electrically connected to an input coaxial cable 1411 via the tap housing 1409 and a stud 1407 that is electrically connected to an output coaxial cable 1412 via the tap housing 1409. The faceplate 1405 incorporates on one side an ideal tap circuit (e.g., printed circuit board (PCB) 1415, with 4 drop ports (F101-F104) on the other side. In this regard, the drop ports may provide drop connectivity—that is, with equipment in subscribers' homes connected to the drop ports.

The tap 1400 also comprises additional components configured for use in providing the make-before-break bridging, comprising spacer 1408 attached to the faceplate 1405 (on the interior side/face), sockets 1413 and 1414, and a reed 1410. The reed 1410 may comprise material that is electrically conductive—e.g., to both RF signals and AC and DC power. Further, the reed 1410 may be movable—e.g., by being constructed from flexible material such that it may bend or otherwise change shape. The disclosure is not so limited, however, and other approaches for facilitate changes in positioning or shape of the reed 1410 as described hereinafter may be achieved.

Shown in FIG. 14A is the tap 1400 when fully assembled. In this regard, when the faceplate 1405 is fully assembled within/into the tap housing 1409, the spacer 1408 presses down on the reed 1410 such that reed 1410 is not electrically connected to studs 1406 and 1407. The ideal tap circuit 1405 is electrically connected to sockets 1413 and 1414, which in turn are electrically connected to studs 1406 and 1407 when the faceplate 1405 is attached—that is, fulling assembled into the tap housing 1409. Thus, drop ports F101-F104 may be coupled to the network, and thus receive RF signals received from the input coaxial cable 1411 via the ideal tap circuit 1415 (and forwarding upstream RF signals in similar manner) to facilitate provision of service to homes connected to the drop ports F101-F104.

Shown in FIG. 14B is the tap 1400 when partially disassembled. In this regard, as the faceplate 1405 is removed from the tap housing 1409, the spacer 1408 rises and moves away from the reed 1410, thus removing the downward pressure applied on the reed 1410 when the tap 1400 is fully assembled. Thus, the reed 1410 may expand and make an electrical connection between studs 1406 and 1407. As noted, the reed 1410 may be made of material that is electrically conductive to both RF signals and AC and DC power. The reed 1410 may have sufficient power passing capability for the load of the system. However, the ideal tap circuit 1415 is momentarily still in electrical contact with studs 1406 and 1407 after the reed 1410 makes electrical connections to studs 1406 and 1407.

Shown in FIG. 14C is the tap 1400 when fully disassembled. In this regard, as the faceplate 1405 continues to be removed the ideal tap circuit 1405 is completely disconnected from studs 1406 and 1407. RF signals are no longer coupled to drop ports F101-F104, and as such subscribers served via (e.g., connected to) these drop ports will lose service while the faceplate 1405 is disconnected from the tap housing 1409. However, RF signals and AC and/or DC power may continue to pass through the tap housing 1409, being communicated between the input coaxial cable 1411 and output coax cable 1412 via the studs 1406 and 1407, and the reed 1410 when the faceplate 1405 is removed.

Figure 15:
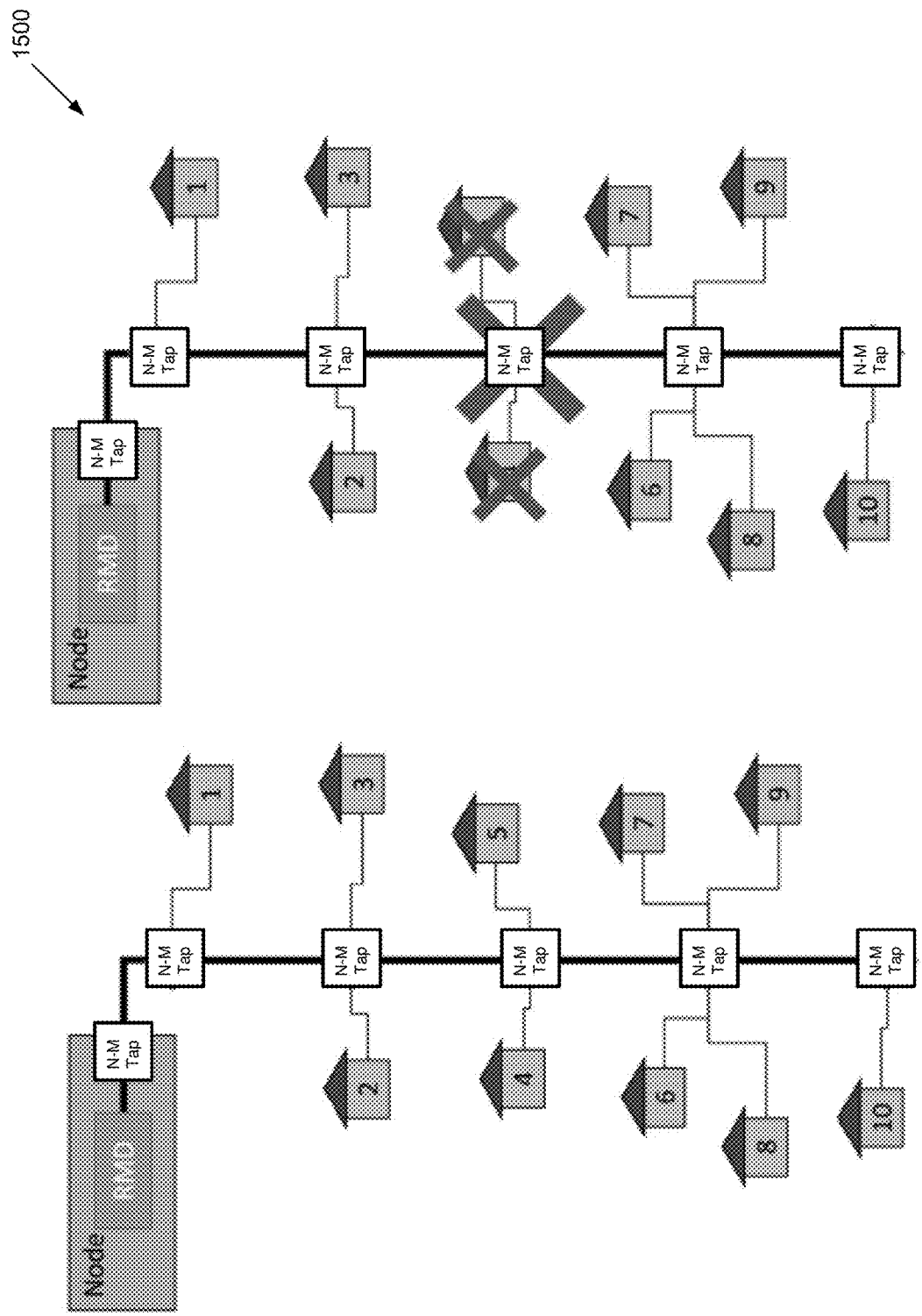
FIG. 15 illustrates an example cable network incorporating ideal taps with make-before-break circuits, and an example outage scenario therein.

FIG. 15 illustrates an example cable network incorporating ideal taps with make-before-break circuits, and an example outage scenario therein. Shown in FIG. 15 is a portion of a cable network 1500 incorporating ideal taps. In this regard, the network 1500 illustrated in FIG. 15 is similar to the network 1300 shown in and described with respect to FIG. 13 for example. However, the N-M ideal taps used in the network 1500 may be configured to, and may incorporate make-before-break bridging. For example, the N-M ideal taps of the network 1500 may be substantially similar to the ideal tap 1400 as described with respect to FIGS. 14A-14C for example. Accordingly, effects of removal of taps in the network 1500 may be mitigated compared to the networks not using taps with make-before-break bridging. Thus, with reference to the same use scenario shown in FIG. 13, while removal of a particular tap would impact subscribers served directly by that tap (e.g., in locations/homes 4 and 5), subscribers located sequentially after that tap (e.g., in locations/homes 6-10) would not be impacted as signals to/from these subscribers may continue to pass through the bridging connection in the tap's housing, as described with respect to FIG. 14C, for example.

Figure 16:
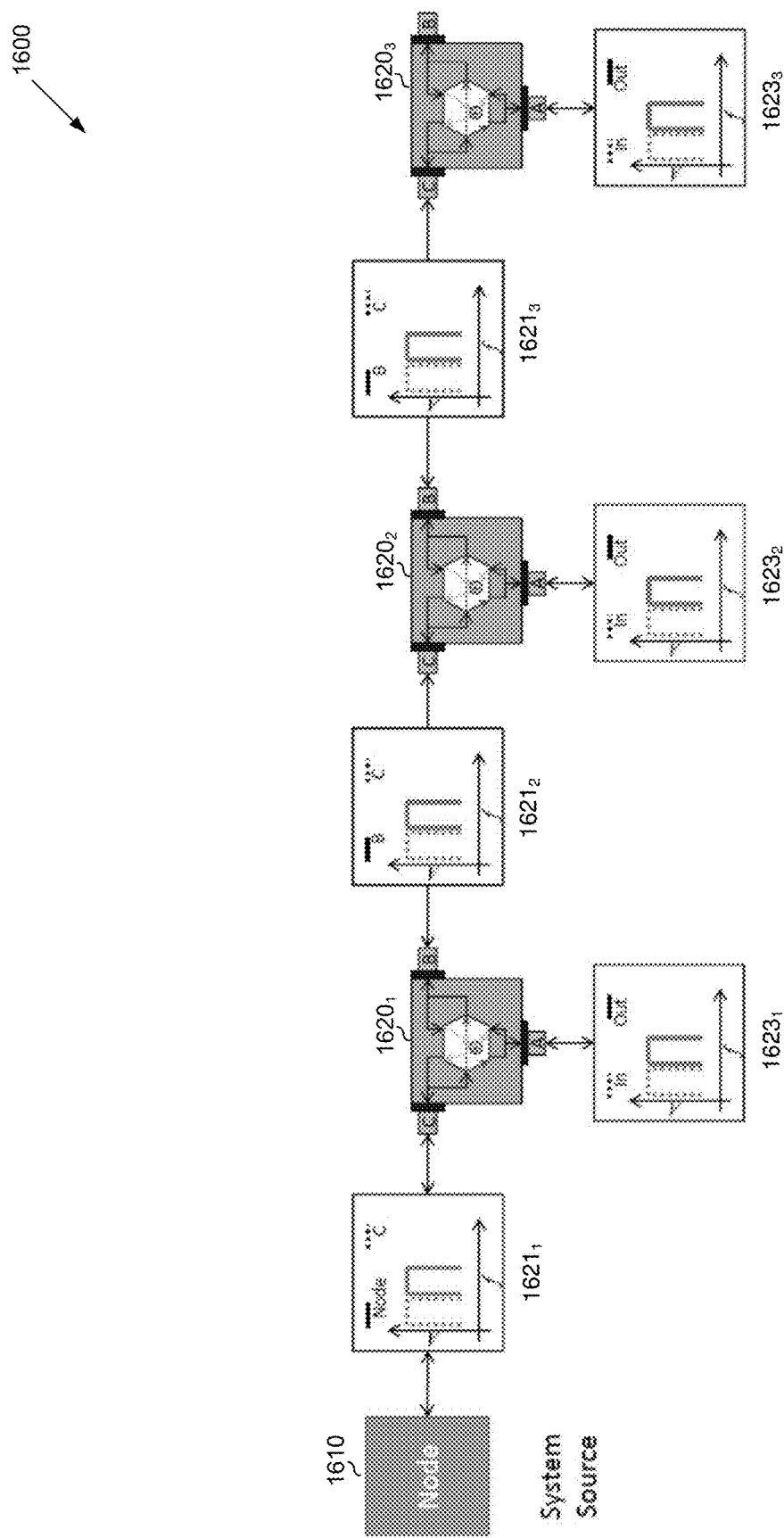
FIG. 16 illustrates an example cascade of ideal taps in a cable network.

FIG. 16 illustrates an example cascade of ideal taps in a cable network. Shown in FIG. 16 is portion of cable network 1620, comprising three ideal taps 1620$_1$-1620$_3$ coupled sequentially—that is, as a cascade, and cable node 1610.

Each ideal tap 1620 may be substantially similar to the ideal taps described above. As shown in FIG. 16, each ideal tap 1620 may be a 3-port tap, configured as 3-port repeater, with one of the 3 ports in each of these taps (port C in each ideal tap 1620 as shown in FIG. 16) being assigned as the tap in-port, another one of the 3 ports in each of these taps (port B in each ideal tap 1620 as shown in FIG. 16) being assigned as the tap out-port, and the last port of the 3 ports in each of these taps (port A as shown in FIG. 16) being assigned as the tap drop-port. The three taps are then cascaded in the manner shown in FIG. 16, whereby each of subsequent taps connects to the previous taps out-port via its in-port. The taps may be configured to allow for separation between the signals at the inputs and outputs at each port as shown in FIG. 16 (charts 1621$_1$-1621$_3$ and 1623$_1$-1623$_3$) thus allowing for concurrent upstream and downstream communication to/from the node 1610 in the network 1620.

Nonetheless, while FIG. 16 shows all taps as 3-port repeaters used as 1-port taps, each of the taps shown could be comprised of N-port taps, such as in the embodiments shown in FIGS. 5 and 6 for example. The number of ports for each tap varies according to the design guidelines used to implement the system. A number of variations are contemplated for the N-port tap where N varies.

In accordance with the present disclosure, ideal taps used in cable network may incorporate support for make-before-break bridging, to ensure continued operation in the cascade even when tap, particularly a tap that is not at the end of the cascade, is removed. For example, each of the ideal taps $1620_1$-$1620_3$ may incorporate make-before-break circuit as described with respect to the ideal tap 1400. The effects of use of such make-before-break bridging is illustrated in FIGS. 17-19.

Figure 17:
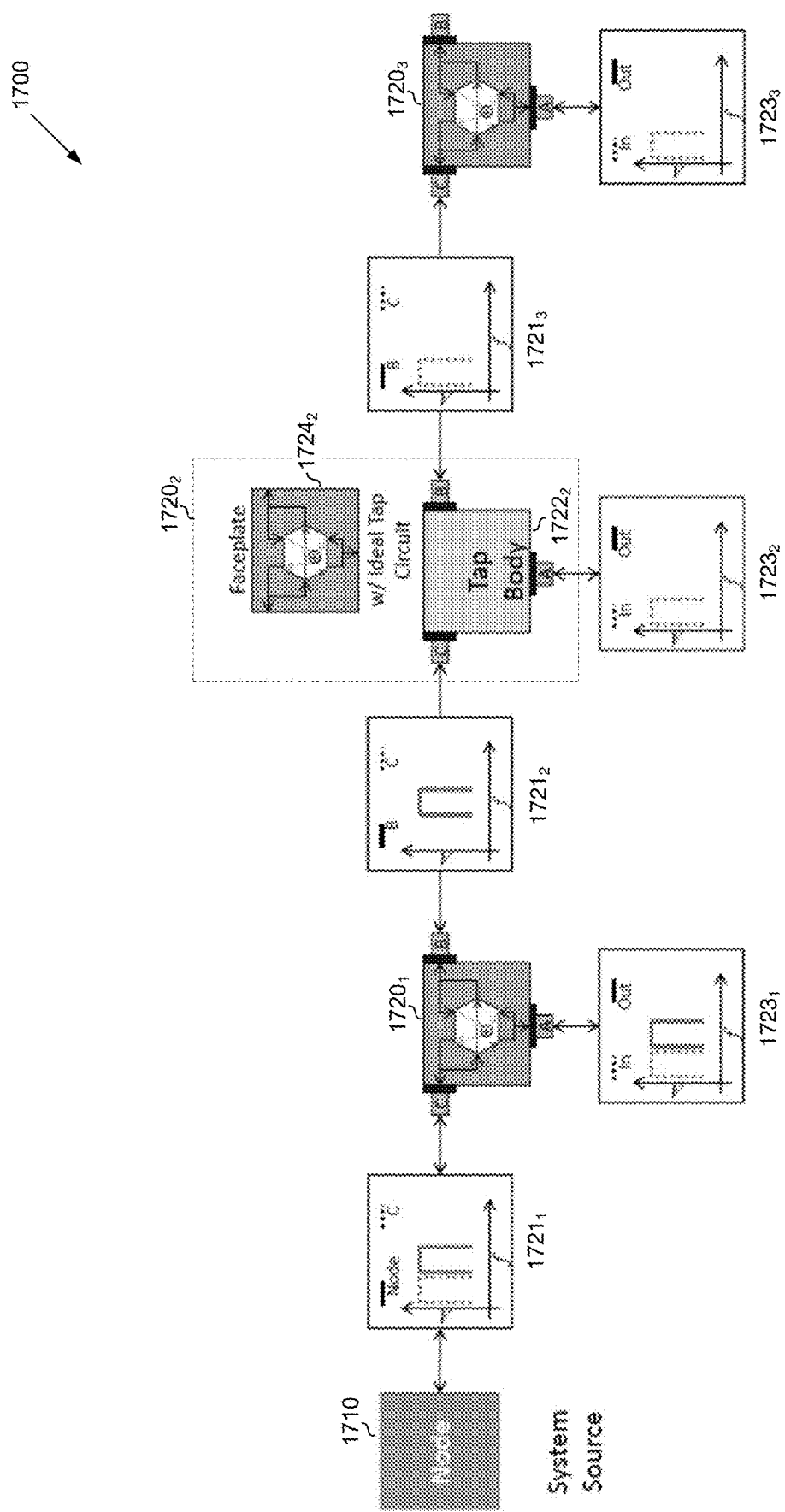
FIG. 17 illustrates an example tap removal use scenario in the cascade of ideal taps in a cable network.

FIG. 17 illustrates an example tap removal use scenario in the cascade of ideal taps in a cable network. Shown in FIG. 17 is portion of cable network 1700, comprising three ideal taps $1720_1$-$1720_3$ coupled sequentially—that is, as cascade, and a cable node 1710. The network 1700 may be similar to the network 1600 of FIG. 16.

The ideal taps $1720_1$-$1720_3$ may support tap removal but without support for make-before-break bridging. For example, each of the taps $1720_1$-$1720_3$ may comprise a tap faceplate $1724_2$ that is inserted into a tap body $1722_2$ when the tap is fully assembled. Thus removal of the tap may simply entail removing the faceplate $1724_2$ from the tap body $1722_2$. For example, in the example use scenario shown in FIG. 17, the faceplate $1724_2$ of the second tap in the cases, tap $1720_2$, is removed. Removal of the faceplate $1724_2$ from the tap body $1722_2$ would impact the network downstream from the tap $1720_2$ as it prevents downstream (DS) signals from the node 1710 from propagating to stations connected to tap 2 and beyond. It also prevents upstream (US) signals from stations on the tap $1720_2$ and beyond from reaching the node 1710. This is clearly shown in signal charts $1721_1$-$1721_3$ and $1723_1$-$1723_3$. Thus an outage affecting stations from tap $1720_2$ and beyond is created when tap removal is done at that tap.

Figure 18:
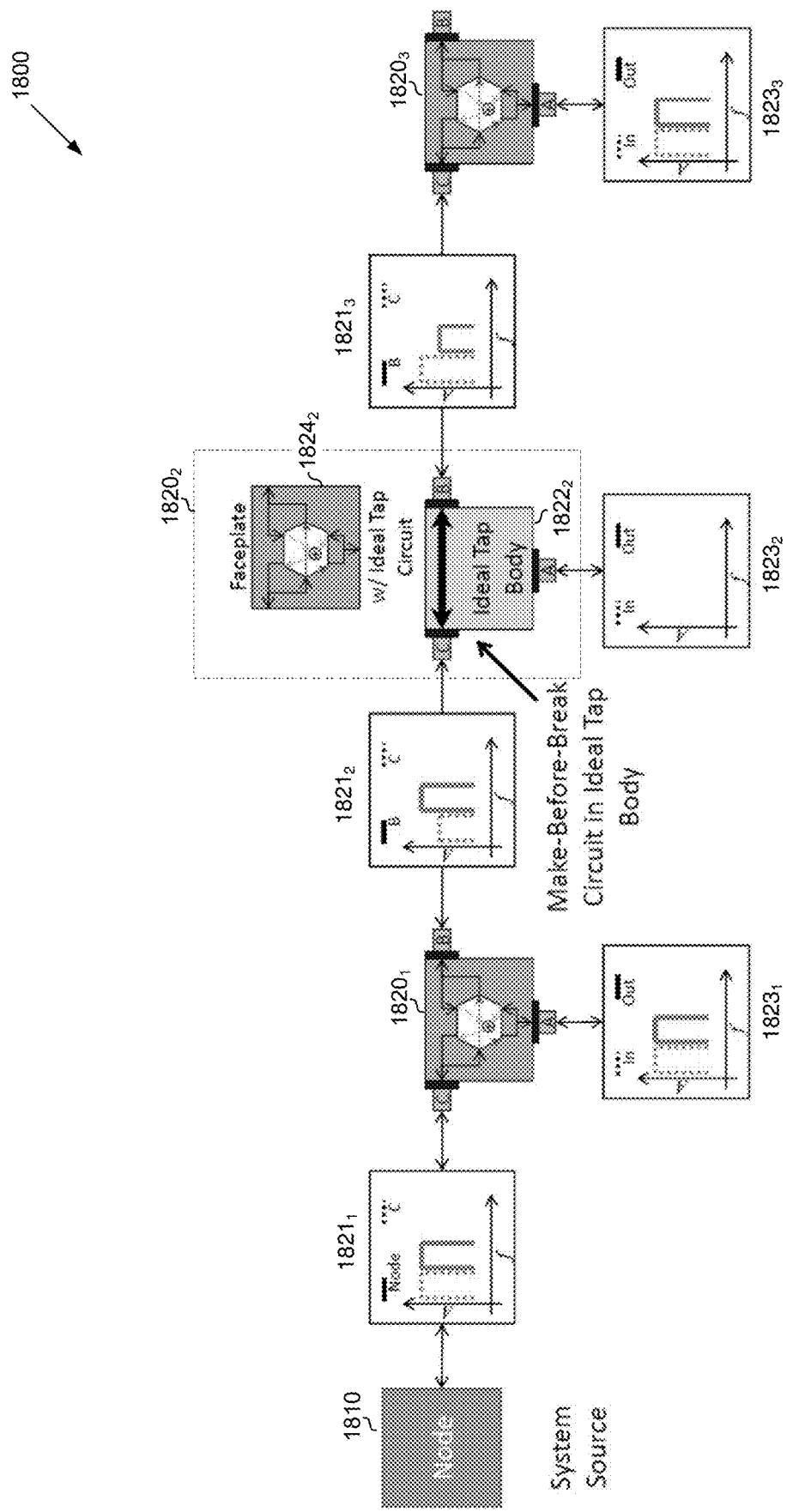
FIG. 18 illustrates an example tap removal use scenario in a cascade of ideal taps supporting make-before-break bridging.
Figure 19:
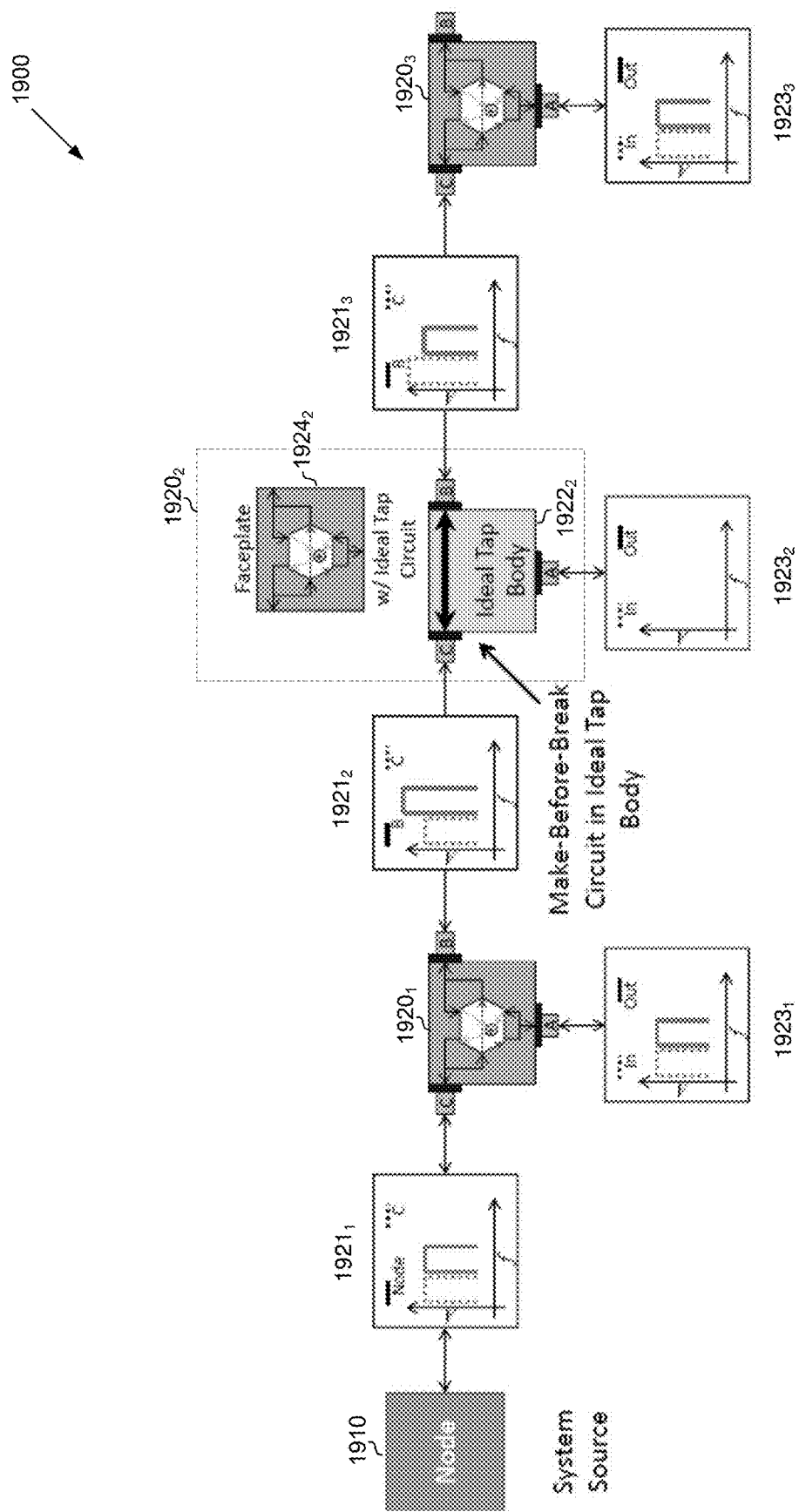
FIG. 19 illustrates an example tap removal use scenario in a cascade of ideal taps supporting make-before-break bridging and output signal boost.

FIG. 18 illustrates an example tap removal use scenario in a cascade of ideal taps supporting make-before-break bridging. Shown in FIG. 18 is portion of cable network 1800, comprising three ideal taps $1820_1$-$1820_3$ coupled sequentially—that is, as a cascade, and a cable node 1810. The network 1800 may be similar to the network 1600 of FIG. 16 for example.

The ideal taps $1820_1$-$1820_3$ may support tap removal with make-before-break bridging. For example, each of the ideal taps $1820_1$-$1820_3$ may be similar to the ideal tap 1400 as described with respect to FIGS. 14A-14C. In this regard, similar to the use scenario described with reference to FIG. 17, each of the ideal taps $1820_1$-$1820_3$ may comprise a tap faceplate $1824_2$ that is inserted into a tap body or housing $1822_2$ when the tap is fully assembled, with the tap body or housing $1822_2$ further comprising a make-before-break circuit (not shown), which may be similar to the make-before-break circuit of the ideal tap 1400 for example. Thus, removal of the tap may simply entail removing the faceplate $1824_2$ from the tap body or housing $1822_2$. For example, in the example use scenario shown in FIG. 18, the faceplate $1824_2$ of the second tap in the cases, tap $1820_2$, is removed.

However, because the ideal taps $1820_1$-$1820_3$ incorporate support for make-before-break bridging, removal of a tap (or faceplate thereof) may not completely impact operation within the network topology beyond that tap. In this regard, adding a make-before-break circuit to the ideal tap body allows signals to propagate within the tap's body (e.g., between its input port and output port) even when the tap's faceplate is removed. Thus, after the faceplate $1824_2$ is removed from the tap body or housing $1822_2$, downstream (DS) signals from the node 1810 may still propagate to the ideal tap $1820_3$ via the ideal tap $1820_1$ and the closed make-before-break circuit of the ideal tap $1820_2$ (within the body $1822_2$). Similarly, upstream (US) signals from the ideal tap $1820_3$ may still propagate to the node 1810, through the closed make-before-break circuit of the ideal tap $1820_2$ (within the body $1822_2$) and the ideal tap $1820_1$ and ultimately to the node 1810.

Nonetheless, while the bridging via the body or housing of the ideal tap $1820_2$ may ensure continued communications within the network topology, in some instances performance may be affected. For example, as illustrated in the signal charts $1821_1$-$1821_3$ and $1823_1$-$1823_3$, signal levels from ideal tap $1820_1$ to ideal tap $1820_3$ will be lower than if ideal tap $1820_2$ were present. Similarly, signal levels from ideal tap $1820_3$ to ideal tap $1820_1$ will be lower than if ideal tap $1820_2$ were present. In this regard, exact levels will be dependent on the topology in the physical plant.

In some implementations, ideal taps may be configured to handle such degradation in the performance. For example, in an example implementation, the ideal tap $1820_1$ may be configured to detect the lower signal level received on its output port, and apply corrective or remedial measures—such as by providing additional amplification, either digital or analog, such that the level of the signal summed with other ports and/or repeated to the input port remains the same. Additional correct or remedial measures may also be used. For example, in the ideal tap $1820_1$, port B may be normalized before summing with the signal of port A, and the normalized sum is repeated out of port C of the ideal tap $1820_1$ to the node 1810. Thus the level of the signal from ideal tap $1820_1$ remains the same as if the faceplate at ideal tap $1820_2$ was not removed.

Similarly, the ideal tap $1820_3$ may be configured to normalize and/or apply additional amplification (either digital or analog) to the level of the signal received at its port C before repeating the signal to its port A such that the signal level out of its port A remains the same as if the faceplate was not removed from ideal tap $1820_2$.

FIG. 19 illustrates an example tap removal use scenario in a cascade of ideal taps supporting make-before-break bridging and output signal boost. Shown in FIG. 19 is portion of cable network 1900, comprising three ideal taps $1920_1$-$1920_3$ coupled sequentially—that is, as a cascade, and a cable node 1910. The network 1900 may be similar to the network 1600 of FIG. 16 for example.

The ideal taps $1920_1$-$1920_3$ may support tap removal with make-before-break bridging, as described with respect to FIG. 18 for example. In this regard, the ideal taps $1920_1$-$1920_3$ may incorporate support for make-before-break bridging (e.g., by incorporating make-before-break circuits in the taps' housings) to ensure continued operation beyond (after) a particular tap in the network topology when that particular tap (or a faceplate thereof) is removed. For example, after faceplate $1924_2$ is removed from tap body or housing $1922_2$ at the second ideal tap $1920_2$, downstream (DS) signals from the node 1910 may still propagate to the ideal tap $1920_3$ via the ideal tap $1920_1$ and the closed make-before-break circuit of the ideal tap $1920_2$ (within the tap housing $1922_2$). Similarly, upstream (US) signals from the ideal tap $1920_3$ may still propagate to the node 1910, through the closed make-before-break circuit of the ideal tap $1920_2$ (within the tap body or housing $1922_2$) and the ideal tap $1920_1$ and ultimately to the node 1910.

Nonetheless, while the make-before-break bridging (and any additional corrective and/or remedial measures, e.g., as described with respect to FIG. 18) may ensure continued communications within the network topology, in some instances additional enhancements to signals may be desired or necessary. For example, while the signal levels received may be adequate, it may be that signal-to-noise ratio (SNR) is reduced due to the lower signal level. Thus increasing the output level of the signals sent by remaining taps may be desirable, such that the reduction in SNR is remedied. Accordingly, the ideal taps may be configured to detect removal of taps, and boost output signals when such conditions are detected. Thus, when an ideal tap detects that a make-before-break is trigged at an adjacent ideal tap, the ideal tap may boost its signal output power to the adjacent tap to minimize reductions in SNR at taps beyond the adjacent tap. For example, with reference to the use scenario in FIG. 19, the ideal tap $1920_3$ may boost the signal from its port C such that the single levels of signals received at port B of the ideal tap $1920_1$ is increased. Similarly, the ideal tap $1920_1$ may boost the signal from its port B such that the signal level of the signal received at port C of the ideal tap $1820_3$ level is increased. The boost in output signals (and correspondingly the input signals at the other tap) is illustrated in the signal charts $1921_1$-$1921_3$ and $1923_1$-$1923_3$.

Detection of an adjacent ideal tap faceplate removal may be passive or active. An example of passive detection may be via detection of received receive levels at an ideal tap port or it could be via detection of an increase in echo duration (via time domain reflectometry). An example of active detection may be via ideal-tap-to-ideal-tap communication.

In an example implementation, the ideal tap may be configured to simply add a fixed gain when boosting. Alternatively, the ideal tap may auto range the amount of gain such that the signal received is the same as if the tap faceplate had not been removed. The auto-ranging may be passive or active. An example of passive auto-ranging could be via detection of inter-tap loss by measuring echo duration and power (via time domain reflectometry). An example of active auto-ranging may be via ideal-tap-to-ideal-tap communication.

Figure 20:
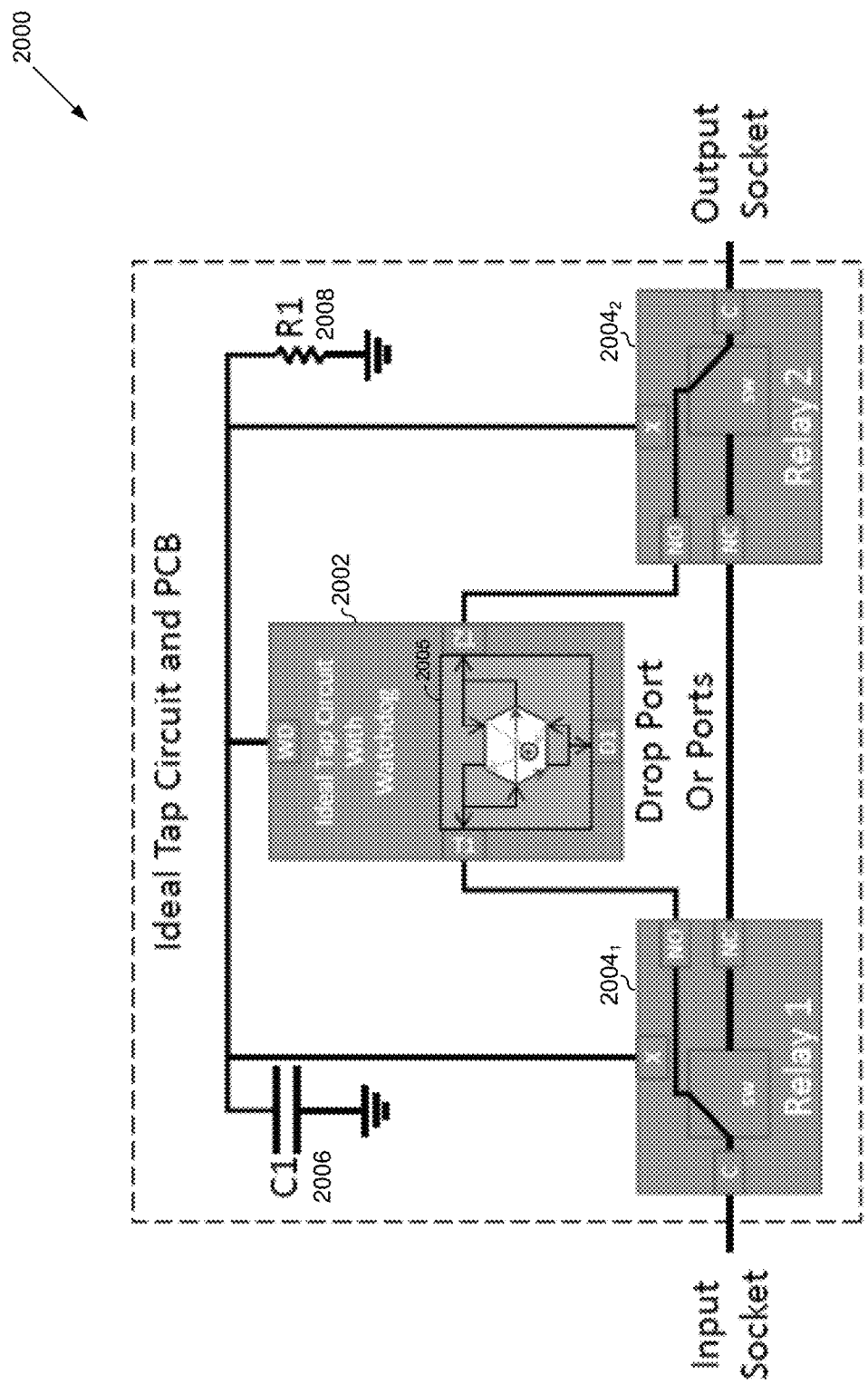
FIG. 20 illustrates an example ideal tap incorporating a watchdog circuit.

FIG. 20 illustrates an example ideal tap incorporating a watchdog circuit. Shown in FIG. 20 is an ideal tap 2000 that incorporates watchdog related circuitry for mitigating network outages due to failures and/or malfunctions in the tap itself.

In this regard, as described above, a watchdog circuit may generally function in the same manner as make-before-break circuits—that is, ensuring that signals propagating within the network (or portion thereof) that comprise the tap may continue to pass through the tap, even when the tap (or functions thereof) become unavailable. Thus, the watchdog related circuitry may effectively take the place of the ideal tap circuit/PCB 1415 described with respect to FIGS. 14 A and B. However, while make-before-break circuits (or functions thereof) are triggered by tap insertion or removal, a watchdog circuit (or functions thereof) are triggering triggered by improper tap operation—e.g., failures or malfunctions in the tap that affect functions performed thereby. For example, a watchdog circuit may be implemented such that when an ideal tap is functioning properly the watchdog circuit remains open, but when there is an ideal tap malfunction, the watchdog circuit will close.

As shown in FIG. 20, the tap 2000 comprises an ideal tap with a watchdog circuit 2002 and two relay circuits $2004_1$ and $2004_2$ (also referred hereinafter as Relay 1 and Relay 2). The ideal tap circuit 2002 may comprise suitable circuitry for performing ideal tap functions (e.g., as described above) and additionally support watchdog functions. In various example implementations, the ideal tap circuit 2002 may be implemented as a single application-specific integrated circuit (ASIC), an ASIC plus discrete components, multiple ASIC and discrete components, or in some form of programmable logic device (PLD) such as a compact PLD (CPLD) or field programmable gate array (FPGA) that may or may not include analog-to-digital and/or digital-to-analog converters. In some instances, the ideal tap circuit 2002 may comprise an integrated or a discrete central processing unit (CPU). The ideal tap circuit 2002 may incorporate a number of ports, such as an input trunk port (labeled "T1"), an output trunk port (labeled "T2"), and one or more drop ports (labeled "D1"-though only one shown for clarity). Additionally, to support the watchdog functions, the ideal tap circuit 2002 may incorporate a watchdog control signal port (labeled "WD").

Each of the relays $2004_1$ and $2004_2$ (labeled "Relay 1" and "Relay 2") may comprise circuitry for routing signals between input socket and output socket of the tap 2000, such as based on mode of operation of the tap (as described below). In this regard, to support the routing of signals, the relays $2004_1$ and $2004_2$ comprise the following ports and controls: common port (labeled "C"), normally closed port (labeled "NC"), normally open port (labeled "NO"), and control signal port (labeled "X") signal.

The relays may be configured to operate based on voltage levels. For example, when voltage is below logic 1 threshold, port C is electrically connect to port NC such that signals in the desired band pass from port C to port NC and from port NC to port C; signal(s) do not pass between port C and port NO or between port NO and port C. When voltage is equal to or greater to logic 1 threshold, port C is electrically connected to port NO such that signals in the desired band pass from port C to port NO and from port NO to port C; signal(s) do not pass between port C and port NC or between port NC and port C. Signals passed may include AC or DC power, but these power signals may be handled by other circuits (not shown).

Further, the relays may also comprise power supply and ground (not shown). In this regard, the relays require power for operation. Thus, when there is no power the relay defaults to electrically connecting port C to port NC.

In an example implementation, the relays may be implemented as physical switches, each being controlled by a coil or it may be solid state.

In an example implementation, the ideal tap 2000 further comprises an optional capacitor 2006 (labeled "C1"). In this regard, the capacitor 2006 (may or may not be included (and when included, may be included either internally or externally).

In an example implementation, the ideal tap 2000 further comprises an optional resistor 2008 (labeled "R1"). In this regard, the resistor 2008 (may or may not be included (and when included, may be included either internally or externally).

In operation, the ideal tap 2000 may support watchdog functionality, whereby the ideal tap 2000 may facilitate forwarding of signals even when not operating properly (with respect to its functions as a tap—that is, handling communications via its drop ports). For example, depending on the desired protection the ideal tap circuit 2002 may be configured to operate in different modes, including, e.g., command and control mode and watchdog mode. In the command and control mode, the ideal tap circuit 2002 controls the relays $2004_1$ and $2004_2$ via the WD signal—that is, control signal transmitted via the "WD" port of the ideal tap circuit 2002 to the "X" ports of the relays. In this regard, the ideal tap circuit 2002 may hold the WD signal high to keep the relays in the NO position, or hold the WD signal low to keep the relays in the NC position. In an example implementation, multiple WD signals may be used such that relays Relay 1 and Relay 2 may be controlled independently.

The resistor R1 and the capacitor C1 are not required for operation in the command and control mode. Configuration of the ideal tap 2000 when operating normally is shown in FIG. 20. In this regard, with the WD signal asserted to high, the relays are kept in the NO positions, and as such signals received at the input socket pass through the C port of Relay 1 into the NO port of Relay 1 and into the T1 port of the ideal tap circuit 2002. The output signals are sent from the ideal tap circuit 2002 through the T2 port into the NO port of Relay 2, which routes the signals onto the C port, for transmittal through the output sockets. The signals communicated to/from subscribed served directly by the ideal tap 2000 are communicated via the drop port(s) D1. Operation in watchdog mode is described with respect to FIG. 21.

Figure 21:
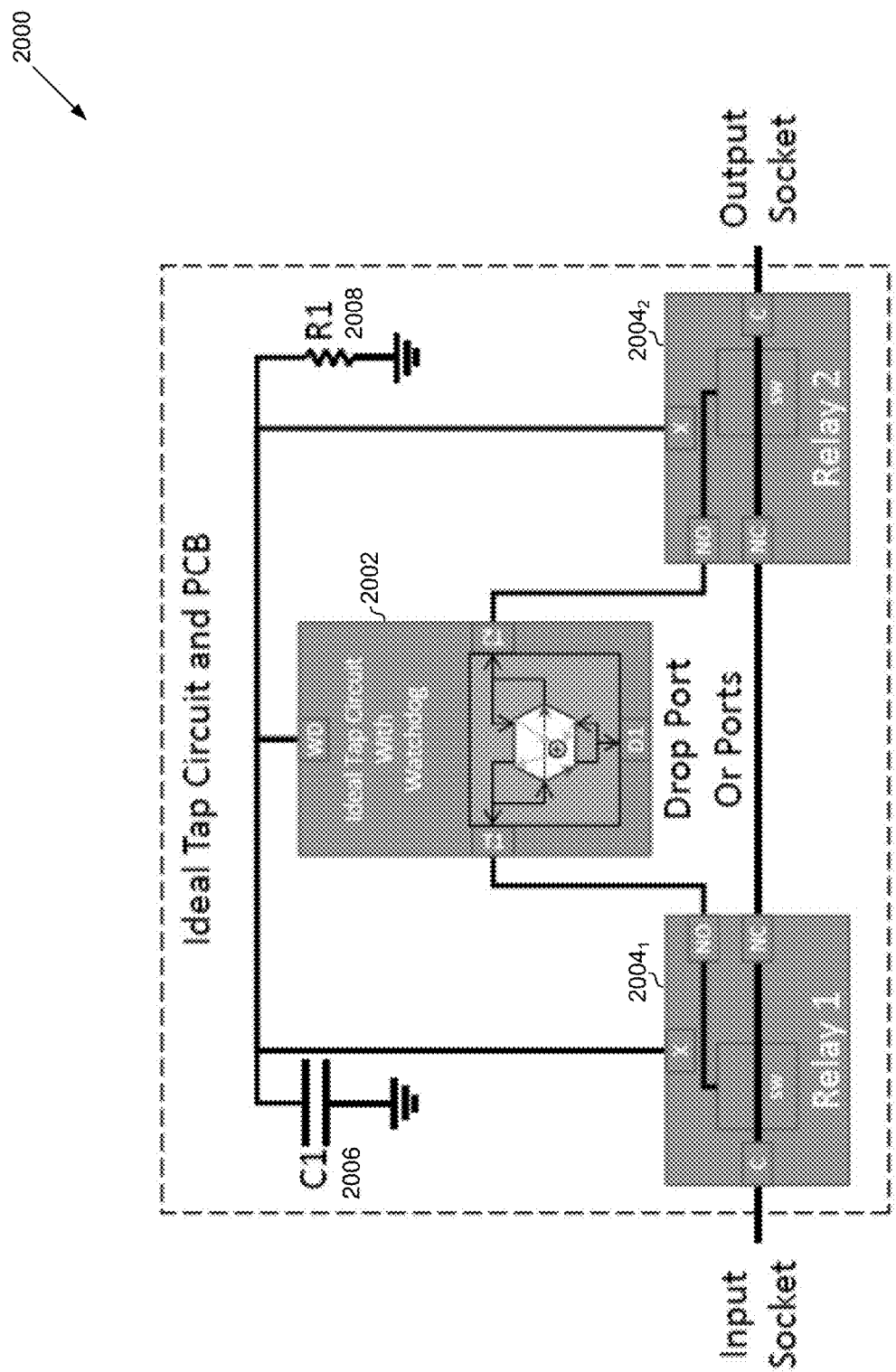
FIG. 21 illustrates an example use scenario where the ideal tap 2000 of FIG. 20 is operating in watchdog mode.

FIG. 21 illustrates an example use scenario where the ideal tap 2000 of FIG. 20 is operating in watchdog mode. In this regard, the ideal tap circuit 2002 may comprise a watchdog timer, which is used in monitoring whether the tap is functioning properly. The watchdog timer may trigger operation in watchdog mode. For example, as long as the watchdog timer hasn't expired, the output on the WD signal remains high keeping the relays in the NO position. In order to maintain the relays in the NO position, software (SW) must periodically tend to the watchdog timer. The SW can fail to tend to the timer if there is a software error that creates a loop and prevents proper operation SW can also choose to not tend to the watchdog timer if it determines that the ideal tap circuit is not functioning properly. Regardless of the reason, if the watchdog timer is not tended prior to its expiration the WD signal will be set low and the relays will be set in the NC position. When in the NC position, signals and power will pass without interruption from the input coax to the output coax, as shown in FIG. 21, in a similar manner as the make-before-break circuit in the tap housing, allowing the signals to reach the next hop in the system and limiting improper operation to only the malfunctioning ideal tap.

In an example implementation, an optional capacitor can be added to allow operation to continue for a small period of time. This may desired if it is known that the system may continue to operate properly for a short period of time when a software reset occurs. It may be possible the software recovers prior to any improper operation of the ideal tap circuit such that the software can reset the watchdog prior to the capacitor discharging enough to put the relays in the NC mode.

In various implementations, the ideal taps may configured to support protection from several different types of failures. Example types of failure may comprise removal, loss of power, software issues, and self-determined improper operation. With respect to removal, a make-before-break circuit in the tap housing will ensure signals propagate both upstream and downstream to the next tap or taps in the system. With respect to loss of power, the pull down resistor R1 ensures that the watchdog circuit will trigger the relays to electrically connect the input coax to the output coax. In this regard, with local power loss due to power supply unit or other powering malfunction, only the local tap is affected; with total system power loss due to lack of AC or battery back-up power, all taps are affected. With respect to software issues (e.g., latch-up, infinite loop, runaway, etc.), the lack of tending the watchdog timer will trigger the relays to electrically connect the input coax to the output coax. With respect to self-determined improper operation, such determination when deemed to require removing the ideal tap circuit from the system may trigger the relays by deliberately not tending the watchdog timer.

In example implementation, an ideal tap may keep multiple watchdog timers for different purposes. For example, the ideal tap may use a watchdog timer for signal bypass as discussed above, as well as an overall system watchdog timer to mitigate software faults.

While the various solutions and implementations based thereon are described with respect to taps with single input port and single output port. In this regard, taps in hybrid-fiber-coax (HFC) systems by design have a single input port and a single output port. Thus the make-before-break and watchdog mechanisms discussed above have focused on single input port and single output port taps. However, ideal taps may replace network (e.g., HFC) elements that have a single input port and multiple output ports when building HFC systems with ideal taps. For example, various HFC systems may include such elements as couplers (typically having 1 input, 2 outputs), splitters (typically having 1 input, multiple outputs (commonly 2 or 3 outs)), amplifiers/line extenders (typically having 1 input, 1 output), and amplifiers/bridgers or (typically having 1 input, multiple outputs (commonly 2, 3, or 4 out ports, however, up to 6 out ports have been built).

These devices typically do not have make-or-break circuits so that when they are removed (e.g., while being replaced) or function improperly outages occur. Signals are propagated downstream (DS) from the input port to each of the output ports. Signals are propagated upstream (US) by RF combining the signals from each of the output ports to the input port. Ideal taps also allow for new topologies that have not been traditionally possible. Signals may be arbitrarily steered and combined from any port to any other port. This may create and pose challenges to use of traditional solutions for handling network outages. Accordingly, in various implementations similar solutions as those described above may be used in network elements (particularly taps) with multiple input and multiple output ports. This is described in more detail below.

Figure 22:
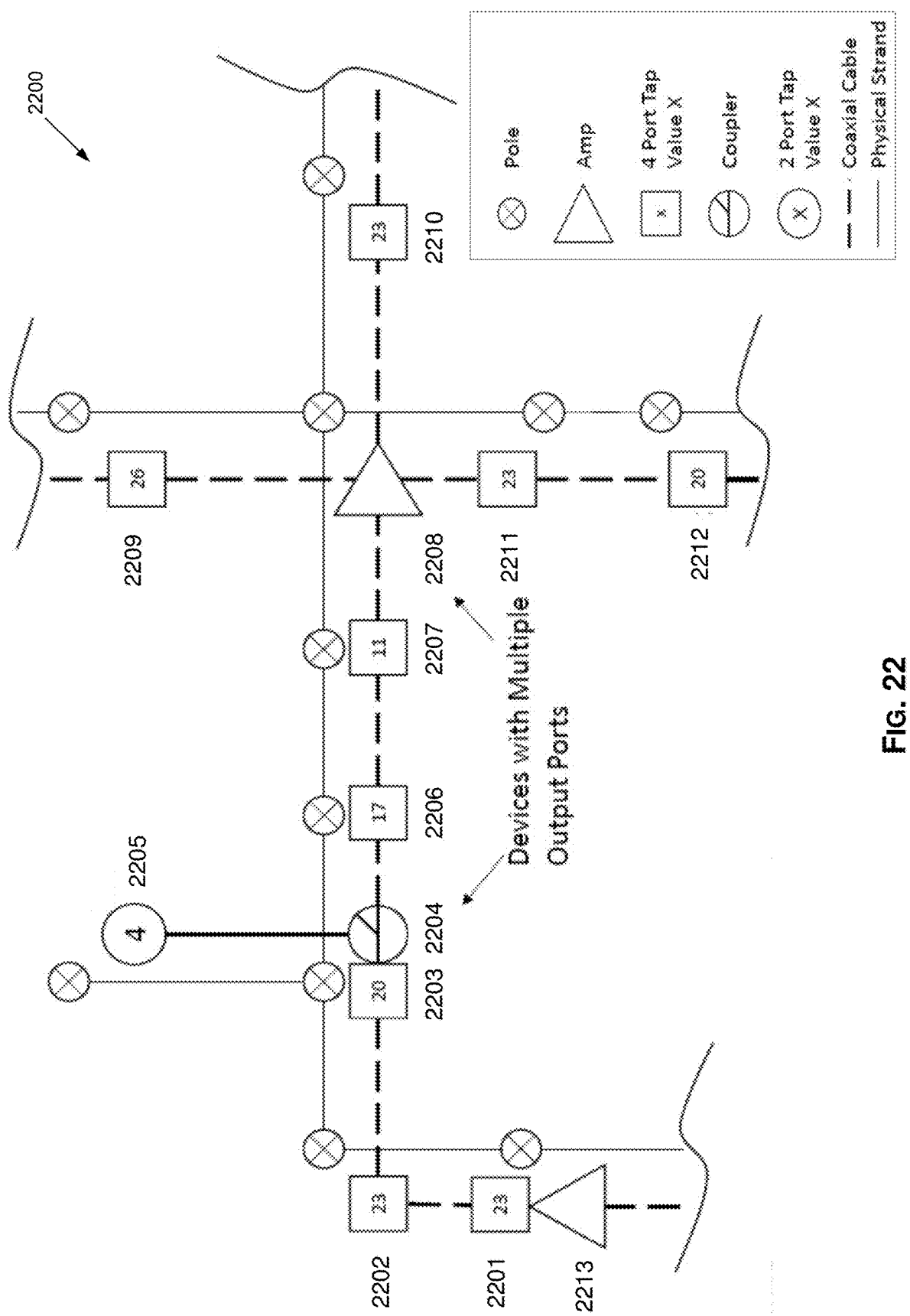
FIG. 22 illustrates an example cable plant with multi output port elements.

FIG. 22 illustrates an example cable plant with multi output port elements. Shown in FIG. 22 is cable plant map for a cable plant (or segment thereof) 2200 that comprises various types of network elements, including network elements with multiple output ports.

In this regard, cable plant maps typically contain infrastructure, such as strand for aerial plant, conduit for underground plant, the coaxial cable, and any passive and active elements. The passive element may comprise, for example, taps, couplers, splitters, splices, and power inserters. The active elements may comprise nodes (not shown) and amplifiers such line extenders and bridgers. As noted, some of these elements may have multiple input ports and/or multiple output ports.

For example, taps may have 1 input port, 1 output port and have 2, 4, or 8 drop ports depending on the particular device. Taps may be configured to pass AC power from the input port to the output port. For example, in the cable plant 2200, taps 2201, 2202, 2203, 2206, 2207, 2209, 2210, 2211, and 2212 are 4-port taps, and tap 2205 is a 2-port tap. Splices are 2-ports devices used to splice two coaxial cables into a longer strand. Splices are configured to pass both RF and AC signals in both directions. No splice is shown in the cable plant 2200.

Couplers and Splitters are RF passive devices that split/combine signals from/to 1 coaxial cable to/from multiple coaxial cables. These devices have one input port and multiple output ports. Couplers and splitters may pass AC power between all ports. Couplers have a coupling value which applies to the RF power level at the low power output port compared to the RF power at the input port. The high-power output port receives the majority of the RF power from the input port minus that sent to the lower power port and any implementation loss. This is typically less than 1 dB.

Splitters with 1 input port and 2 output ports split the RF power from the input port between the two output ports. Splitters with more than 2 output ports may be balanced or unbalanced, meaning the input power is equally split or one or more output ports will receive the majority of the Input ports RF power. Couplers and splitters do not have the make-before-break circuit since the coupling and splitting functions are intrinsic to their operation, thus the make-before-break circuit would have to essentially do the same function as the coupler or splitter. The cable plant 2200 includes coupler 2204, but includes no splitters.

Amplifiers are active devices that amplify RF signals received at the input port and then send these signals to the output port or ports. They may also combine RF signals received at all of the output ports, amplify the combined signal, and then send this signal out the input port. Amplifiers may have splitters or couplers integrated. Amplifiers use diplexers to segregate US signals (out-to-in) from DS signals (in-to-out). Amplifiers pass AC power between all ports. Amplifiers do not include make-before-break circuit since the amplification is intrinsic to their operation. Without the amplification signals would be too low to be usable after the amplifier. Two amplifiers are included in the cable plant 2200: amplifier 2213 is 1-to-1 amplifier, also referred to as a line extender; amplifier 2208 is 1-to-3 amplifier, also referred to as a bridger or trunk amplifier.

Figure 23:
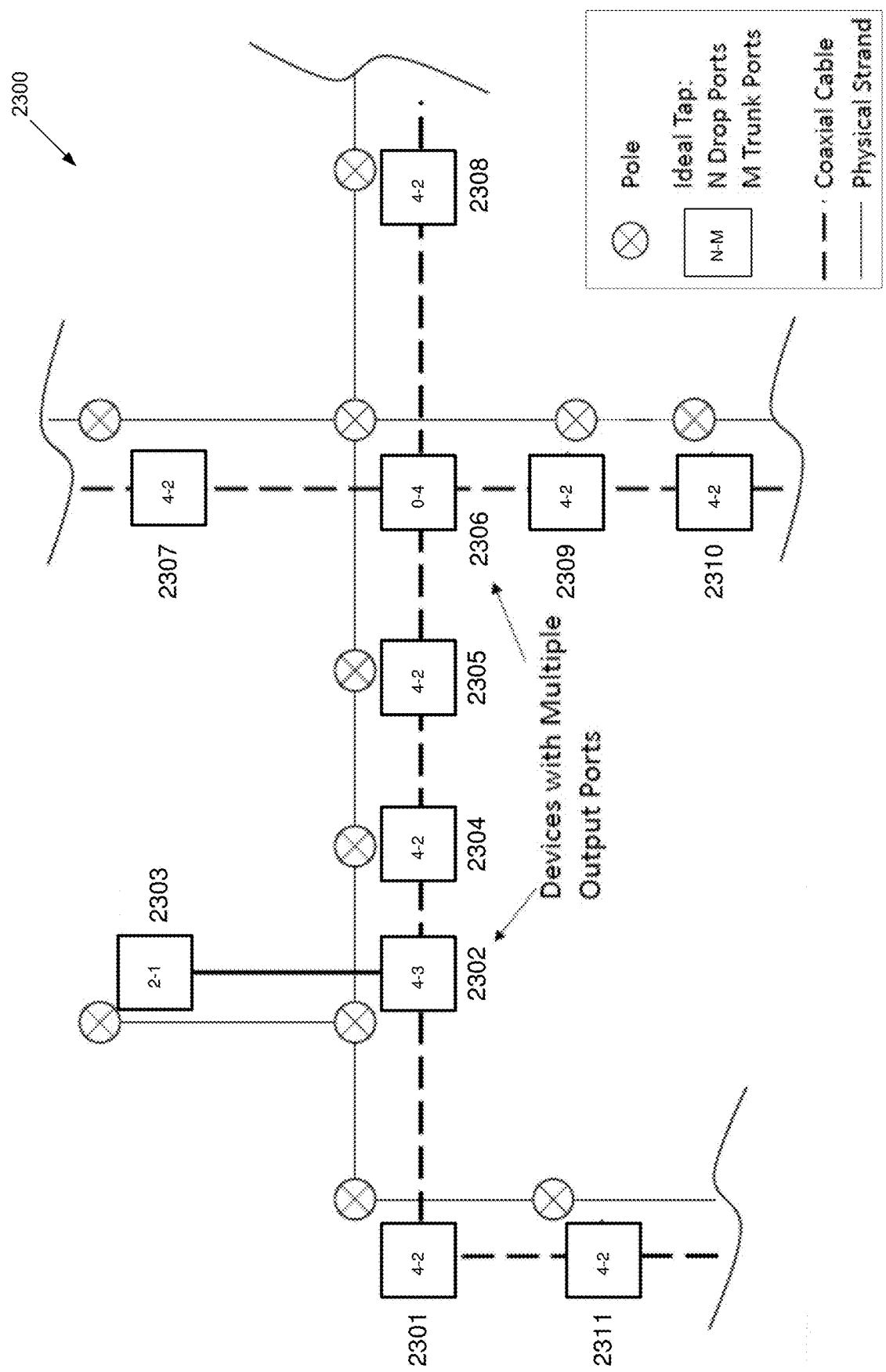
FIG. 23 illustrates an example cable plant incorporating multi output port ideal taps.

FIG. 23 illustrates an example cable plant incorporating multi output port ideal taps. Shown in FIG. 23 is cable plant map for a cable plant (or segment thereof) 2300.

The cable plant 2300 incorporates ideal taps which may replace various network elements with multiple output ports typically used in such cable plants. In this regard, as shown in FIG. 23, the cable plant 2300 includes N-M ideal taps—that is, taps with 'N' drop ports, 'M' trunk ports, with at least some of these ideal taps replacing active and passive devices in the system. Each of these ideal taps may be configured for supporting ideal taps functions, as described above. As shown in FIG. 23, the cable plant 2300 includes ideal taps 2301, 2302, 2303, 2304, 2305, 2306, 2307, 2308, 2309, 2310 and 2311, some of which may replace some of the passive and/or active devices in the cable plant 2200. In this regard, in some example implementations, it may be possible to combine the functionality of collocated elements into a single ideal tap. For example, the ideal tap 2311 replaces amplifier 2211 and tap 2201 in the cable plant 2200. Thus, the ideal tap 2311 includes four drop ports to service the homes served by tap 2201. The ideal tap 2302 replaces tap 2203 and coupler 2204 in the cable plant 2200. Some of the taps in the in the cable plant 2300 may have more than 1 trunk output port, such as taps 2302 and 2306.

In various implementations in accordance with the present disclosure, ideal taps with multiple input ports and/or multiple output ports may be configured for reducing outage scope, such as during in removal and/or failure conditions. This may be done by incorporating make-before-break and watchdog solutions. However, the make-before-break and watchdog solutions described above may not work for these devices as they were configured for single-input-single-output taps. Instead, make-before-break and watchdog solutions specifically configured for multiple input ports and/or multiple output ports arrangements are used, as described below.

Figure 24A:
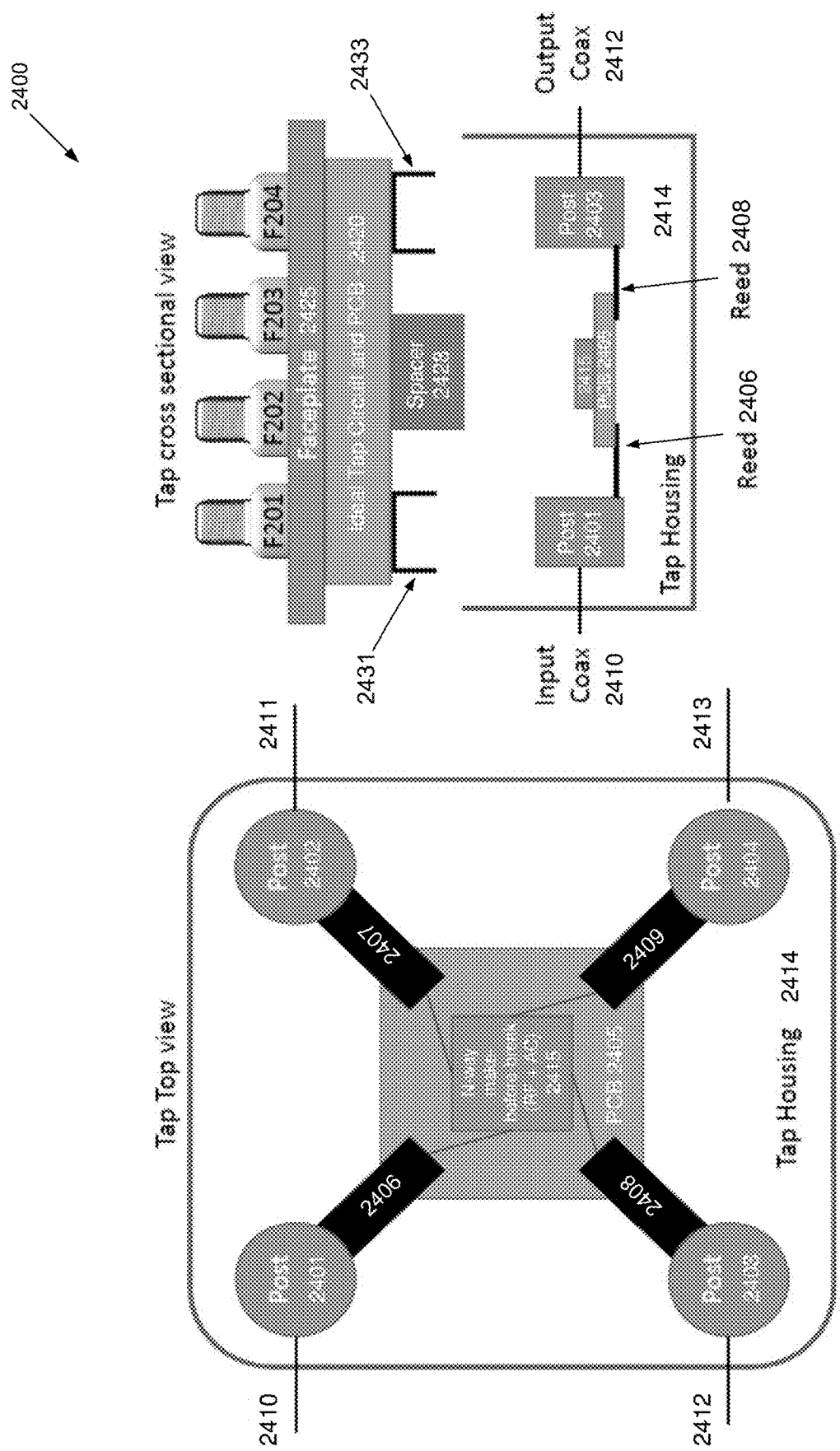
FIGS. 24A and 24B illustrate an example N-M ideal tap incorporating a make-before-break bridging component that supports multi-input and/or multi-output ports, and an example use scenario thereof.
Figure 24B:
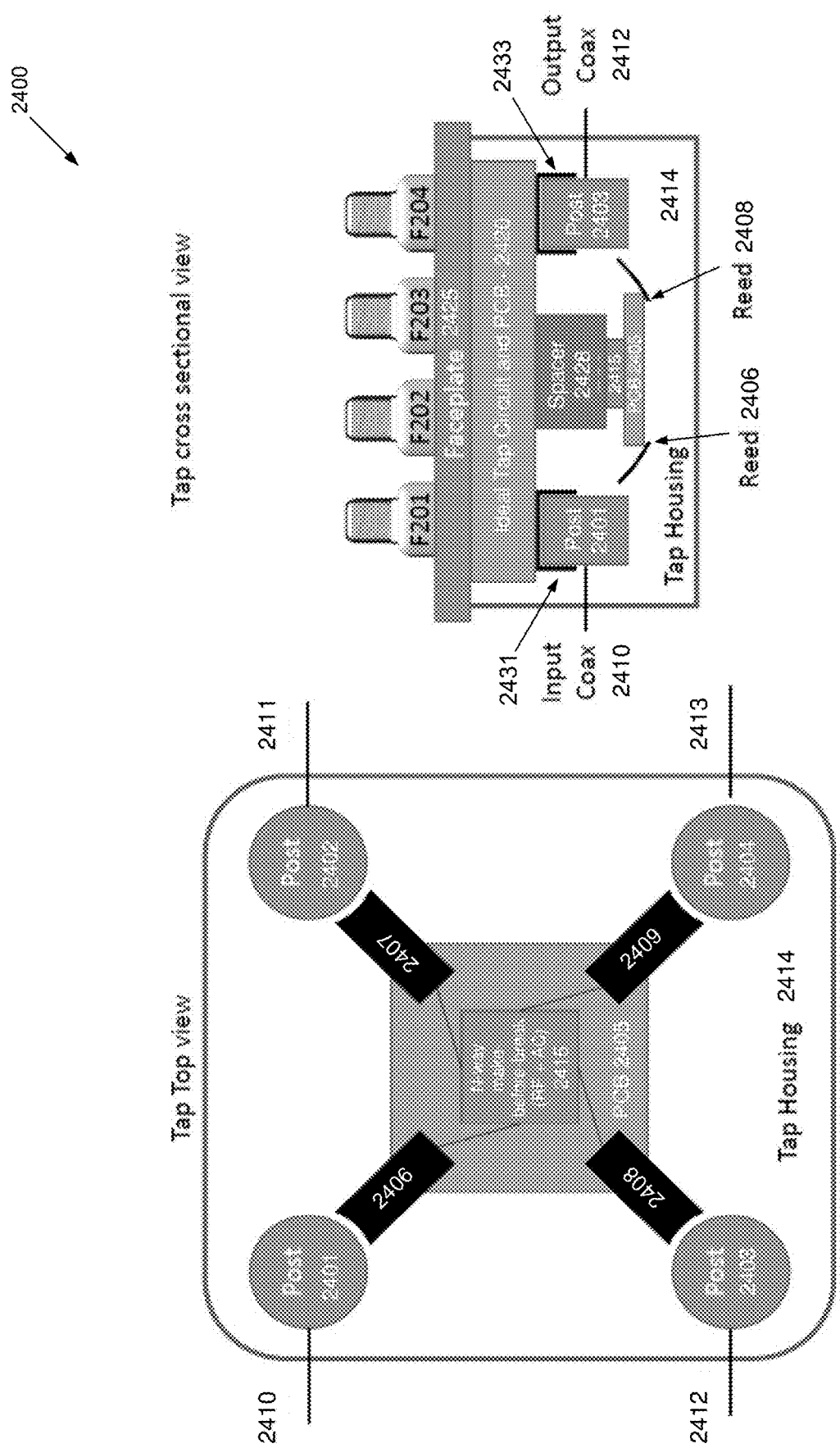

FIGS. 24A and 24B illustrate an example N-M ideal tap incorporating make-before-break bridging component that supports multi-input and/or multi-output ports, and an example use scenario thereof. Shown in FIGS. 24A and 24B is an ideal tap 2400.

The ideal tap 2400 may be substantially similar to any of the ideal taps described above, but may additionally incorporate component for supporting make-before-break bridging, and to do so particularly in the context of having multiple inputs and/or multiple outputs. In other words, the ideal tap 2400 may be configured to implement and/or support make-before-break bridging between more than one input port and one output port. For example, in the particular example implementation shown in FIGS. 24A and 24B, the ideal tap 2400 has 4 trunk ports (each of which may be configured and used as input or output ports) and 4 drop ports.

As shown in FIGS. 24A and 24B, the tap 2400 comprises a tap housing 2414 and a corresponding faceplate 2425. The tap 2400 further comprises posts 2401-2404, each of which may be electrically connected to respective one of coaxial cables 2410-2413. For example, posts 2401 and 2402 may be electrically connected respectively to input coaxial cable 2410 and 2411, and posts 2403 and 2404 may be electrically connected respectively to output coaxial cables 2412 and 2413.

The faceplate 2425 incorporates on one side an ideal tap circuit (e.g., printed circuit board (PCB) 2420, with 4 drop ports (F201-F204) on the other side. In this regard, the drop ports F201-F204 may provide drop connectivity—that is, with equipment in subscribers' homes connected to the drop ports.

The tap 2400 also comprises additional components configured for use in providing the make-before-break bridging, comprising spacer 2428 attached to the faceplate 2425 (on the interior side/face), 4 sockets, each corresponding to one of the posts 2401-2404 (of which sockets 2431 and 2433 are shown in the cross sectional view), and 4 reeds 2406-2409, each corresponding to one of the posts 2401-2404. The reeds 2406-2409 may comprise material that is electrically conductive—e.g., to both RF signals and AC and DC power. Further, the reeds 2406-2409 may be movable—e.g., by being constructed from flexible material such that it may bend or otherwise changes shape. The disclosure is not so limited, however, and other approaches for facilitate changes in positioning or shape of the reeds 2406-2409 as described hereinafter may be achieved.

The ideal tap 2400 further comprises make-before-break bridging circuitry for bridging connections between the N trunk ports. For example, as shown in FIGS. 24A and 24B, the ideal tap 2400 comprises N-way make-before-break circuit 2415, which may be embedded on the printed circuit board (PCB) 2405. In this regard, the PCB 2405 may be configured to provide electrical connection between the N-way make-before-break circuit 2415 and the reeds 2406-2409. The N-way make-before-break circuit 2415 may be configured for handling and/or managing passing of RF signals and AC power between N trunks (e.g., the 4 trunk ports of the ideal tap 2400).

Shown in FIG. 24A is the tap 2400 when fully disassembled. In this regard, with the faceplate 2425 completely removed, the ideal tap circuit 2405 is completely disconnected from posts 2401-2404, and as such RF signals may not be communicated to/from the drop ports F201-F204. Thus subscribers served via (e.g., connected to) these drop ports will lose service when the faceplate 2425 is completely removed from the tap housing 2414. However, with the faceplate 2425 completely removed, the reeds 2406-2409 are electrically connected to posts 2401-2404, thus providing connectivity between these posts (and the coaxial cables connected thereto) and the N-way make-before-break circuit 2415. Thus, RF signals and AC power may continue to pass through the tap housing 2414, being communicated via the posts 2401-2404, the reeds 2406-2409, the PCB 2405, and the N-way make-before-break circuit 2415, when the faceplate 2425 is removed.

Shown in FIG. 24B is the tap 2400 when fully assembled. In this regard, when the faceplate 2425 is fully assembled within/into the tap housing 2414, the spacer 2428 presses down on the PCB 2405 and the N-way make-before-break circuit 2415, which causes the reeds 2406-2409 to bend and eventually become electrically disconnected from the posts 2401-2404. Concurrently, as the faceplate 2425 is fulling assembled into the tap housing 2414, the sockets of the faceplate 2425 fully engage the posts 2401-2404, resulting in these posts becoming electrically connected to the ideal tap circuit 2420 via the sockets. Thus, when the faceplate 2425 is fully assembled into the tap housing 2414 attached, RF signals and AC power may continue to pass through the ideal tap circuit 2420, thus drop ports F201-F204 become coupled to the network, thus receiving RF signals (e.g., received from the input coaxial cable 2410) via the ideal tap circuit 2420 (and forwarding upstream RF signals in similar manner) to facilitate providing service to homes connected to the drop ports F201-F204.

Figure 25:
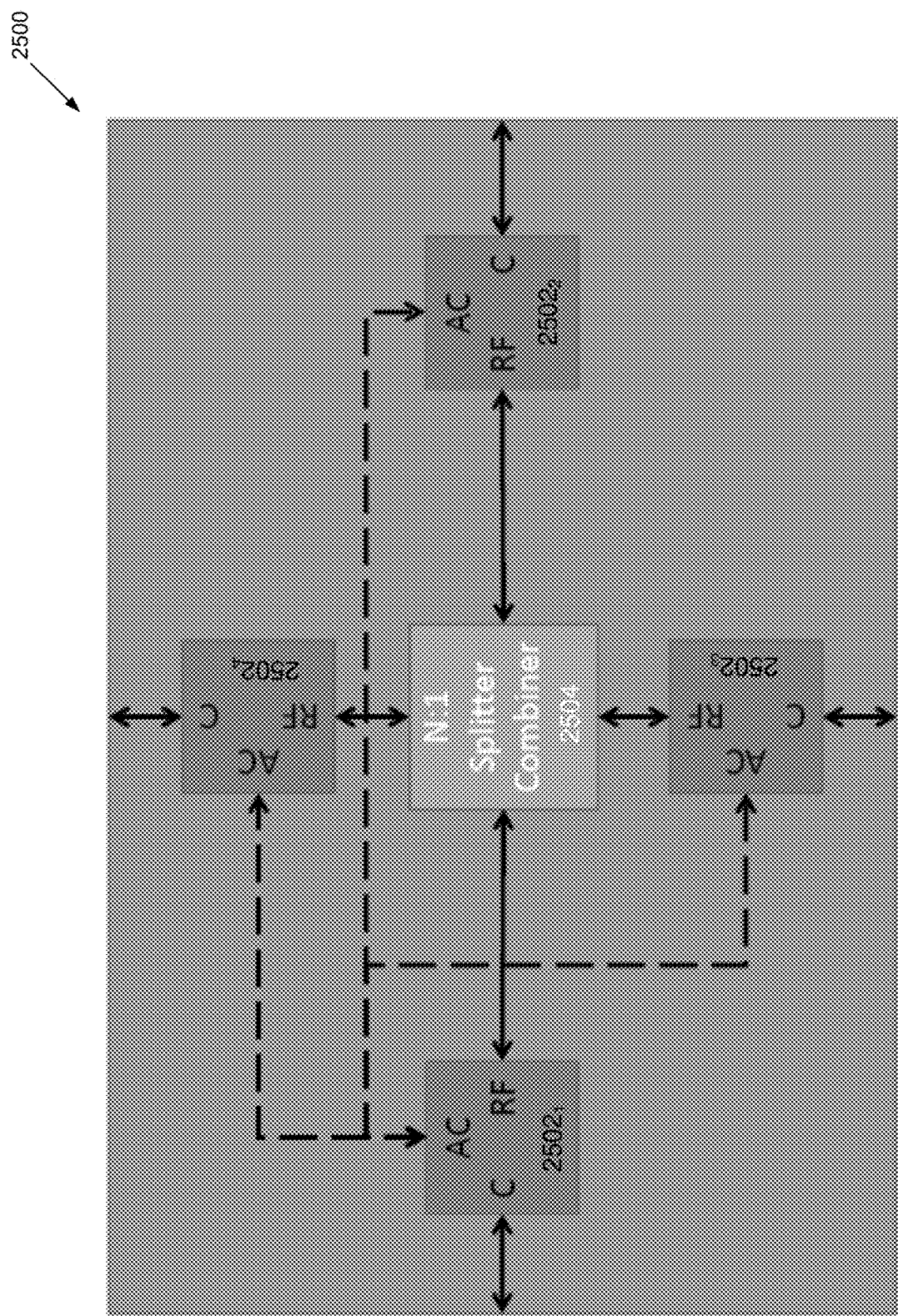
FIG. 25 illustrates an example N-way make-before-break circuit that may handle passing of RF signals and AC power.

FIG. 25 illustrate an example N-way make-before-break circuit that may handle passing of RF signals and AC power. Shown in FIG. 25 is N-way make-before-break circuit 2500.

The N-way make-before-break circuit 2500 may comprise suitable circuitry for providing make-before-break bridging among N trunk ports in an ideal tap. In particular, the N-way make-before-break circuit 2500 may be configured for facilitating and handling passing of RF signals and AC power between N ports (e.g., corresponding to N trunks of an N-M ideal tap). The N-way make-before-break circuit 2500 may correspond to the N-way make-before-break circuit 2415 of FIGS. 24A and 24B, for example.

As shown in the example implementation illustrated in FIG. 25, the N-way make-before-break circuit 2500 may comprise N connector circuits $2502_1$-$2502_N$ (e.g., 4 in the example implementation shown in FIG. 25, thus connector circuits $2502_1$-$2502_4$) and a N:1 splitter/combiner 2504. Each of the connector circuits $2502_1$ may comprise ports for supporting bridging functions, such as common/control port (labeled "C"), radio frequency (RF) port (labeled "RF"), and AC power port (labeled "AC"). The N:1 splitter/combiner 2504 may receive, combine, split and forward RF signals via interactions with the RF ports of the connector circuits $2502_1$-$2502_4$, thus allowing for forwarding RF signals from the corresponding trunk ports via their connections to the connector circuits $2502_1$-$2502_4$ through the respective C ports. Similarly, AC power may be applied to the connector circuits $2502_1$-$2502_4$ through the respective AC ports.

Figure 26:
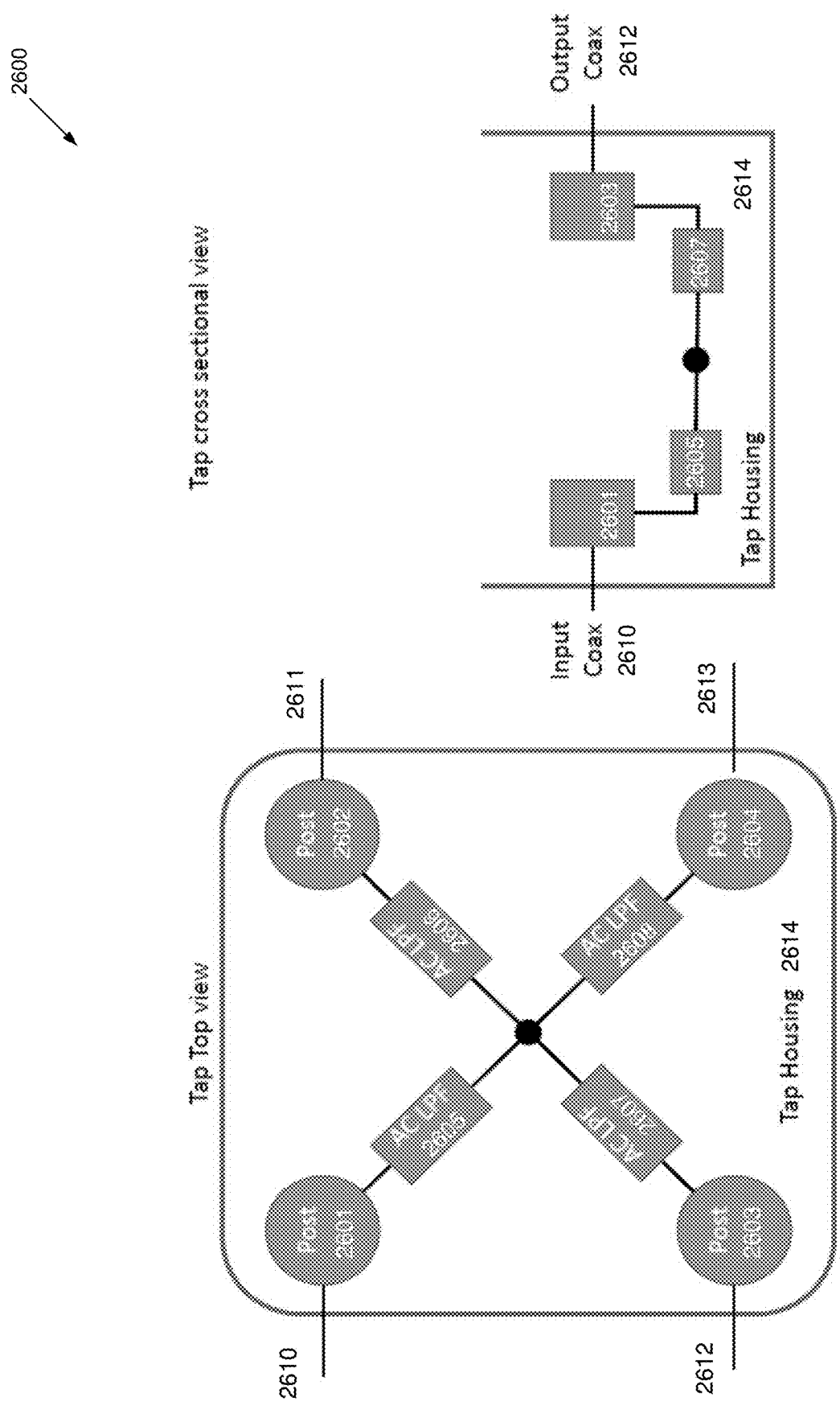
FIG. 26 illustrates an example AC configuration in a tap housing of an ideal tap with all trunk ports passing AC power.

FIG. 26 illustrates an example AC configuration in a tap housing of an ideal tap with all trunk ports passing AC power. Shown in FIG. 26 is an N-M ideal tap 2600 (or portion thereof). In this regard, in the example implementation illustrated in FIG. 26, the ideal tap 2600 has 4 trunk ports.

The ideal tap 2600 may be substantially similar to the ideal tap 2400, as described with respect to FIGS. 24A and 24B, and as such may be configured to providing make-before-break bridging among N trunk ports (N>2). The ideal tap 2600 may incorporate additional components to ensure that all trunk ports pass AC power. For example, as shown in FIG. 26, all of posts 2601-2604 of the ideal tap 2600 may be connected to a common point, via corresponding one of AC low pass filtering (LPF) connectors 2605-2608. Thus, AC power may pass from all 4 coaxial cables 2610-2613 coupled to the tap 2600 via the posts 2601-2604 and the corresponding AC/LPF connectors 2605-2608.

Figure 27:
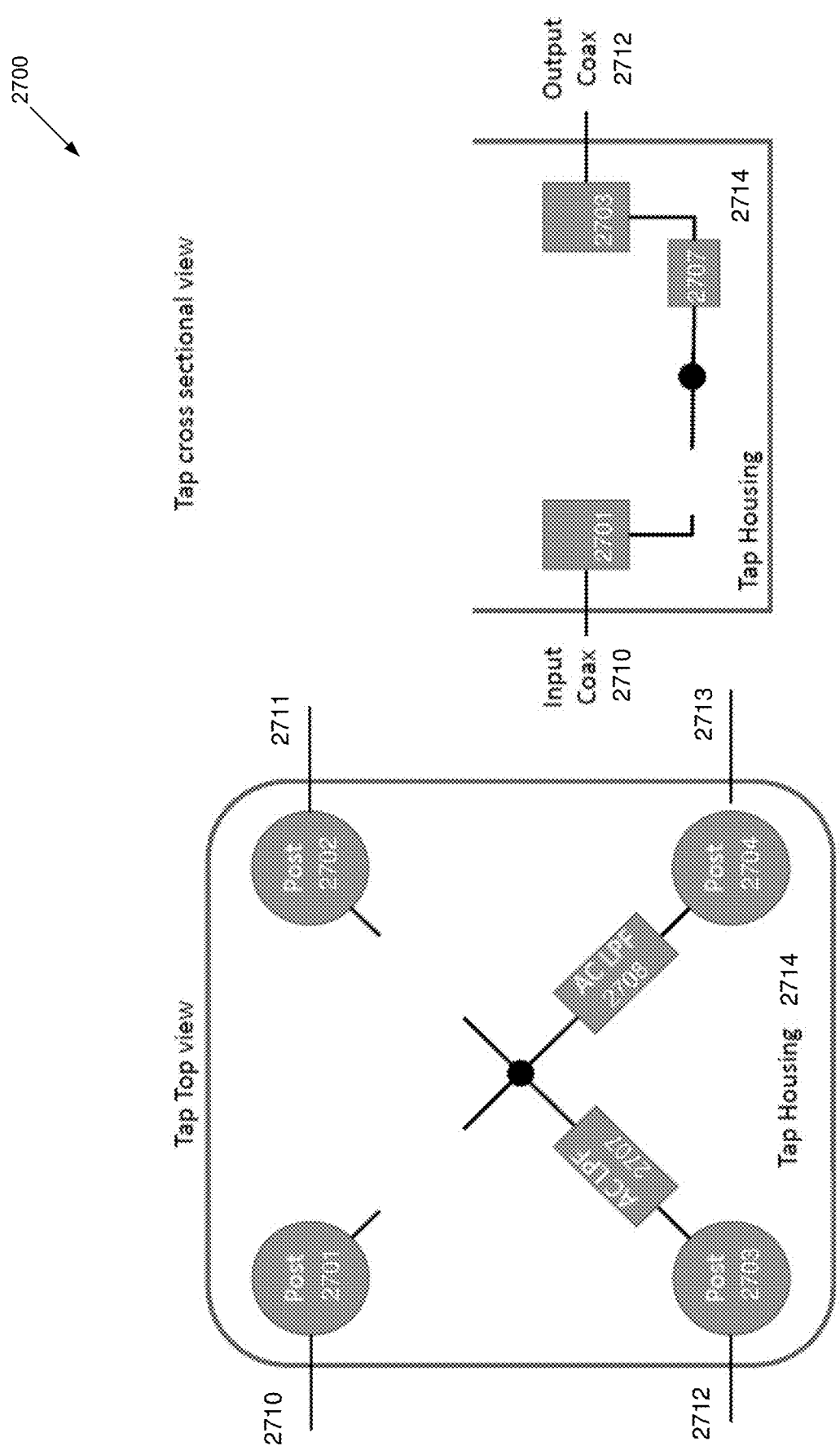
FIG. 27 illustrates an example AC configuration in a tap housing of an ideal tap with one trunk port blocking passing of AC power.

FIG. 27 illustrates an example AC configuration in a tap housing of an ideal tap with two trunk ports blocking passing of AC power. Shown in FIG. 27 is an N-M ideal tap 2700 (or portion thereof). In this regard, in the example implementation illustrated in FIG. 27, the ideal tap 2700 has 4 trunk ports The ideal tap 2700 may be substantially similar to the ideal tap 2400, as described with respect to FIGS. 24A and 24B, and as such may be configured to providing make-before-break bridging among N trunk ports (N>2). The ideal tap 2700 may incorporate additional components to ensure that only some of the trunk ports passing AC power, and with one or more remaining trunk ports blocking passing of AC power. For example, as shown in FIG. 27, only posts 2703 and 2704 of the ideal tap 2700 may be connected to a common point, via corresponding AC low pass filtering (LPF) connectors 2707 and 2708, whereas posts 2701 and 2702 are not connected into the AC bridge. Accordingly, passing of AC power may be blocked from/to coaxial cables 2710 and 2711 coupled to the tap 2700 via the posts 2701 and 2702. Thus, where the trunk port corresponding to post 2701 is used as an input port, the passing of AC power from the coaxial cable 2710 would be blocked, as illustrated in the cross sectional view.

Figure 28:
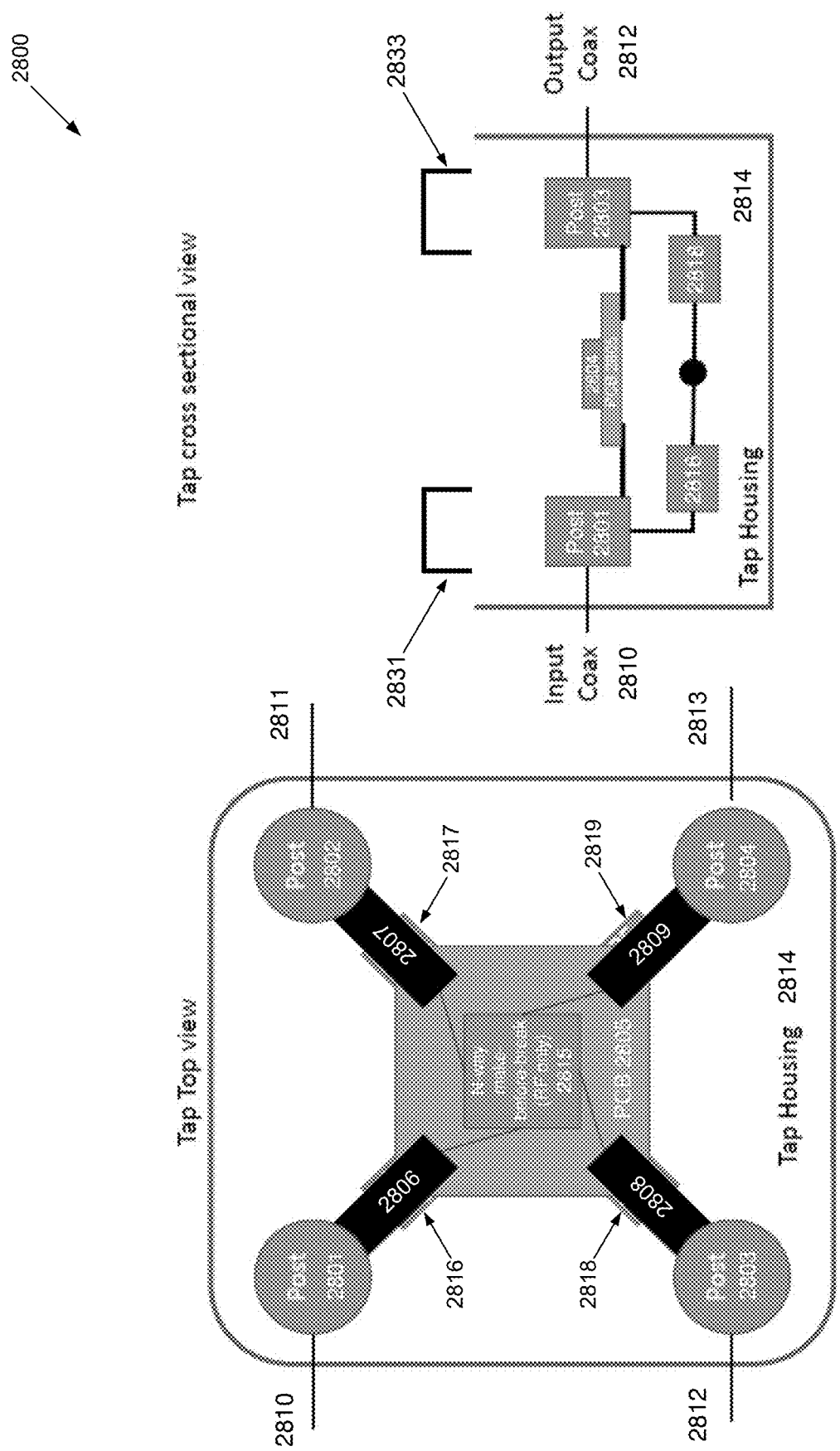
FIG. 28 illustrates an example N-M ideal tap incorporating make-before-break bridging component that supports multi-input and/or multi-output ports, and AC configuration for passing AC power via all trunk ports.

FIG. 28 illustrates an example N-M ideal tap incorporating make-before-break bridging component that supports multi-input and/or multi-output ports, and AC configuration for passing AC power via all trunk ports. Shown in FIG. 28 is an ideal tap 2800 (or portion thereof).

The ideal tap 2800 may be substantially similar to any of the ideal taps described above, but may additionally incorporate component for supporting make-before-break bridging, and to do so particularly in the context of having multiple inputs and/or multiple outputs. In other words, the ideal tap 2800 may be configured to implement and/or support make-before-break bridging between more than one input port and one output port. For example, in the particular example implementation shown in FIG. 28, the ideal tap 2800 has 4 trunk ports (each of which may be configured and used as input or output ports) and 4 drop ports.

As shown in FIG. 28, the tap 2800 comprises a tap housing 2814. The tap 2800 further comprises posts 2801-2804, each of which may be electrically connected to a respective one of coaxial cables 2810-2813. For example, posts 2801 and 2802 may be electrically connected respectively to input coaxial cable 2810 and 2811, and posts 2803 and 2804 may be electrically connected respectively to output coaxial cables 2812 and 2813. The tap 2800 also comprises a faceplate (not shown), which may be similar to the faceplate 2825 of the tap 2400, as described with respect to FIGS. 14A-14C.

The tap 2800 also comprises additional components configured for use in providing the make-before-break bridging, comprising spacer attached to the faceplate (not shown), 4 sockets, each corresponding to one of the posts 2801-2804 (of which sockets 2831 and 2833 are shown in the cross sectional view), and 4 reeds 2806-2809, each corresponding to one of the posts 2801-2804. The reeds 2806-2809 may be similar the reeds described above (e.g., reeds 2406-2409 in the tap 2400).

The ideal tap 2800 further comprises make-before-break bridging circuitry for bridging connections between the N trunk ports. For example, as shown in FIG. 28, the ideal tap 2800 comprises N-way make-before-break circuit 2815, which may be embedded on a printed circuit board (PCB) 2805. In this regard, the N-way make-before-break circuit 2815 and the PCB 2805 may be similar to the N-way make-before-break circuit 2415 and the PCB 2405, as described above. However, the N-way make-before-break circuit 2815 may be configured to handle only passing of RF signals, with the tap 2800 incorporating separate components for handling passing of AC power. For example, the tap 2800 may incorporate AC configuration for passing AC power via all trunk ports. The tap 2800 may incorporate, for example, a similar AC configuration as the one described with respect to FIG. 26 for example. In this regard, all of the posts 2801-2804 of the ideal tap 2800 may be connected to a common point, via corresponding one of 4 AC low pass filtering (LPF) connectors 2816-2819 (of which AC/LPF connectors 2816 and 2818 and the connection they provide between posts 2801 and 2803 are clearly shown in the cross sectional view). Thus, AC power may pass from/to all 4 coaxial cables 2810-2813 coupled to the tap 2800 via the posts 2801-2804 and the corresponding AC/LPF connectors 2816-2819.

Figure 29:
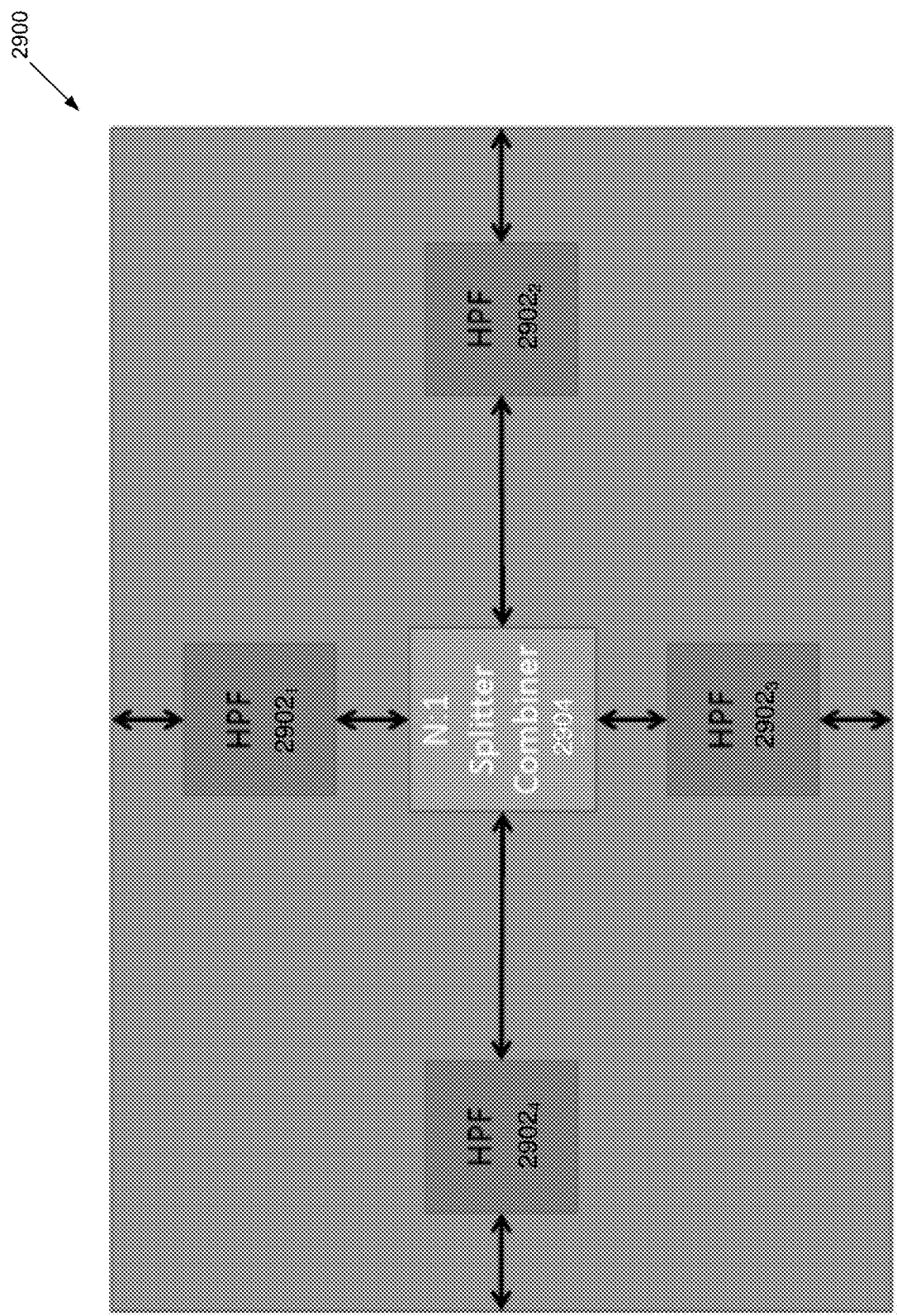
FIG. 29 illustrates an example N-way make-before-break circuit that may handle only passing of RF signals.

FIG. 29 illustrates an example N-way make-before-break circuit that may handle only passing of RF signals. Shown in FIG. 29 is N-way make-before-break circuit 2900.

The N-way make-before-break circuit 2900 may comprise suitable circuitry for providing make-before-break bridging among N trunk ports in an ideal tap. In particular, the N-way make-before-break circuit 2900 may be configured for facilitating and handling passing of RF signals only N ports (e.g., corresponding to N trunks of an N-M ideal tap), with passing of AC power being handled by other components (if needed). The N-way make-before-break circuit 2900 may correspond to the N-way make-before-break circuit 2815 of FIG. 28, for example.

As shown in the example implementation illustrated in FIG. 29, the N-way make-before-break circuit 2900 may comprise N connector circuits $2902_1$-$2902_N$ (e.g., 4 in the example implementation shown in FIG. 29, thus connector circuits $2902_1$-$2902_8$) and a N:1 splitter/combiner 2904. Each of the connector circuits $2902_1$ may be configured for supporting bridging functions, particularly with respect to passing of RF signals between the trunk ports. In an example implementation, each of the connector circuits $2902_1$ may comprise high-pass filter (HPF) for applying filtering to the RF signals and removing AC signals. The N:1 splitter/combiner 2904 may receive, combine, split and forward RF signals via the connector circuits $2902_1$-$2902_4$, thus allowing for forwarding of RF signals from the corresponding trunk ports via their connections to the connector circuits $2902_1$-$2902_4$.

Figure 30:
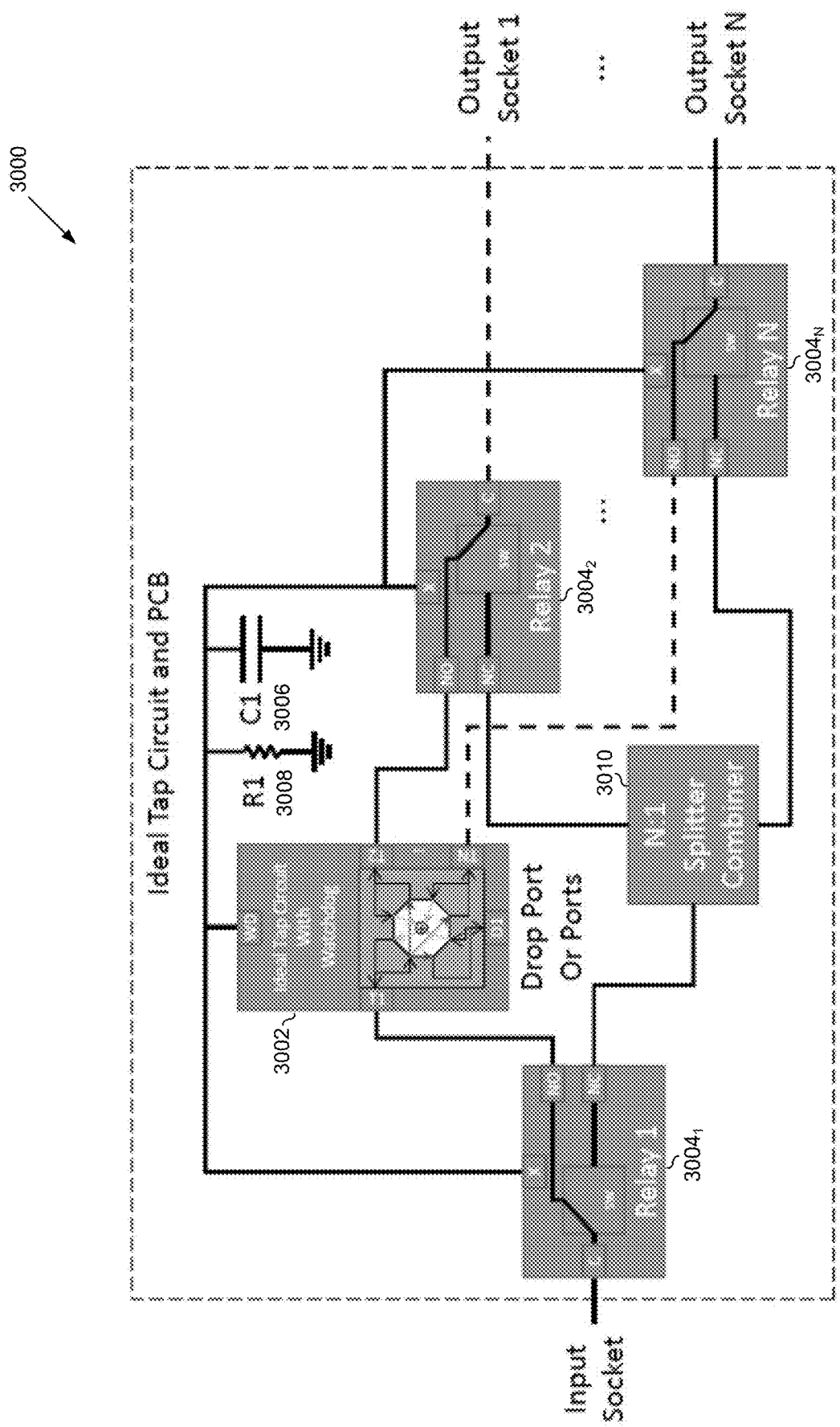
FIG. 30 illustrates an example ideal tap incorporating watchdog circuit that supports multi-input and/or multi-output ports.

FIG. 30 illustrates an example ideal tap incorporating watchdog circuit that supports multi-input and/or multi-output ports. Shown in FIG. 30 is an ideal tap 3000 that incorporates watchdog related circuitry for mitigating network outages due to failures and/or malfunctions in the tap itself.

The ideal tap 3000 may be similar to the ideal tap 2000, and may similarly be configured and may comprise similar circuitry for providing the watchdog related functions as described with respect to FIGS. 20 and 21. However, the ideal tap 3000 may be additionally configured to support providing watchdog related functions (in response to the same triggered described above) in the context of having and supporting multiple inputs and/or multiple outputs. In other words, the ideal tap 3000 may be configured to implement and/or support watchdog based bridging between more than one input port and one output port. For example, the ideal tap has N trunk ports (N>2), each of which may be configured and used as input or output port). To that end, the ideal tap 3000 may comprise additional circuitry compared to the ideal tap 2000 for supporting the multiple input and/or output ports (rather than single input port and single output port).

As shown in FIG. 30, the tap 3000 comprises an ideal tap with watchdog circuit 3002, N relay circuits $3004_1$-$3004_N$ (also shown and referred to as "Relay 1" . . . "Relay N"), an optional capacitor 3006 (also shown and referred to as "C1"), an optional resistor 3008 (also shown and referred to as "R1"), and an N:1 splitter/combiner 3010.

The ideal tap circuit 3002 may be similar to the ideal tap circuit 2002, and generally may operate in substantially similar manner as described with respect to FIGS. 20 and 21 for example. However, the ideal tap circuit 3002 may incorporate some changes to account for the multiple trunk ports. For example, rather than having only two ports for interacting with two relays, the ideal tap circuit 3002 may comprise N ports (T1 . . . TN) ports, each connected to one of the N relay circuits $3004_1$-$3004_N$.

The N relay circuits $3004_1$-$3004_N$ may be similar to the relay circuits $2004_1$-$2004_2$, and generally may operate in substantially similar manner as described with respect to FIGS. 20 and 21 for example.

The optional capacitor 3006 (labeled "C1") and the optional resistor 3008 (labeled "R1") may be similar to the relay capacitor 2006 and the resistor 2008, and generally may operate in substantially similar manner as described with respect to FIGS. 20 and 21 for example.

The N:1 splitter/combiner 3010 may comprise suitable circuitry for combining and/or splitting RF signals passed through the relay circuits $3004_1$-$3004_N$. In particular, the N:1 splitter/combiner 3010 may be utilized when operating in the watchdog mode, to facilitate bypassing the ideal tap circuit 3002.

In operation, the ideal tap 3000 may support watchdog functionality, whereby the ideal tap 3000 may facilitate forwarding of signals even when it is not operating properly (with respect to its functions as a tap—that is, handling communications via its drop ports). For example, depending on the desired protection the ideal tap circuit 3002 may be configured to operate in different modes, including, e.g., command and control mode and watchdog mode. In the command and control mode, the ideal tap circuit 3002 controls the relays $3004_1$ and $3004_2$ via the WD signal—that is, controls signal transmitted via the "WD" port of the ideal tap circuit 3002 to the "X" ports of the relays. In this regard, the ideal tap circuit 3002 may hold the WD signal high to keep the relays in the NO position, or hold the WD signal low to keep the relays in the NC position. In an example implementation, multiple WD signals may be used, such that relays Relay 1 to Relay N can be controlled independently.

The resistor R1 and the capacitor C1 are not required for operation in the command and control mode. Configuration of the ideal tap 3000 during normal operation is shown in FIG. 30. In this regard, with the WD signal asserted to high, the relays are kept in the NO positions, and as such signals received at the input socket pass through the C port of Relay 1 into the NO port of Relay 1 and into the T1 port of the ideal tap circuit 3002. The output signals are sent from the ideal tap circuit 3002 through the T2 port into the NO port of Relay 2, which routes the signals onto the C port, for transmittal through the output sockets. The signals communicated to/from subscribed served directly by the ideal tap 3000 are communicated via the drop port(s) D1. Operation in watchdog mode is described with respect to FIG. 31.

Figure 31:
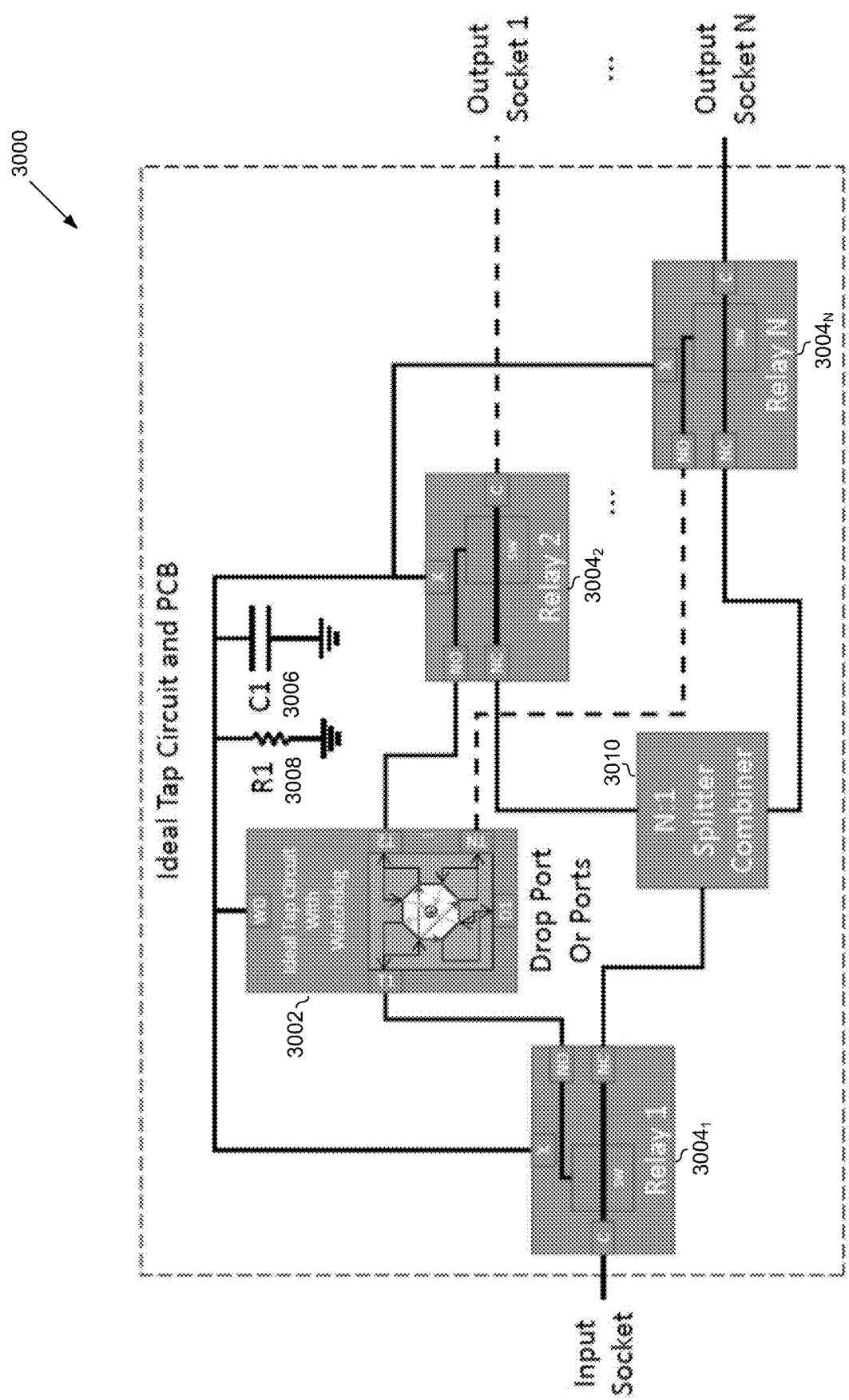
FIG. 31 illustrates an example use scenario where the ideal tap 3000 of FIG. 30 is operating in watchdog mode.

FIG. 31 illustrates an example use scenario where the ideal tap 3000 of FIG. 30 is operating in watchdog mode. In this regard, as described above, one or more watchdog timers may be used to monitor operation of the tap 3000 and/or to determine when to trigger watchdog mode of operation.

In an example operation, when switching to the watchdog mode, the WD signal is set low and the relays are set in the NC position. When in the NC position, signals and power will pass without interruption between the N coax ports, with the N:1 splitter/combiner 3010 performing any required splitting and/or combining of the passed RF signals, as shown in FIG. 31, in a similar manner as the make-before-break circuit in the tap housing, allowing the signals to reach the next hop in the system and limiting improper operation to only the malfunctioning ideal tap. Passing of AC power may also be done in the watchdog mode, as described above.

Figure 32:
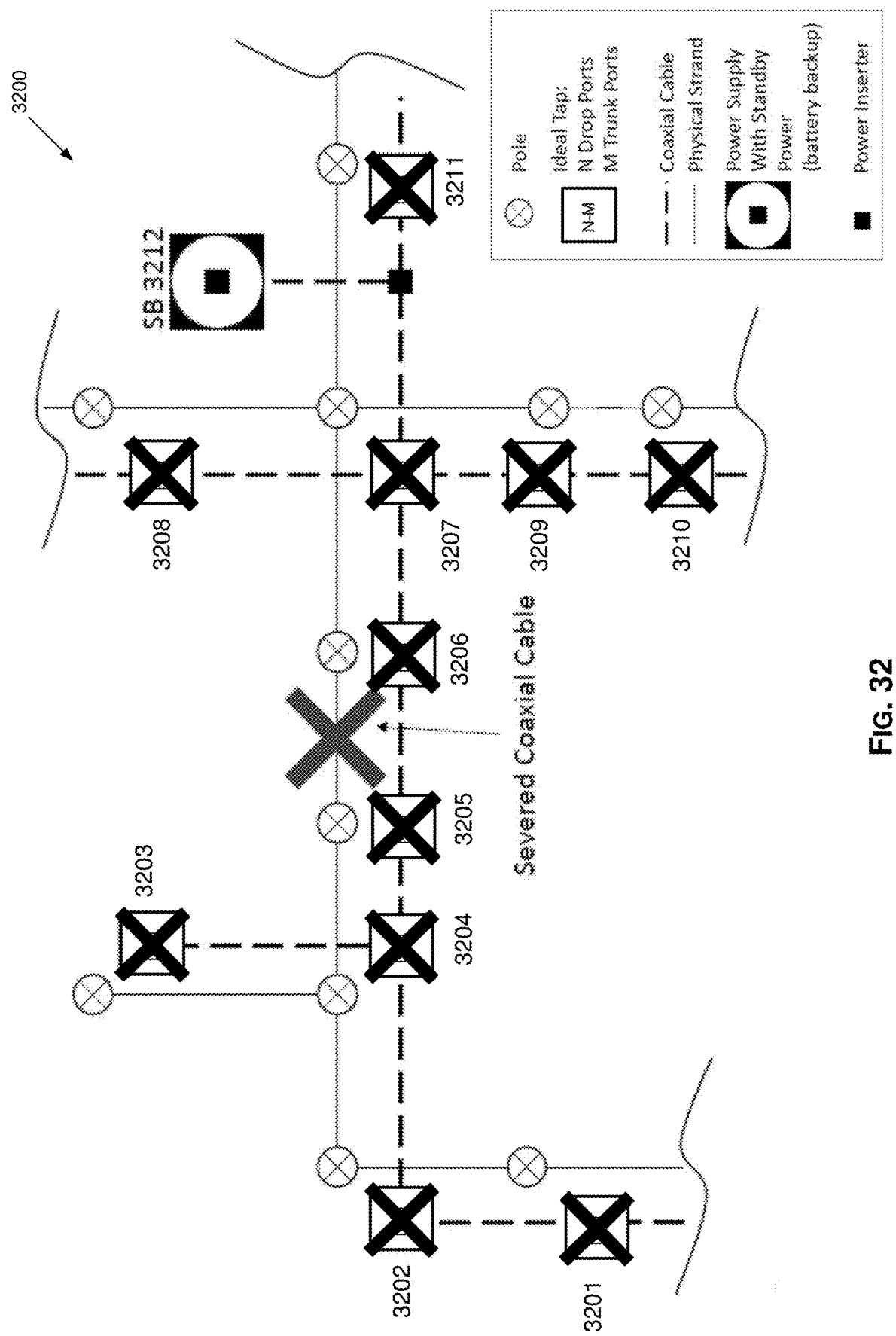
FIG. 32 illustrates an example cable plant with ideal taps that do not incorporate use of alternate power source.

FIG. 32 illustrates an example cable plant with ideal taps that do not incorporate use of alternate power source. Shown in FIG. 32 is cable plant 3200 for a cable plant (or segment thereof) that comprises ideal taps.

The cable plant 3200 incorporates N-M ideal taps—that is, taps with 'N' drop ports, 'M' trunk ports, with at least some of these ideal taps replacing active and passive devices in the system. Each of these ideal taps may be configured for supporting ideal taps functions, as described above. As shown in FIG. 23, the cable plant 2300 includes ideal taps 3201-3211. The ideal taps used in the cable plant 3200 are not configured for, and do not support use of alternate power sources. Lack of such alternate power sources in the taps may have adverse effects on performance in the network in failure mode corresponding to complete system power failure, as discussed above.

In this regard, current HFC systems utilize powering systems which convert utility AC power to the desired power for the HFC plant and include a battery backup that can provide standby power if there is a loss or outage of the utility power input. However, there may be other failure modes, such as line damage caused by a fallen tree limb or other possibility that prevents power to flow from the power system to all parts of the HFC plant powered by it. FIG. 32 shows such an outage in an ideal tap system. Note that this type of outage is not limited to ideal tap systems.

Traditional HFC systems have similar failure modes. As shown in FIG. 32, cable plant segment 3200 has a node that is located upstream of ideal tap 3201 and a power supply with battery backup, SB 3212, located US of tap 3211. A tree limb or some other anomaly has severed the coaxial cable located between taps 3205 and 3206. Thus, power cannot flow to taps 3201-3205 and the RF signals cannot flow to/from the node and any taps 3206-3211.

A complete system outage has occurred due to the failed coaxial cable. Taps 3201-3205 cannot function due to loss of power. Taps 3206-3211 are powered but cannot get signal to/from the node. It is common that power supplies and signal sources (nodes) are located in different locations in the network.

Figure 33:
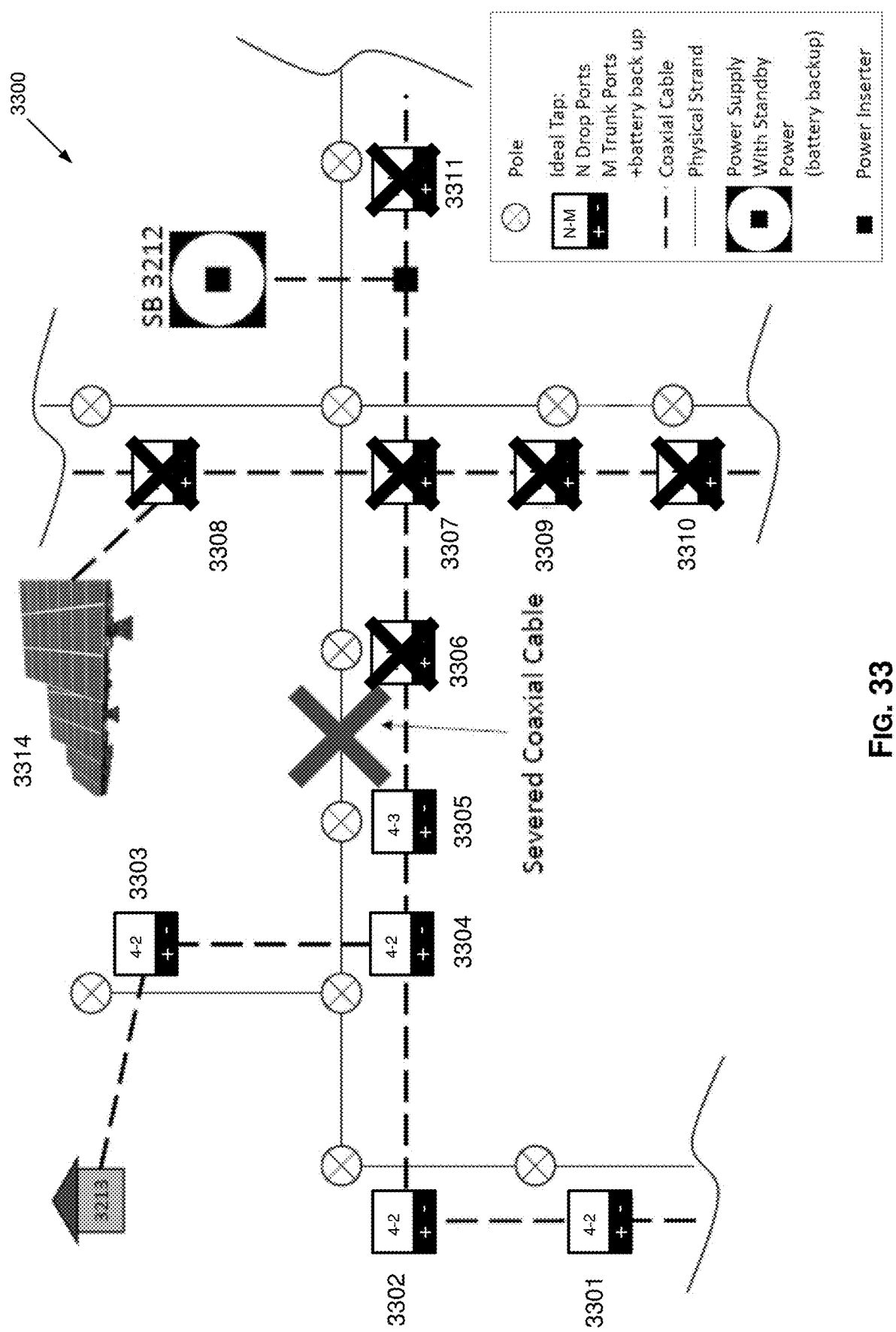
FIG. 33 illustrates an example cable plant with ideal taps that incorporate use of alternate power source.

To reduce the scope of such an outage as described above and ideal tap can be constructed which may use an alternative power source either instead of or in conjunction with the AC or DC power available from the coaxial cable. The alternative power source may be a battery, a fuel cell, a solar panel, and/or power supplied from the customer premises. FIG. 33 shows the same cable plant, 3200 as in FIG. 32.

FIG. 33 illustrates an example cable plant with ideal taps that incorporate use of alternate power source. Shown in FIG. 33 is a cable plant map corresponding cable plant (or segment thereof) 3300 which comprises ideal taps.

The cable plant 3300 may be similar to the cable plant 3200, thus also incorporates N-M ideal taps. The taps of cable plant 3300 may be configured for support use of alternative power sources, however.

For example, as shown in FIG. 33, each of ideal taps 3301-3311 in the cable plant 3300 may incorporate an integrated back up battery power supply. In some instances, some of the taps may support use of other alternative power sources, in addition to and/or in lieu of use of integrated back up battery power supply. For example, as shown in FIG. 33, tap 3303 has an integrated battery backup, but also is connected to power from the customer premises 3313 via the drop coaxial cable that also provides services to the customer premises. It can be seen in FIG. 33 that the outage has been reduced from all ideal taps to only those taps located beyond tap 3305, 3306-3311. While taps 3306-3311 have power they lack a signal path to the node. Methods for providing redundant signal paths to ideal taps are discussed in U.S. patent application Ser. No. 16/659,170, filed Oct. 21, 2019, which is incorporated herein by reference in its entirety.

In some instances, ideal taps may support use of more than one alternative power source, and to do so simultaneously—that is, concurrently use multiple alternative power sources, and may be able to be configured to load share or to prefer one power source over another. For example, in some instances, the ideal tap may be configured to obtain power from customer premises (or equipment therein connected to the tap). As shown in FIG. 33, for example, tap 3303 may be configured to get power from the customer premise 3313.

Obtaining power in this matter may work well for taps which are connected to customer premises, however there are ideal taps (e.g., ideal tap 3307) that have no drop ports and thus no connection to a customer premises. Such taps may use the plant power provided by power supply 3312 and may also contain a battery for backup power. Tap 3307 may be configured to prefer the plant power over the back power unless the plant power is unavailable.

Likewise tap 3303 which is connected to a customer premises may be configured to prefer power from the customer premise if available, then the plant power, and finally the power from the backup battery.

In some instances, ideal taps may be configured to obtain power using local power generating resources. As shown in FIG. 33, for example, tap 3308 may be configured to obtain power from solar panel(s) 3314, which may be attached via a drop port or a trunk port, or may be integrated into the tap body or housing, and then to prefer plant power and then power from the battery backup only when either plant power or solar power is not available. Note that power from a solar panel, the customer premise, or the plant may be in the form of AC or DC power.

An example system for reducing outage scope in cable networks, in accordance with the present disclosure, may comprise an ideal tap configured for use in a coaxial network, the ideal tap comprising a plurality of ports that comprise at least an input port, an output port, and one or more drop ports, with the input port configured for receiving downstream (DS) signals from, and transmitting upstream (US) signals to one or more network nodes upstream from the ideal tap within the coaxial network, the output port configured for transmitting downstream (DS) signals to and receiving upstream (US) signals from one or more network nodes downstream from the ideal tap within the coaxial network, and the one or more drop ports for receiving signals from and transmitting signals to customer premise equipment (CPE) in the coaxial network. The ideal tap also comprises one or more ideal processing circuits configured for handling signals received and transmitted via the ideal tap during normal operation, to meet predefined tap performance criteria that comprise one or more of high return loss, high port-to-port isolation, high port-to-port, and up-tilt. Further, the ideal tap comprises one or more mitigation components configured for reducing scope of outage in the ideal tap, wherein the one or more mitigation components are configured to, when outage occurs in the ideal tap, at least provide or maintain inter-port connectivity within the ideal tap, the inter-port connectivity comprising at least connectivity between the input port and the output port.

In an example implementation, the ideal tap comprises a removable sub-portion that comprises at least the one or more ideal processing circuits, and the one or more mitigation components are configured to provide one or more physical connections among the plurality of ports when the removable sub-portion is removed.

In an example implementation, the removable sub-portion comprises the one or more drop ports.

In an example implementation, the one or more mitigation components comprise one or more reeds configured to provide the one or more physical connections among the plurality of ports when the removable sub-portion is removed.

In an example implementation, the one or more mitigation components comprise a plurality of studs, each stud connected to a corresponding one of the plurality of plurality of ports; and wherein one or more reeds, wherein each reed is configured to provide physical connection between two studs of the plurality of studs when the removable sub-portion is removed from the ideal tap.

In an example implementation, the removable sub-portion is configured to cause the one or more reeds to break the one or more physical connections when the removable sub-portion is fully inserted.

In an example implementation, the one or more reeds comprise flexible sections, and wherein the removable sub-portion comprises a spacer configured to cause the one or more reed to bend when the removable sub-portion is fully inserted, to break the one or more physical connections.

In an example implementation, the one or more mitigation components comprise one or more mitigation circuits configured for facilitating and/or supporting the inter-port connectivity within the ideal tap during the outage.

In an example implementation, the one or more mitigation circuits are configured to apply one or more adjustments to signals or power communicated via the ideal tap during the outage, based on predefined parameters or criteria.

In an example implementation, the one or more mitigation circuits are configured to apply signal boosting based on predefined gain criteria, the predefined gain criteria comprising a fixed gain or a selectable gain.

In an example implementation, the one or more mitigation circuits are configured to set the selectable gain based on an automatic range to match gain applied to signals communicated via same path within the ideal tap during normal operation.

In an example implementation, the one or more mitigation circuits comprise a splitter/combiner circuit configured to combine and/or split signals forwarded via the ideal tap during the outage.

In an example implementation, the one or more mitigation circuits comprise at least one high-pass filter (HPF) circuit configured to apply, to at least some of signals forwarded via the ideal tap during the outage, high-pass filtering.

In an example implementation, the least one high-pass filter (HPF) circuit is configured to remove AC signals.

In an example implementation, the one or more mitigation circuits are configured to operate variably based on operation of the ideal tap, and wherein variable operation of the one or more mitigation circuits providing the inter-port connectivity only when the outage occurs in the ideal tap.

In an example implementation, the one or more mitigation circuits are configurable to provide a secondary circuit within the ideal tap, and wherein the variable operation comprises the secondary circuit remaining open during normal operation of the ideal tap, and the secondary circuit closing when the outage occurs in the ideal tap.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
an ideal tap configured for use in a coaxial network, the ideal tap comprising:
a plurality of ports that comprise at least:
an input port configured for receiving downstream (DS) signals from, and transmitting upstream (US) signals to one or more network nodes upstream from the ideal tap within the coaxial network;
an output port configured for transmitting downstream (DS) signals to and receiving upstream (US) signals from one or more network nodes downstream from the ideal tap within the coaxial network;
one or more drop ports for receiving signals from and transmitting signals to customer premise equipment (CPE) in the coaxial network;
one or more ideal processing circuits configured for handling signals received and transmitted via the ideal tap during normal operation, to meet predefined tap performance criteria that comprise one or more of high return loss, high port-to-port isolation, high port-to-port, and up-tilt; and
one or more mitigation components configured for reducing scope of outage in the ideal tap,
wherein the one or more mitigation components are configured to, when an outage occurs in the ideal tap, provide or maintain inter-port connectivity within the ideal tap, the inter-port connectivity comprising at least connectivity between the input port and the output port,
wherein the one or more mitigation components comprise one or more mitigation circuits configured for facilitating and/or supporting the inter-port connectivity within the ideal tap during the outage, and
wherein the one or more mitigation circuits are configured to apply one or more adjustments to signals or power communicated via the ideal tap during the outage, based on predefined parameters or criteria.

2. The system of claim 1, wherein:
the ideal tap comprises a removable sub-portion that comprises at least the one or more ideal processing circuits; and
the one or more mitigation components are configured to provide one or more physical connections among the plurality of ports when the removable sub-portion is removed.

3. The system of claim 2, wherein the removable sub-portion comprises the one or more drop ports.

4. The system of claim 2, wherein the one or more mitigation components comprise one or more reeds configured to provide the one or more physical connections among the plurality of ports when the removable sub-portion is removed.

5. The system of claim 4, wherein the one or more mitigation components comprise a plurality of studs, each stud connected to a corresponding one of the plurality of plurality of ports; and
wherein one or more reeds, wherein each reed is configured to provide physical connection between two studs of the plurality of studs when the removable sub-portion is removed from the ideal tap.

6. The system of claim 4, wherein the removable sub-portion is configured to cause the one or more reeds to break the one or more physical connections when the removable sub-portion is fully inserted.

7. The system of claim 6, wherein the one or more reeds comprise flexible sections, and wherein the removable sub-portion comprises a spacer configured to cause the one or more reed to bend when the removable sub-portion is fully inserted, to break the one or more physical connections.

8. The system of claim 1, wherein the one or more mitigation circuits are configured to apply signal boosting based on predefined gain criteria, the predefined gain criteria comprising a fixed gain or a selectable gain.

9. The system of claim 8, wherein the one or more mitigation circuits are configured to set the selectable gain based on an automatic range to match gain applied to signals communicated via same path within the ideal tap during normal operation.

10. The system of claim 1, wherein the one or more mitigation circuits comprise a splitter/combiner circuit configured to combine and/or split signals forwarded via the ideal tap during the outage.

11. The system of claim 1, wherein the one or more mitigation circuits comprise at least one high-pass filter (HPF) circuit configured to apply, to at least some of signals forwarded via the ideal tap during the outage, high-pass filtering.

12. The system of claim 11, wherein the least one high-pass filter (HPF) circuit is configured to remove AC signals.

13. The system of claim 1, wherein the one or more mitigation circuits are configured to operate variably based on operation of the ideal tap, and wherein variable operation of the one or more mitigation circuits providing the inter-port connectivity only when the outage occurs in the ideal tap.

14. The system of claim 13, wherein the one or more mitigation circuits are configurable to provide a secondary circuit within the ideal tap, and wherein the variable operation comprises the secondary circuit remaining open during normal operation of the ideal tap, and the secondary circuit closing when the outage occurs in the ideal tap.

15. A system comprising:
an ideal tap configured for use in a coaxial network, the ideal tap comprising:
a plurality of ports that comprise at least:
an input port configured for receiving downstream (DS) signals from, and transmitting upstream (US) signals to one or more network nodes upstream from the ideal tap within the coaxial network;
an output port configured for transmitting downstream (DS) signals to and receiving upstream (US) signals from one or more network nodes downstream from the ideal tap within the coaxial network;
one or more drop ports for receiving signals from and transmitting signals to customer premise equipment (CPE) in the coaxial network;
one or more ideal processing circuits configured for handling signals received and transmitted via the ideal tap during normal operation, to meet predefined tap performance criteria that comprise one or more of high return loss, high port-to-port isolation, high port-to-port, and up-tilt; and
one or more mitigation components configured for reducing scope of outage in the ideal tap,
wherein the one or more mitigation components are configured to, when an outage occurs in the ideal tap, provide or maintain inter-port connectivity within the ideal tap, the inter-port connectivity comprising at least connectivity between the input port and the output port, wherein the one or more mitigation components comprise one or more mitigation circuits configured for facilitating and/or supporting the inter-port connectivity within the ideal tap during the outage, and wherein the one or more mitigation circuits comprise a splitter/combiner circuit configured to combine and/or split signals forwarded via the ideal tap during the outage.

16. The system of claim 15, wherein:

the ideal tap comprises a removable sub-portion that comprises at least the one or more ideal processing circuits; and the one or more mitigation components are configured to provide one or more physical connections among the plurality of ports when the removable sub-portion is removed.

17. The system of claim 16, wherein the removable sub-portion comprises the one or more drop ports.

18. The system of claim 16, wherein the one or more mitigation components comprise one or more reeds configured to provide the one or more physical connections among the plurality of ports when the removable sub-portion is removed.

19. The system of claim 18, wherein the one or more mitigation components comprise a plurality of studs, each stud connected to a corresponding one of the plurality of plurality of ports; and wherein one or more reeds, wherein each reed is configured to provide physical connection between two studs of the plurality of studs when the removable sub-portion is removed from the ideal tap.

20. The system of claim 18, wherein the removable sub-portion is configured to cause the one or more reeds to break the one or more physical connections when the removable sub-portion is fully inserted.

21. The system of claim 20, wherein the one or more reeds comprise flexible sections, and wherein the removable sub-portion comprises a spacer configured to cause the one or more reed to bend when the removable sub-portion is fully inserted, to break the one or more physical connections.

22. The system of claim 15, wherein the one or more mitigation circuits comprise at least one high-pass filter (HPF) circuit configured to apply, to at least some of signals forwarded via the ideal tap during the outage, high-pass filtering.

23. The system of claim 22, wherein the least one high-pass filter (HPF) circuit is configured to remove AC signals.

24. The system of claim 15, wherein the one or more mitigation circuits are configured to operate variably based on operation of the ideal tap, and wherein variable operation of the one or more mitigation circuits providing the inter-port connectivity only when the outage occurs in the ideal tap.

25. The system of claim 24, wherein the one or more mitigation circuits are configurable to provide a secondary circuit within the ideal tap, and wherein the variable operation comprises the secondary circuit remaining open during normal operation of the ideal tap, and the secondary circuit closing when the outage occurs in the ideal tap.

26. A system comprising:

an ideal tap configured for use in a coaxial network, the ideal tap comprising:

a plurality of ports that comprise at least:

an input port configured for receiving downstream (DS) signals from, and transmitting upstream (US) signals to one or more network nodes upstream from the ideal tap within the coaxial network;

an output port configured for transmitting downstream (DS) signals to and receiving upstream (US) signals from one or more network nodes downstream from the ideal tap within the coaxial network;

one or more drop ports for receiving signals from and transmitting signals to customer premise equipment (CPE) in the coaxial network;

one or more ideal processing circuits configured for handling signals received and transmitted via the ideal tap during normal operation, to meet predefined tap performance criteria that comprise one or more of high return loss, high port-to-port isolation, high port-to-port, and up-tilt; and one or more mitigation components configured for reducing scope of outage in the ideal tap, wherein the one or more mitigation components are configured to, when an outage occurs in the ideal tap, provide or maintain inter-port connectivity within the ideal tap, the inter-port connectivity comprising at least connectivity between the input port and the output port, wherein the one or more mitigation components comprise one or more mitigation circuits configured for facilitating and/or supporting the inter-port connectivity within the ideal tap during the outage, and wherein the one or more mitigation circuits comprise at least one high-pass filter (HPF) circuit configured to apply, to at least some of signals forwarded via the ideal tap during the outage, high-pass filtering.

27. The system of claim 26, wherein:

the ideal tap comprises a removable sub-portion that comprises at least the one or more ideal processing circuits; and the one or more mitigation components are configured to provide one or more physical connections among the plurality of ports when the removable sub-portion is removed.

28. The system of claim 27, wherein the removable sub-portion comprises the one or more drop ports.

29. The system of claim 27, wherein the one or more mitigation components comprise one or more reeds configured to provide the one or more physical connections among the plurality of ports when the removable sub-portion is removed.

30. The system of claim 29, wherein the one or more mitigation components comprise a plurality of studs, each stud connected to a corresponding one of the plurality of plurality of ports; and wherein one or more reeds, wherein each reed is configured to provide physical connection between two studs of the plurality of studs when the removable sub-portion is removed from the ideal tap.

31. The system of claim 29, wherein the removable sub-portion is configured to cause the one or more reeds to break the one or more physical connections when the removable sub-portion is fully inserted.

32. The system of claim 31, wherein the one or more reeds comprise flexible sections, and wherein the removable sub-portion comprises a spacer configured to cause the one or more reed to bend when the removable sub-portion is fully inserted, to break the one or more physical connections.

33. The system of claim 26, wherein the least one high-pass filter (HPF) circuit is configured to remove AC signals.

34. The system of claim 26, wherein the one or more mitigation circuits are configured to operate variably based on operation of the ideal tap, and wherein variable operation of the one or more mitigation circuits providing the inter-port connectivity only when the outage occurs in the ideal tap.

35. The system of claim 34, wherein the one or more mitigation circuits are configurable to provide a secondary circuit within the ideal tap, and wherein the variable operation comprises the secondary circuit remaining open during normal operation of the ideal tap, and the secondary circuit closing when the outage occurs in the ideal tap.

36. A system comprising:
an ideal tap configured for use in a coaxial network, the ideal tap comprising:
a plurality of ports that comprise at least:
an input port configured for receiving downstream (DS) signals from, and transmitting upstream (US) signals to one or more network nodes upstream from the ideal tap within the coaxial network;
an output port configured for transmitting downstream (DS) signals to and receiving upstream (US) signals from one or more network nodes downstream from the ideal tap within the coaxial network;
one or more drop ports for receiving signals from and transmitting signals to customer premise equipment (CPE) in the coaxial network;
one or more ideal processing circuits configured for handling signals received and transmitted via the ideal tap during normal operation, to meet predefined tap performance criteria that comprise one or more of high return loss, high port-to-port isolation, high port-to-port, and up-tilt; and
one or more mitigation components configured for reducing scope of outage in the ideal tap,
wherein the one or more mitigation components are configured to, when an outage occurs in the ideal tap, provide or maintain inter-port connectivity within the ideal tap, the inter-port connectivity comprising at least connectivity between the input port and the output port,
wherein the one or more mitigation components comprise one or more mitigation circuits configured for facilitating and/or supporting the inter-port connectivity within the ideal tap during the outage,
wherein the one or more mitigation circuits are configured to operate variably based on operation of the ideal tap, and
wherein variable operation of the one or more mitigation circuits providing the inter-port connectivity only when the outage occurs in the ideal tap.

37. The system of claim 36, wherein:
the ideal tap comprises a removable sub-portion that comprises at least the one or more ideal processing circuits; and
the one or more mitigation components are configured to provide one or more physical connections among the plurality of ports when the removable sub-portion is removed.

38. The system of claim 37, wherein the removable sub-portion comprises the one or more drop ports.

39. The system of claim 37, wherein the one or more mitigation components comprise one or more reeds configured to provide the one or more physical connections among the plurality of ports when the removable sub-portion is removed.

40. The system of claim 39, wherein the one or more mitigation components comprise a plurality of studs, each stud connected to a corresponding one of the plurality of plurality of ports; and
wherein one or more reeds, wherein each reed is configured to provide physical connection between two studs of the plurality of studs when the removable sub-portion is removed from the ideal tap.

41. The system of claim 39, wherein the removable sub-portion is configured to cause the one or more reeds to break the one or more physical connections when the removable sub-portion is fully inserted.

42. The system of claim 41, wherein the one or more reeds comprise flexible sections, and wherein the removable sub-portion comprises a spacer configured to cause the one or more reed to bend when the removable sub-portion is fully inserted, to break the one or more physical connections.

43. The system of claim 36, wherein the one or more mitigation circuits are configurable to provide a secondary circuit within the ideal tap, and wherein the variable operation comprises the secondary circuit remaining open during normal operation of the ideal tap, and the secondary circuit closing when the outage occurs in the ideal tap.

* * * * *